United States Patent
Turck

(10) Patent No.: US 10,343,849 B2
(45) Date of Patent: Jul. 9, 2019

(54) DRY LUBRICATING CONVEYOR BELT EQUIPMENT

(71) Applicant: Pieter Turck, Kapellen (BE)

(72) Inventor: Pieter Turck, Kapellen (BE)

(73) Assignee: CHP N.V., Kapellen (BE)

( * ) Notice: Subject to any disclaimer, the term of this patent is extended or adjusted under 35 U.S.C. 154(b) by 0 days.

(21) Appl. No.: 15/893,030

(22) Filed: Feb. 9, 2018

(65) Prior Publication Data
US 2018/0208405 A1 Jul. 26, 2018

Related U.S. Application Data

(63) Continuation-in-part of application No. PCT/BE2016/000010, filed on Feb. 2, 2016.

(51) Int. Cl.
| | |
|---|---|
| *B65G 15/30* | (2006.01) |
| *B65G 43/02* | (2006.01) |
| *B65G 45/02* | (2006.01) |
| *B65G 45/22* | (2006.01) |
| *B65G 45/24* | (2006.01) |
| *F16N 29/02* | (2006.01) |

(52) U.S. Cl.
CPC ............ *B65G 45/02* (2013.01); *B65G 15/30* (2013.01); *B65G 43/02* (2013.01); *B65G 45/22* (2013.01); *B65G 45/24* (2013.01); *F16N 29/02* (2013.01); *F16N 2250/42* (2013.01)

(58) Field of Classification Search
CPC ........ B65G 45/02; B65G 45/24; B65G 15/30; B65G 45/22; B65G 43/02; B65G 43/00; F16N 29/02; F16N 2250/42
USPC ................................................ 198/493–499
See application file for complete search history.

(56) References Cited

U.S. PATENT DOCUMENTS

| | | | | |
|---|---|---|---|---|
| 4,218,881 A | * | 8/1980 | Huffman ................ | B65G 23/22 198/500 |
| 4,520,917 A | | 6/1985 | Wright et al. | |
| 4,960,200 A | * | 10/1990 | Pierce ................... | B65G 45/22 198/495 |
| 5,320,132 A | * | 6/1994 | Weisse ................... | F16N 27/00 137/597 |
| 5,772,003 A | * | 6/1998 | Hunt ..................... | B65G 45/02 184/15.3 |

(Continued)

FOREIGN PATENT DOCUMENTS

| | | |
|---|---|---|
| EP | 1790592 A1 | 5/2007 |
| EP | 2105493 B1 | 9/2009 |

(Continued)

OTHER PUBLICATIONS

International Search Report from Corresponding PCT/BE2016/000010, Publication WO 2016/123681 A3, dated Aug. 9, 2016 (6 pages).

(Continued)

*Primary Examiner* — Mark A Deuble
(74) *Attorney, Agent, or Firm* — Hovey Williams LLP

(57) ABSTRACT

The invention relates to a system for dry lubricating equipment for a moving conveyor, said system comprising a dry lubrication unit or a treatment unit associated in a movable manner with the supporting system, without having to remove all the return supporting elements attached to the supporting system.

33 Claims, 22 Drawing Sheets

(56) References Cited

U.S. PATENT DOCUMENTS

| | | | |
|---|---|---|---|
| 6,302,263 B1* | 10/2001 | Bennett | B65G 45/02 198/495 |
| 6,360,874 B1 | 3/2002 | Virippil et al. | |
| 6,742,625 B2* | 6/2004 | Rodemer | B65G 45/08 184/15.2 |
| 7,091,162 B2* | 8/2006 | Lewis | C10M 173/025 198/500 |
| 8,801,341 B2 | 8/2014 | Turck | |
| 2011/0067978 A1 | 3/2011 | Carman et al. | |
| 2012/0000746 A1* | 1/2012 | Seger | B65G 21/2072 198/500 |
| 2012/0067382 A1 | 3/2012 | Berntsen et al. | |
| 2013/0180075 A1 | 7/2013 | Ficarra et al. | |
| 2016/0176648 A1* | 6/2016 | Van Den Berg | B65G 43/00 198/340 |

FOREIGN PATENT DOCUMENTS

| | | |
|---|---|---|
| EP | 2105494 A1 | 9/2009 |
| EP | 2061711 B1 | 3/2011 |
| EP | 2258638 B1 | 8/2012 |
| WO | 2008031176 A1 | 3/2008 |

OTHER PUBLICATIONS

Written Opinion of the International Searching Authority from Corresponding PCT/BE2016/000010, dated Aug. 9, 2016 (9 pages).

* cited by examiner

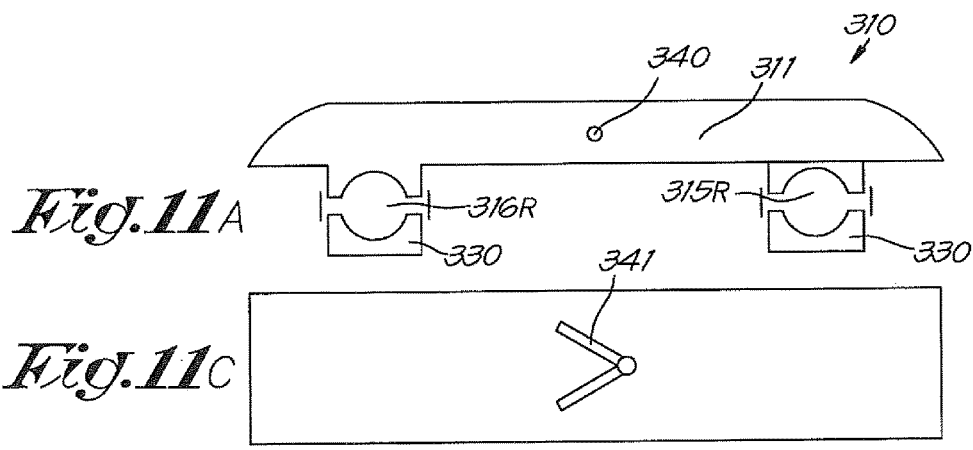
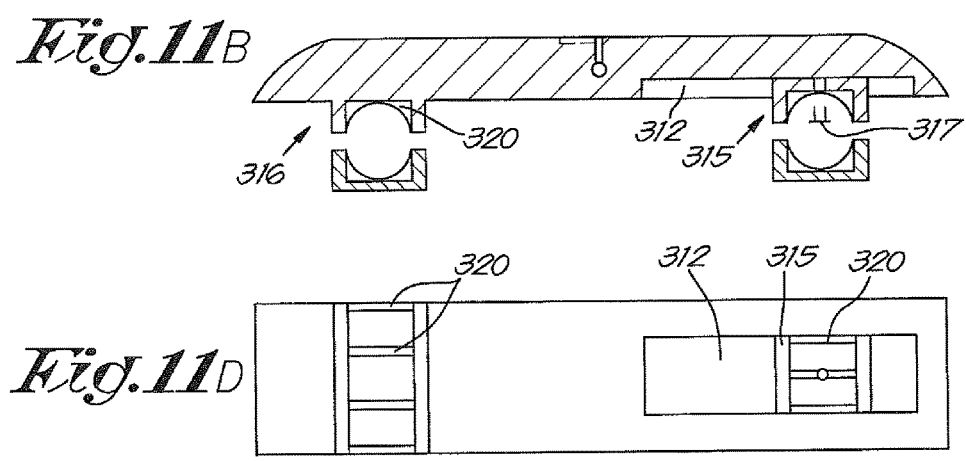
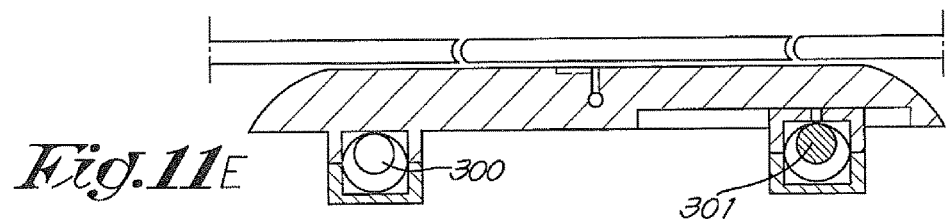

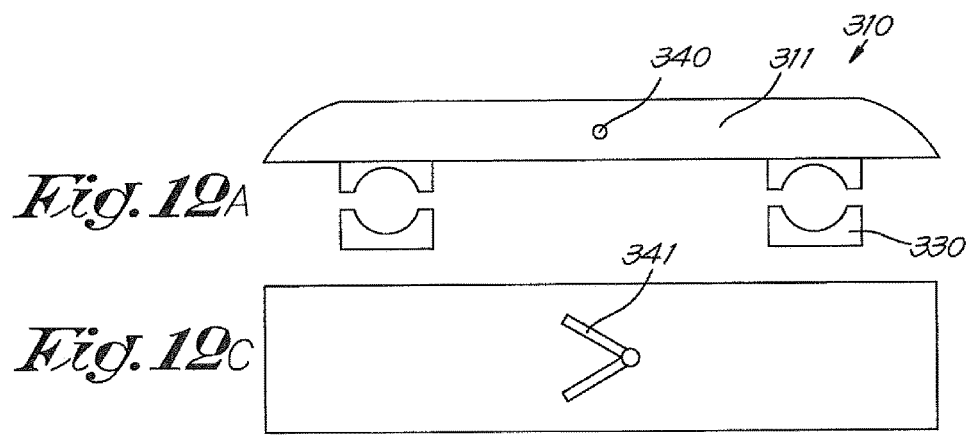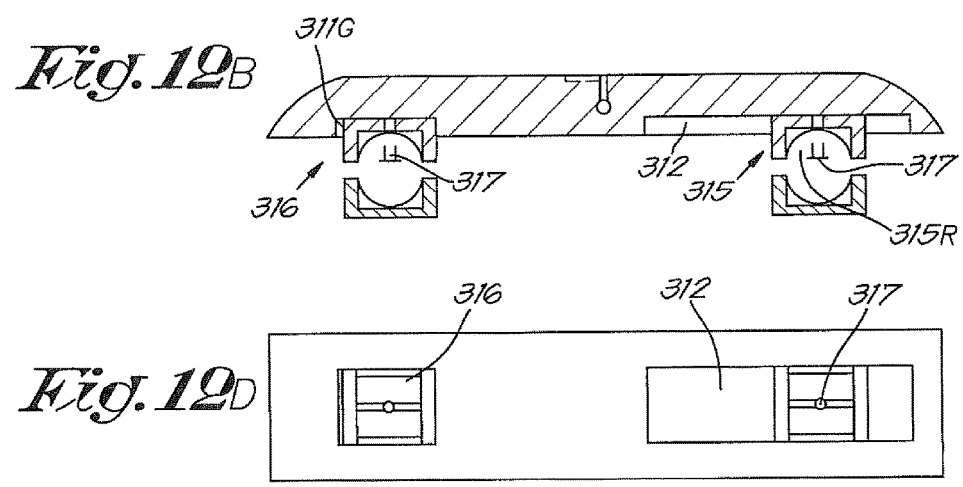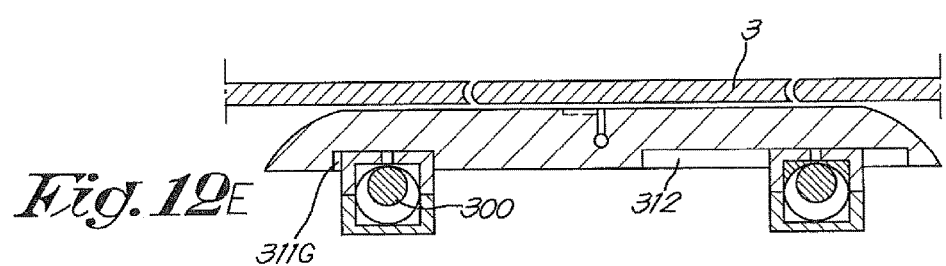

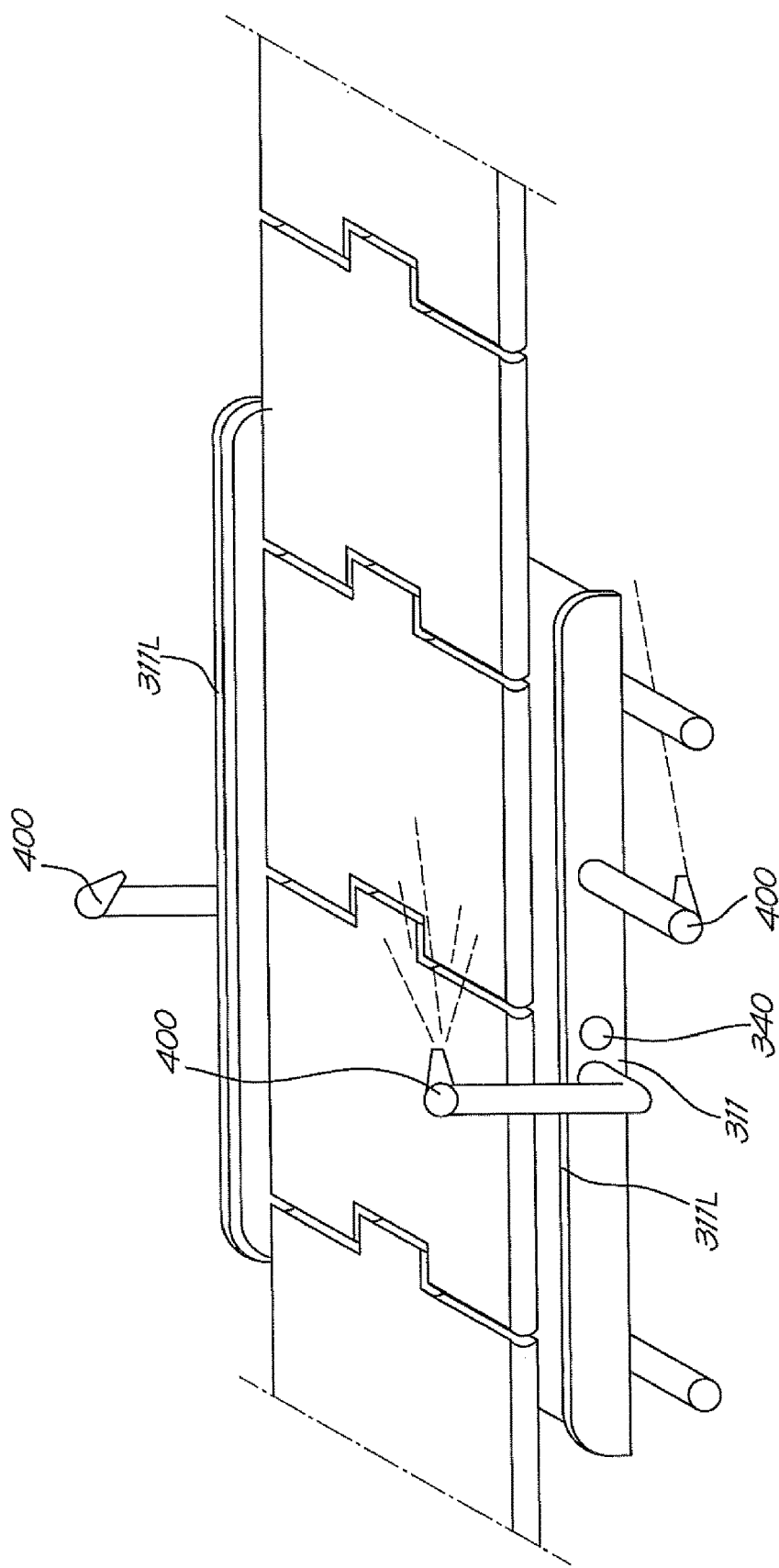

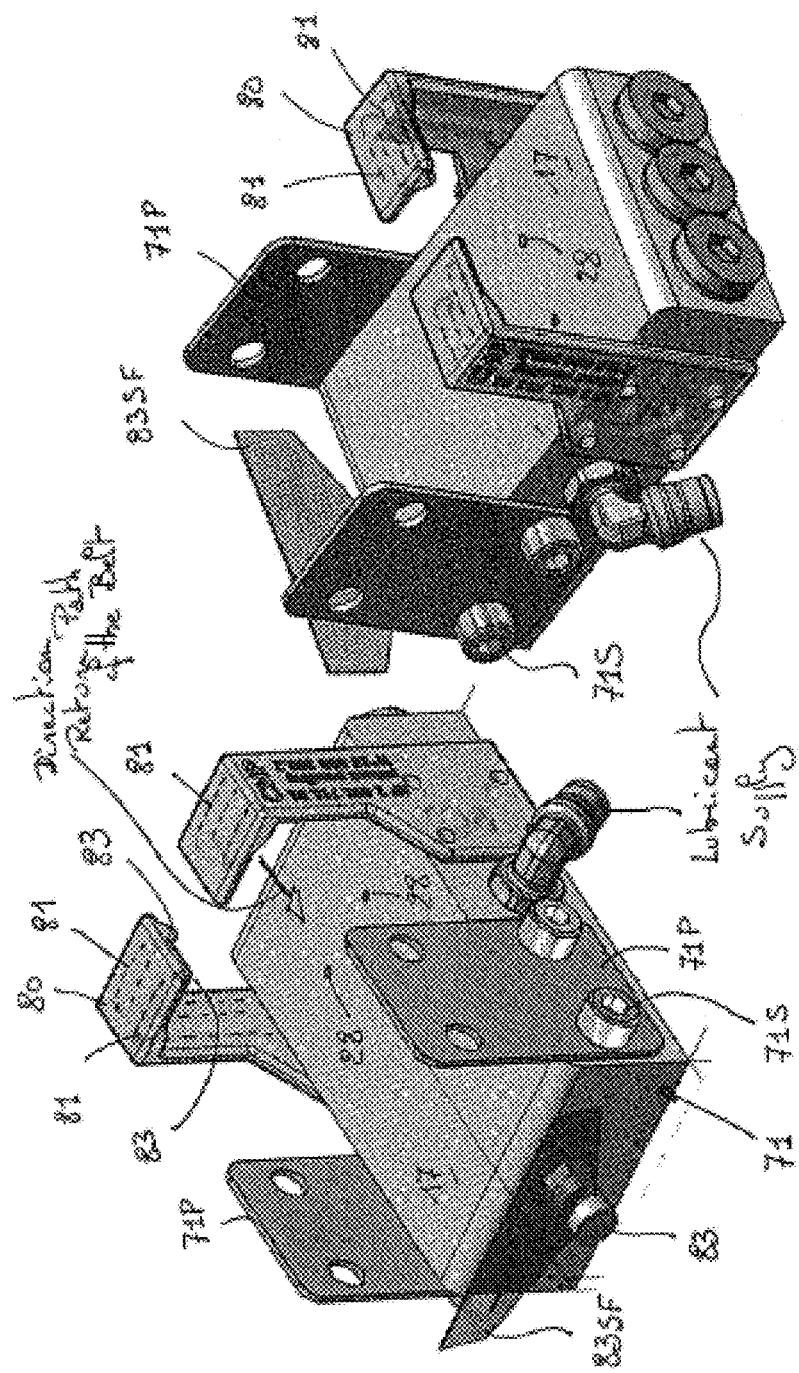

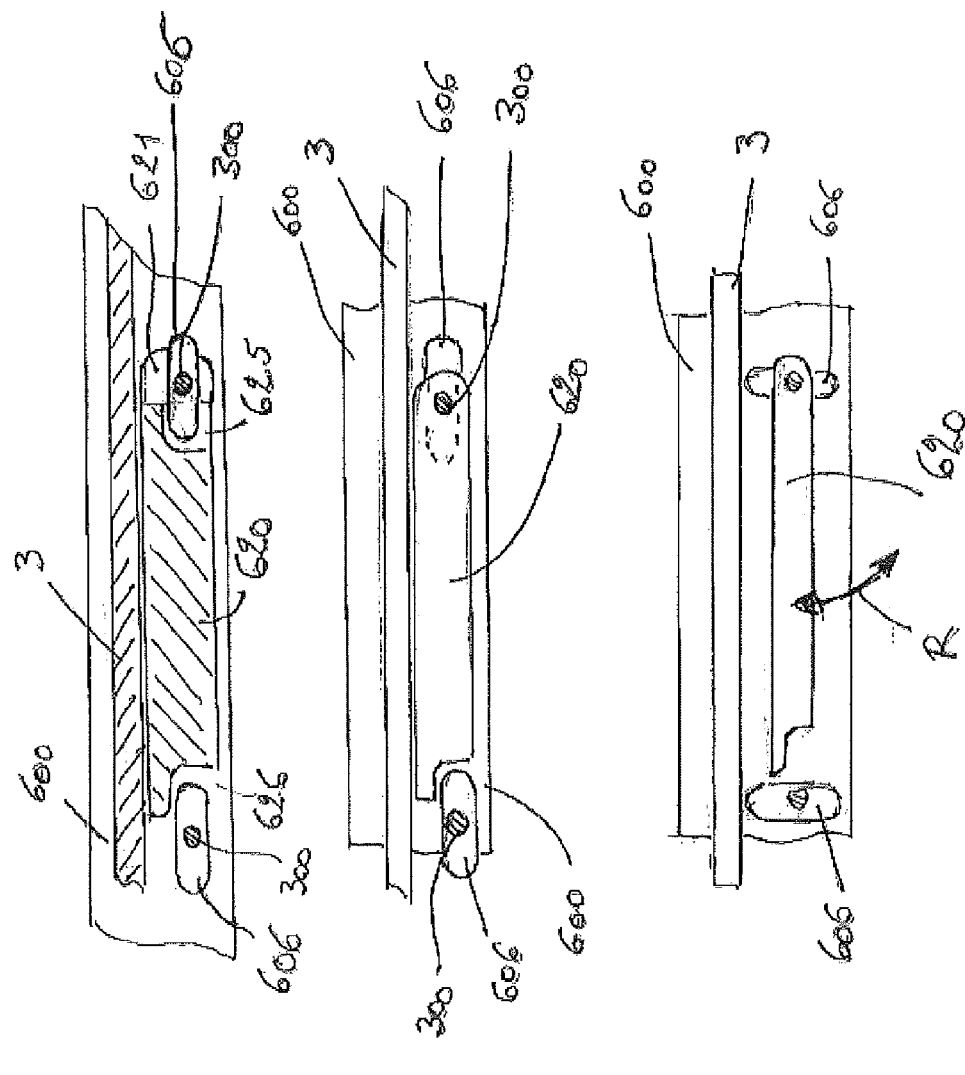

DRY LUBRICATING CONVEYOR BELT EQUIPMENT

RELATED APPLICATIONS

The present invention is a continuation in part of PCT/BE2016/000010 filed on Feb. 2, 2016, published on Aug. 11, 2016 under number WO2016/123681.

ABSTRACT OF THE DISCLOSURE

The invention relates to a system for dry lubricating a moving conveyor, said system comprising advantageously a dry lubricating unit, and/or a wet and/or dry cleaning unit, and/or a friction control unit and/or a single controller for generating control instruction for one or more units.

THE STATE OF THE ART

U.S. Pat. No. 8,801,341 and its equivalent EP2061711 disclose a lubricating method for a conveyor, a conveyor and equipment for lubrication. In one embodiment the conveyor is also associated with a wet cleaning unit. The lubrication and the cleaning operation are controlled by two distinct systems, meaning that a risk exist for having interference between lubricating and cleaning.

EP2258638 discloses a system for treating a conveyor with two distinct components by controlling the working of two distinct pumps for conveying the components to various applicators configured to apply either a first conveyor treatment component or a second conveyor treatment component. The first component and the second component are thus applied at the treatment section by using a same applicator. Interference of the two components occurs thus in such a system.

U.S. Pat. No. 6,360,874 discloses an automated conveyor cleaning system controlling the working of several pumps supplying hot water, soap, sanitizer to a plurality of spray valves.

Nowadays, moving conveyor are provided with two distinct automatic systems, working independently the one from the other, namely an automatic full dry (meaning water free) lubrication system used for lubricating conveyor belt used to transport containers (like bottles, cartons packages, boxes, etc.), and an automatic conveyor belt cleaning system for cleaning the conveyor belt used to transport containers, the two systems working independently the one from the other, each system having its own individual PLC.

Moving conveyors have been provided with treating units and lubrication units. The access to said units is often quite difficult or complicated and request often the conveyor to be stopped, for example in case of maintenance requirements or in case of defects. For example, in case of inspection works of a lubricating system, it can be necessary to stop the conveyor belt. Some minor maintenance works can often be sufficient for preventing some problems, or for improving the efficiency of the conveyor belt.

However, nowadays, it often requires stopping the conveyor belt from working during said small maintenance or inspection works. This is detrimental for the productivity of the conveyor belt. Therefore, no or substantially no regular inspection works are operated on treating/lubricating units, so as not to disturb the continuous working of the conveyor belt.

A first subject matter of the invention is a conveyor for which the access to the unit(s) or part thereof (such as the contacting face) is facilitated, whereby enabling easy maintenance works (cleaning, replacement, removing of large deposit of dust or other particles, etc.) to the unit or inspection, while the conveyor is still in movement/in working.

The nowadays automated systems have also several further disadvantages, among others:
  possible incidental interference between the working of the two fully automated system, meaning loss of lubricant and cleaning product;
  after a cleaning operation, possible less efficient operation of the full dry lubrication system, due to a mix of lubricant with aqueous cleaning composition;
  use of too large water excess in case of lubricant being supplied during a cleaning operation;
  requirement of a sectionalised full dry lubrication system;
  in case of conveyor moving with a non detected problem to one independent system, damages to the conveyor or conveyed goods and/or reduced efficiency are possible;
  formation of waxes or greasy or viscous deposits;
  etc.

Lubrication of conveyor belt can be operated as lubrication with large supplying rate of lubricant composition, or as dry lubrication with reduced supplying rate, the lubricant being supply at micro doses, for example by supplying drops of lubricant. Dry lubrication of a conveyor belt is for example known by dispensing very small liquid (non aqueous or substantially non aqueous) lubricant dose at appropriate frequency during the period of lubrication. The period of lubrication is for example determined by the time required for the belt to make a complete loop. The dry lubrication is advantageously a micro dry lubrication, with supply of doses as low as possible, while ensuring a good lubrication effect. The rate of supply of lubricant for a belt with a loop of 10 to 20 meters (or more) is for example comprised between 0.05 ml and 0.15 ml per hour.

Description of dry lubricant is for example given in EP2105494 and EP2105493, the content of which is incorporated by reference.

Another subject matter of the invention is thus to a system for dry lubricating and treating (such as wet cleaning or disinfecting) a moving conveyor, enabling to prevent any interference of the dry lubricant with the treatment medium (such as aqueous cleaning medium, disinfecting medium, etc.) enabling therefore a better dry lubrication, as well as a more efficient treatment (such as cleaning, disinfecting, . . . ) with less treatment medium (such as less cleaning medium, disinfecting medium, etc.).

Advantages of embodiments of the invention are:
  no interference between the full dry lubrication and the treating (cleaning, disinfecting) of the conveyor belt;
  enable an immediate efficient working of the full dry lubrication system after a treatment step (cleaning step, disinfecting step, etc.), for example after a pre-dry lubrication step;
  when using systems adapted to lubricate and treat (clean, disinfect, etc.) at different sections of the belt or belts, cleaning and lubrication, possibly pre-dry lubrication can be operated section by section;
  simple communication between the line process controller and the PLC controlling the treating (cleaning, disinfecting, etc.) operation as well as the full dry lubricating operation;
  increase efficiency of the transport band with less consumption of lubricant, as well as less treatment medium, rinsing medium, etc. (for example less water consumption) for cleaning the belt;
  etc.

BRIEF DESCRIPTION OF THE INVENTION

A subject matter of the invention is a moving conveyor ensuring at least a movement of at least one container according to a transport direction (P1), whereby said conveyor (1) comprises at least:

at least one endless conveyor belt (3) having a portion moving in the transport direction (P1), while another portion of the belt is moving in a return direction opposite to the transport position, a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction, at least one lubricant provider for providing the endless conveyor belt (3) with at least one lubricant, and at least a driving system for driving the conveyor belt along a continuous path comprising at least a first path portion moving in accordance to said transport direction (P1), and a second path portion of said at least one endless belt (3) moving in the return direction (P2), whereby said conveyor belt comprises at least:

(a) a transport surface (7) adapted to support the at least one container to be moved according to the transport direction (PI), and adapted to contact supporting elements for the portion moving in the return direction (P2);

(b) at least one guiding surface (10) opposite to the transport surface (7), whereby said at least one guiding surface (10) is adapted to have contact with at least one gliding face (11) of the guiding element, in which the moving conveyor comprises a system which comprises at least:

(a) a unit selected from the group consisting of (a1) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (a11) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$ along the substantially planar lubrication surface, recesses with an opening of less than 1000 mm$^2$ along the substantially planar lubrication surface, and grooves with an opening of less than 1000 mm$^2$ along the substantially planar lubrication surface, and (a12) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system, (a2) a treating unit distinct from the dry lubricating unit adapted to ensure at least a treatment step different from a dry lubrication step by contacting, when required, a part of the transport system at least with an active treatment element, and (a3) combinations thereof, and advantageously (b) a single programmable logic controller (PLC) comprising at least (b1) one friction controlling means for controlling the friction between the said one container and the transport surface (7) of the conveyor belt (3) (it means therefor that the friction controlling means is adapted to control the friction level of the transport surface of the belt); the said one friction controlling means generating at least one instruction selected among the group consisting of a lubrication instruction controlling the supply of lubricant to the outlet opening system of the dry lubricating unit, a treatment instruction for controlling the treatment step in the said treating unit, and combinations thereof, whereby a unit selected from the group consisting of the dry lubricating unit, the treating unit and combinations thereof is associated in a movable manner with the supporting system, without having to remove all the return supporting elements attached to the supporting system.

The unit can in this way be moved away at least partly from the moving belt, without having to stop the movement of the belt. The operator can in this way have easy access to at least a portion of the unit, for example a portion of the face of the unit contacting a face of the belt (3) during its return path (P2), for inspection purposes, for a cleaning operation or a maintenance operation or for the replacement of an element or for the repair of an element. The unit is preferably movable in such a way that, after being moved, a portion of the unit still act for bearing the belt during its return path (P2). For enabling an easier movement of the unit, an intermediate tool can be used for cooperating with supporting elements, for ensuring to displace away the moving belt from the unit to be replaced. After cleaning or maintenance operation or inspection, the tool(s) is/are removed. The tool(s) can be fixed on the supporting element and can be rotated between a first position in which the tool is not contacting the belt and a second position in which the tool is contacted with the belt during its return path.

According to an advantageous embodiment, a unit selected from the group consisting of the dry lubricating unit, the treating unit and combinations thereof is associated in an at least pivotable manner with the supporting system, without having to remove all the return supporting elements attached to the supporting system. For enabling an easier pivotment of the unit, an intermediate tool can be used for cooperating with supporting elements, for ensuring to displace away the moving belt from the unit to be replaced. After cleaning or maintenance operation, the tool(s) is/are removed. The tool(s) can be fixed on the supporting element and can be rotated between a first position in which the tool is not contacting the belt and a second position in which the tool is contacted with the belt during its return path.

Such a pivotment is advantageous as the unit is still attached to a supporting element, during a cleaning or maintenance operation or an inspection operation.

According to another advantageous embodiment, a unit selected from the group consisting of the dry lubricating unit, the treating unit and combinations thereof is associated in a removable manner with the supporting system, without having to remove all the return supporting elements attached to the supporting system.

This enables a quick removal of the unit, and a quick replacement of the unit. For enabling an easier replacement of the unit, an intermediate tool can be used for cooperating with supporting elements, for ensuring to displace away the moving belt from the unit to be replaced. After replacement, the tools are removed. The tool can be fixed on the supporting element and can be rotate between a first position in which the tool is not contacting the belt and a second position in which the tool is contacted with the belt during its return path.

Details and characteristics of the said first invention are:

the supporting system comprises a series of supporting elements distant from each other, said supporting elements comprising at least a first supporting element and a second supporting element, said first supporting element and said second supporting element while not being associated to one of the said unit being adapted for supporting at least a portion of the transport surface during the return path portion, whereby a unit selected from the said group consisting of the dry lubricating unit, the treating unit and combinations thereof comprises a body with at least a first bearing element adapted to rest on the first supporting element, and a second bearing element adapted to rest on the second supporting element, whereby said second bearing element is distant from the first bearing element.

the said first bearing element and second bearing element of the body are each provided with at least one contacting element with a contacting face having a sliding surface with low static and dynamic friction coefficients below 0.06 with respect to steel. Such a static and dynamic friction can be measured by Coefficient of Friction Tester (such as commercialised by Labthink (http://en.labthink.com/en-us/products/test-property/friction-tester.). Said coefficient being determined in a horizontal plane.

the said first bearing element and second bearing element of the body are each provided with at least one contacting element with a contacting face having a sliding surface with low static and dynamic friction coefficients below 0.05 with respect to steel.

The conveyor belt further comprises a friction measuring unit for measuring a parameter function of the friction of the transport surface (7) of the conveyor belt (3), said parameter being adapted for determining whether the friction is or not within an unacceptable friction range and/or within an acceptable friction range. Said friction measuring unit generates at least one friction related signal function of the said parameter. Said signal can for example be used for controlling the supply of lubricant or the working of the lubricant supplying system; and a control unit or PLC controlling at least a working of the unit selected from the group consisting of the dry lubricating unit, the treating unit and combination thereof, said control unit receiving one or more signals from the friction measuring unit, whereby ensuring the working of the unit selected from the group consisting of the dry lubrication unit or part thereof (lubricant supply system), the treating unit and combinations thereof, when at least a signal (or more signals) received by the control unit from the friction measuring unit is within the unacceptable friction range or outside the acceptable friction range.

the conveyor is a moving conveyor ensuring at least a movement of at least one container according to a transport direction (P1), whereby said conveyor (1) comprises at least:

at least one endless conveyor belt (3) having a portion moving in the transport direction (P1), while another portion of the belt is moving in a return direction opposite to the transport position, a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction, at least one lubricant provider for providing the endless conveyor belt (3) with at least one lubricant, and at least a driving system for driving the conveyor belt along a continuous path comprising at least a first path portion moving in accordance to said transport direction (P1), and a second path portion of said at least one endless belt (3) moving in the return direction (P2), whereby said conveyor belt comprises at least:

(a) a transport surface (7) adapted to support the at least one container to be moved according to the transport direction (PI), and adapted to contact supporting elements for the portion moving in the return direction (P2), (b) at least one guiding surface (10) opposite to the transport surface (7), whereby said at least one guiding surface (10) is adapted to have contact with at least one gliding face (11) of the guiding element, in which the moving conveyor comprises a system which comprises at least:

(a) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$ along the substantially planar lubrication surface, recesses with an opening of less than 1000 mm$^2$ along the substantially planar lubrication surface, and grooves with an opening of less than 1000 mm$^2$ along the substantially planar lubrication surface, and (a2) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system, (b) a treating unit distinct from the dry lubricating unit adapted to ensure at least a treatment step different from a dry lubrication step by contacting, when required, of a part of the conveyor belt or transport system at least with an active treatment element or agent, and advantageously (c) a single programmable logic controller (PLC) comprising at least (c1) one means for generating lubricating instructions for controlling the working of the said unit; and (c2) one means for generating at least one treatment instructions for controlling the unit, whereby a unit selected from the group consisting of the dry lubricating unit, the treating unit and combinations thereof is associated in a movable manner with the supporting system, without having to remove all the return supporting elements attached to the supporting system.

advantageously the single programmable logic controller (PLC) comprises at least (c1) one means for generating one or more lubricating instructions for controlling the supply of lubricant to the outlet opening system of the dry lubricating unit, especially the working or operating of the first supplying system; (c2) one means for generating at least one or more treatment instructions for controlling the treating unit; and (c3) one means for generating at least one or more preventing instructions for preventing the supply of lubricant to the outlet opening system or a dry lubrication step by the dry lubricating unit at least during a treatment step by the treating unit.

Advantageously, a unit selected from the group consisting of the dry lubricating unit, the treating unit and combinations thereof is associated in an at least pivotable manner with the supporting system, without having to remove all the return supporting elements attached to the supporting system.

Preferably, a unit selected from the group consisting of the dry lubricating unit, the treating unit and combinations thereof is associated in a removable manner with the supporting system, without having to remove all the return supporting elements attached to the supporting system.

The conveyor belt further comprises
a friction measuring unit for measuring a parameter function of the friction of the transport surface (7) of the conveyor belt (3), said parameter being adapted for determining whether the friction is or not within an unacceptable friction range and/or within an acceptable friction range, and
a control unit controlling at least a working of the unit selected from the group consisting of the dry lubricating unit, the treating unit, said control unit receiving signals from the friction measuring unit, whereby ensuring the working of the unit selected from the group consisting of the dry lubrication step, the treating unit and combinations thereof, when at least a signal received by the treating unit from the friction measuring unit is within the unacceptable friction range or outside the acceptable friction range.

The conveyor is a moving conveyor ensuring at least a movement of at least one container according to a transport direction (P1), whereby said conveyor (1) comprises at least:
at least one endless conveyor belt (3) having a portion moving in the transport direction (P1), while another portion of the belt is moving in a return direction opposite to the transport position,
a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction,
at least one lubricant provider for providing the endless conveyor belt (3) with at least one lubricant, and
at least a driving system for driving the conveyor belt along a continuous path comprising at least
a first path portion moving in accordance to said transport direction (P1), and a second path portion of said at least one endless belt (3) moving in the return direction (P2), whereby said conveyor belt comprises at least:
(a) a transport surface (7) adapted to support the at least one container to be moved according to the transport direction (PI), and adapted to contact supporting elements for the portion moving in the return direction (P2),
(b) at least one guiding surface (10) opposite to the transport surface (7), whereby said at least one guiding surface (10) is adapted to have contact with at least one gliding face (11) of the guiding element,
in which the moving conveyor comprises a system which comprises at least:
(a) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$ along the substantially planar lubrication surface, recesses with an opening of less than 1000 mm$^2$ along the substantially planar lubrication surface, and grooves with an opening of less than 1000 mm$^2$ along the substantially planar lubrication surface, and (a2) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system,
(b) a treating unit distinct from the dry lubricating unit adapted to ensure at least a treatment step different from a dry lubrication step by contacting, when required, a part of the conveyor belt or transport system at least with an active treatment element or agent, and
(c) a single programmable logic controller (PLC) comprising at least (c1) one friction control means for generating at least one or more lubricating instructions for controlling the supply of lubricant to the outlet opening system of the dry lubricating unit; and (c2) one means for generating at least one or more treatment instructions for controlling the said treating unit(s), whereby a unit selected from the group consisting of the dry lubricating unit, the treating unit and combinations thereof is associated in a movable manner with the supporting system, without having to remove all the return supporting elements attached to the supporting system, in which at least a treating unit distinct from the dry lubricating unit is adapted to ensure at least a treatment step different from a dry lubrication step by contacting, when required, a part of the transport system at least with an active treatment, and in which the single programmable logic controller (PLC) comprises at least (c1) one friction control means for generating at least one lubricating instruction for controlling the supply of lubricant to the outlet opening system of the dry lubricating unit; (c2) one means for generating at least one treatment instruction for controlling the treating unit for contacting, when required a part of the conveyor belt with the active treatment element; and (c3) one prevention means for generating at least one preventing instruction for preventing the supply of lubricant to the outlet opening system of the dry lubricating unit at least during a treatment step by the treating unit by contacting the conveyor belt with the active treatment element.

Advantageously, a unit selected from the group consisting of the dry lubricating unit, the treating unit and combinations thereof is associated in an at least pivotable manner with the supporting system, without having to remove all the return supporting elements attached to the supporting system.

Preferably, a unit selected from the group consisting of the dry lubricating unit, the treating unit and combinations thereof is associated in a removable manner with the supporting system, without having to remove all the return supporting elements attached to the supporting system.

the single programmable logic controller (PLC) comprises at least one means for generating at least one or more preventing instructions for preventing the supply of lubricant to the outlet opening of the dry lubrication unit at least during a treatment step, which is a means for at least one generating preventing instruction for preventing a dry lubrication step or a supply of lubricant to the outlet opening, advantageously at least 5 seconds before a start of a treatment step by the treating unit.

the treating unit comprises at least a microfibre electrostatic active treatment element mounted on a movable support between a first position in which the microfibre electrostatic active treatment element is contacting a part of the conveyor belt or transport system, and a second position in which the microfibre electrostatic active treatment element is away from the transport system or conveyor belt.

the treating unit comprise at least an unit for element applying, when required, at least a treatment medium comprising at least one active treatment ingredient on a part of the transport surface (7), said treating unit comprising (b1) at least one treatment outlet, advantageously outlet or spray nozzle, adapted for directing, advantageously directing or spraying, at least the treatment medium on a part of the transport surface away from the substantially planar lubrication surface, and/or (but advantageously and) (b2) a second supplying system comprising at least a second duct system different from the said first duct system, said second duct system connecting the at least one treatment outlet, advantageously outlet or spray nozzle, to a supply means for the treatment medium, said supply means being adapted for ensuring the said treatment medium to be transported towards the said at least one treatment outlet or nozzle outlet or spray nozzle.

the conveyor further comprises a rinsing unit for ensuring a rinsing step for at least a part of the conveyor belt previously treated by the treating unit with the treatment medium, said rinsing unit comprising:
  at least one outlet or spray nozzle adapted for directing or spraying an aqueous rinsing medium on a part of the conveyor belt previously treated by the treating unit;
  a supply means for providing said aqueous rinsing medium under pressure to the said at least one outlet or spray nozzle, in which the at least one prevention means for generating at least one preventing instruction (or more) for preventing the supply of lubricant to the outlet opening system of the dry lubricating unit, for example at least during a treatment step by one or more treating units, is selected from the group consisting of a means for generating at least one preventing instruction (or more) for preventing the supply of lubricant to the outlet opening of the dry lubricating unit advantageously at least 5 seconds after the end of a rinsing step following the end of a treatment step by the treating unit, and a means for generating an initiating instruction for initiating a supply of lubricant to the outlet opening of the dry lubricating unit advantageously at least 5 seconds after the end of a rinsing step following the end of a treatment step by the treating unit.

the dry lubricating unit is a dry lubricating unit adapted to ensure a dry lubrication by applying intermittently a micro dose of a lubricant on a part of the transport surface (7) of the conveyor belt (3) during a part of the second path portion of the conveyor belt moving in the return direction.

the dry lubricating unit is a dry lubricating unit adapted to ensure a dry lubrication by applying a micro dose of a lubricant on a part of the transport surface (7) of the conveyor belt (3) during a part of the second path portion of the conveyor belt moving in the return direction, as well on a part of the guiding surface (10) of the conveyor belt (3), advantageously during a part of the second path portion of the conveyor belt moving in the return direction.

the treating unit comprises at least a dry, semi-dry or wet treating unit adapted to ensure at least a dry, semi-dry or wet treatment step by applying, when required, at least a medium, advantageously an aqueous treating medium, on a part of the transport surface (7), as well on a part of the guiding surface (10) during at least a part of the path of the conveyor belt (3), such as a part of the path of the conveyor belt moving in the transport direction and/or moving in the return direction.

the treating unit comprises at least a dry, semi dry or wet treating unit adapted to ensure (a) at least a treatment step by applying, when required, at least a treatment medium, advantageously an aqueous treatment medium, on a part of the transport surface (7), as well as on a part of the guiding surface (10) during a part of the second path portion of the conveyor belt (3) moving in the return direction, and (b) at least a rinsing step by applying an aqueous rinsing medium on a part of the transport surface (7), as well on a part of the guiding surface (10) during a part of the path portion of the conveyor belt (3) moving in the transport direction or in the return direction.

the treating unit is a $CO_2$ solid particles blasting unit adapted for expelling through the said at least one outlet or nozzle $CO_2$ solid particles on a part of the conveyor belt (3).

the system further comprises: (d) a drying unit for ensuring a drying step of a part of the transport surface (7), as well advantageously of a part of the guiding surface (10), said drying unit being advantageously adapted for ensuring a drying step of a part of the transport surface previously submitted to a treatment step, and
  in which the single programmable logic controller (PLC) is further comprising (c4) at least one means for generating at least one drying program instruction for controlling the drying step, and (c5) one means for generating at least one preventing instruction for preventing, during a drying step, at least one process step selected from the group consisting of a dry lubrication step and a treating step.

the treating unit comprises a sanitizing unit, advantageously selected from the group consisting of an ionizing unit and/or a UV emitting unit adapted when required to emit ions/UV on a part of the transport system.

the system further comprises: (d) a drying unit for ensuring a drying step of a part of the transport surface (7), as well advantageously of a part of the guiding surface (10), said drying unit being advantageously adapted for ensuring a drying step of a part of the transport surface previously submitted to a treatment step and a rinsing step, and
  in which the single programmable logic controller (PLC) is further comprising (c4) at least one means for generating at least one drying program instruction for controlling the drying step, and (c5) one means for generating at least one preventing instruction for preventing, during a drying step, at least one process step selected from the group consisting of a dry lubrication step, a treating step and a rinsing step.

the dry lubricating unit and the treating unit are located the one with respect to the other with respect to the path of the endless belt (3) so that the dry lubricating unit has a lubricating surface contacting a part of the endless belt (3) during the second path portion of said at least one endless belt (3) moving in the return direction (P2), while the treating unit is adapted for treating a part of the endless belt (3) during the first path portion of said endless belt moving in the transport direction.

the dry lubricating unit and the treating unit are located the one with respect to the other with respect to the path of the endless belt (3) so that the dry lubricating unit has a lubricating surface contacting a part of the endless belt (3) during the second path portion of said at least one endless belt (3) moving in the return direction (P2), while the treating unit is adapted for treating a part of the endless belt (3) during the second path portion of said endless belt moving in the return direction, whereby the dry lubricating unit is located backwards the treating unit with respect to the return direction.

the dry lubricating unit and the treating unit form one single assembly, and.

the conveyor is a moving conveyor ensuring at least a movement of at least one container according to a transport direction (P1), whereby said conveyor (1) comprises at least:
  at least one endless conveyor belt (3) having a portion moving in the transport direction (P1), while another portion of the belt is moving in a return direction opposite to the transport position,
  a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction,
  at least one lubricant provider for providing the endless conveyor belt (3) with at least one lubricant, and
  at least a driving system for driving the conveyor belt along a continuous path comprising at least
  a first path portion moving in accordance to said transport direction (P1), and a second path portion of said at least one endless belt (3) moving in the return direction (P2),
  whereby said conveyor belt comprises at least:
  (a) a transport surface (7) adapted to support the at least one container to be moved according to the transport direction (PI), and adapted to contact supporting elements for the portion moving in the return direction (P2),
  (b) at least one guiding surface (10) opposite to the transport surface (7), whereby said at least one guiding surface (10) is adapted to have contact with at least one gliding face (11) of the guiding element,
  in which the moving conveyor comprises a system which comprises at least:
  (a) a unit selected from the group consisting of
  (a1) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (a11) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$ along the substantially planar lubrication surface, recesses with an opening of less than 1000 mm$^2$ along the substantially planar lubrication surface, and grooves with an opening of less than 1000 mm$^2$ along the substantially planar lubrication surface, and (a12) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system, (a2) a treating unit distinct from the dry lubricating unit adapted to ensure at least a treatment step different from a dry lubrication step by contacting, when required, a part of the transport system at least with an active treatment element, and (a3) combinations thereof, and (b) advantageously a single programmable logic controller (PLC) comprising at least (c1) one means for generating lubricating instructions for controlling the working of the said unit; and (c2) one means for generating at least one treatment instructions for controlling the unit, whereby a unit selected from the group consisting of the dry lubricating unit, the treating unit and combinations thereof is associated in a movable manner with the supporting system, without having to remove all the return supporting elements attached to the supporting system, and whereby at least one of the said return supporting element is provided with a first contacting zone for the belt (3) during its second path (P2) and a contacting tool defining at least a second contacting zone for the belt (3) during its second path, whereby at least the contacting tool is movable between a first position in which during its second path (P2), the conveyor belt (3) contacts the second contacting zone and not the first contacting zone, and a second position in which during its second path (P2), the conveyor belt (3) contacts at least the contacting zone.

Advantageously, the contacting tool is mounted movable with respect to a supporting element, and/or the contacting tool is attached to a supporting element, whereby said supporting element is rotatable so as to ensure the movement of the contacting tool between its first position and its second position.

the moving conveyor is a moving conveyor ensuring at least a movement of at least one container according to a transport direction (P1), whereby said conveyor (1) comprises at least:

at least one endless conveyor belt (3) having a portion moving in the transport direction (P1), while another portion of the belt is moving in a return direction opposite to the transport position, a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction, at least one lubricant provider for providing the endless conveyor belt (3) with at least one lubricant, and at least a driving system for driving the conveyor belt along a continuous path comprising at least a first path portion moving in accordance to said transport direction (P1), and a second path portion of said at least one endless belt (3) moving in the return direction (P2), whereby said conveyor belt comprises at least:

(a) a transport surface (7) adapted to support the at least one container to be moved according to the transport direction (PI), and adapted to contact supporting elements for the portion moving in the return direction (P2), (b) at least one guiding surface (10) opposite to the transport surface (7), whereby said at least one guiding surface (10) is adapted to have contact with at least one gliding face (11) of the guiding element, in which the moving conveyor comprises a system which comprises at least:

(a) a unit selected from the group consisting of (a1) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (a11) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$ along the substantially planar lubrication surface, recesses with an opening of less than 1000 mm$^2$ along the substantially planar lubrication surface, and grooves with an opening of less than 1000 mm$^2$ along the substantially planar lubrication surface, and (a12) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system, (a2) a treating unit distinct from the dry lubricating unit adapted to ensure at least a treatment step different from a dry lubrication step by contacting, when required, a part of the transport system at least with an active treatment element, and (a3) combinations thereof, whereby a unit selected from the group consisting of the dry lubricating unit, the treating unit and combinations thereof is associated in a movable manner with the supporting system, without having to remove all the return supporting elements attached to the supporting system, and whereby at least one of the said return supporting element is provided maintaining element adapted for cooperating with the movable unit, said maintaining element being movable between a first position in which the unit is prevented from being moved with respect to the supporting element provided with the maintaining element and a second position in which the unit is able to be moved with respect to the said supporting element provided with the maintaining element.

Advantageously, the supporting element provided with the maintaining element is mounted rotatable between a first position in which the maintaining element is its first position and a second position in which the maintaining element is in its second position.

combinations thereof.

The invention relates also to the use of such a conveyor, having one or more of the above characteristics.

In particular, a method of the invention is a method for dry lubricating and for treating a moving conveyor ensuring at least a movement of at least one container according to a transport direction (P1), whereby said conveyor (1) comprises at least:
- at least one endless conveyor belt (3) having a portion moving in the transport direction (P1), while another portion of the belt is moving in a return direction opposite to the transport position,
- a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction,
- at least one lubricant provider for providing the endless conveyor belt (3) with at least one lubricant, and
- at least a driving system for driving the conveyor belt along a continuous path comprising at least a first path portion moving in accordance to said transport direction (P1), and a second path portion of said at least one endless belt (3) moving in the return direction (P2), whereby said conveyor belt comprises at least:

(a) a transport surface (7) adapted to support the at least one container to be moved according to the transport direction (PI), and adapted to contact supporting elements for the portion moving in the return direction (P2), (b) at least one guiding surface (10) opposite to the transport surface (7), whereby said at least one guiding surface (10) is adapted to have contact with at least one gliding face (11) of the guiding element, in which the moving conveyor comprises a system which comprises at least:

(a) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$ along the substantially planar lubrication surface, recesses with an opening of less than 1000 mm$^2$ along the substantially planar lubrication surface, and grooves with an opening of less than 1000 mm$^2$ along the substantially planar lubrication surface, and (a2) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system, (b) a treating unit distinct from the dry lubricating unit adapted to ensure at least a treatment step different from a dry lubrication step by contacting, when required, a part of the transport system at least with an active treatment element or agent, and (c) a single programmable logic controller (PLC) comprising at least (c1) one means for generating lubricating instructions for controlling the working of the said unit; and (c2) one means for generating at least one treatment instructions for controlling the unit, whereby a unit selected from the group consisting of the dry lubricating unit, the treating unit and combinations thereof is associated in a movable manner with the supporting system, without having to remove all the return supporting elements attached to the supporting system, and (d) a friction measuring unit for measuring a parameter function of the friction of the transport surface (7) of the conveyor belt (3), said parameter being adapted for determining whether the friction is or not within an unacceptable friction range and/or within an acceptable friction range, whereby said method comprises at least the following generating instructions steps:

determining a parameter function of the friction of the transport surface (7) of the conveyor belt (3);

transferring said parameter to the control unit or single programmable logic controller;

generating lubricating instructions by the control unit or single programmable logic controller for controlling the dry lubricating unit, when the parameter function of the transport surface is within an unacceptable friction range or is outside an acceptable friction range;

generating treating instructions by the control unit or single programmable logic controller for controlling the treating unit, advantageously before starting a lubrication; and generating at least one preventing instruction by the control unit of single programmable logic controller for preventing a dry lubrication step at least during a treatment step.

When using in the method supporting element(s) provided with contacting tool(s), the contacting tool can be moved so that the belt only contacts the second contacting zone and not the first contacting zone, whereby ensuring a free space between the belt and the lubricating unit or the treating unit, whereby rendering the cleaning works or the maintenance works of the said unit(s) easier.

The invention relates further to a system for dry lubricating and for treating such as wet cleaning a moving conveyor ensuring at least a movement of at least one container according to a transport direction (P1), whereby said conveyor (1) comprises at least:
- at least one endless conveyor belt (3),
- at least one guiding element with at least one gliding face (11) for said at least one endless conveyor belt (3), said at least one guiding element being adapted for guiding the at least one endless conveyor belt at least partly in the transport direction (P1),
- at least one lubricant provider for providing the endless conveyor belt (3) with at least one lubricant, and
- at least a driving system for driving the conveyor belt along a continuous path comprising at least a first path portion moving in accordance to said transport direction (P1), and a second path portion of said at least one endless belt (3) moving in a return direction (P2), whereby said conveyor belt comprises at least:
- a transport surface (7) adapted to support the at least one container to be moved according to the transport direction, and
- at least one guiding surface (10) opposite to the transport surface (7), whereby said at least one guiding surface (10) is adapted to have contact with at least one gliding face (11) of the guiding element, in which the system comprises at least:
(a) a lubricating unit (advantageously a dry lubricating unit adapted to ensure a lubrication (advantageously a dry lubrication) by applying a dose (advantageously a micro dose) of a lubricant on a part of the transport surface (7) of the conveyor belt (3) during a part of the second path portion of the conveyor belt moving in the return direction, said dry lubricating unit comprising (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 $mm^2$, advantageously less than 500 $mm^2$, preferably less than 100 $mm^2$, such as less than 50 $mm^2$ (such as 10 $mm^2$ or less, such as 3 $mm^2$, 1 $mm^2$ or even less) along the substantially planar lubrication surface, recesses with an opening of less than 1000 $mm^2$, advantageously less than 500 $mm^2$, preferably less than 100 $mm^2$, such as less than 50 $mm^2$ (advantageously less than 10 $mm^2$, such as 5 $mm^2$, 3 $mm^2$, preferably less than 1 $mm^2$) along the substantially planar lubrication surface, and grooves with an opening of less than 1000 $mm^2$ (for example advantageously with a width of less than 5 mm), advantageously less than 500 $mm^2$, preferably less than 100 $mm^2$, such as less than 50 $mm^2$ (advantageously less than 30 $mm^2$) along the substantially planar lubrication surface, and (a2) a first supplying system comprising at least a first pump and a first duct system for connecting the first pump to the inlet channel section of the at least one inner channel of the lubrication body, whereby said first supplying system is adapted for ensuring a supply of a dose (advantageously a micro dose) of the lubricant to the outlet opening system,
(b) advantageously a treating unit distinct from the lubricating unit (advantageously the dry lubricating unit) adapted to ensure at least a treatment step different from a lubrication step, advantageously different from the dry lubrication step, by contacting, when required, a part of the transport system at least with an active treatment element (for example a liquid, semi liquid or dry treatment medium, ionisation, absorbing support, dry dust cleaning elements, etc.) (said treatment step being advantageously adapted or applying, when required, at least a treatment medium comprising at least one active treatment ingredient on a part of the transport surface (7), said treating unit comprising (b1) at least one treatment outlet or outlet or spray nozzle adapted for directing or directing or spraying at least the treatment medium on a part of the transport surface away from the substantially planar lubrication surface, and/or (but advantageously) (b2) a second supplying system comprising at least a second duct system different from the said first duct system, said second duct system connecting the at least one treatment outlet or outlet or spray nozzle to a supply means for the treatment medium, said supply means being adapted for ensuring the said treatment medium to be transported towards the said at least one treatment outlet or nozzle).

The system of the invention further comprises one or more of the following elements or units:
a single programmable logic controller (PLC) comprising at least (c1) one means for generating lubricating instructions for controlling the lubrication unit, advantageously the dry lubricating unit; (c2) advantageously one means for generating at least one treatment instruction for controlling the treating unit for contacting, when required, a part of the transport system with the active treatment element, and (c3) one means for generating at least one preventing instruction for preventing a lubrication step (advantageously a dry lubrication step) by the lubrication unit (advantageously the dry lubricating unit) at least during a treatment step by the treating unit, and/or
a drying unit for ensuring a drying step of a part of the transport surface (7), as well as advantageously of a part of the guiding surface (10), said drying unit being advantageously adapted for ensuring a drying step of a part of the transport surface previously submitted to a treatment step, especially to a wet treatment step, semi wet treatment step, a dry treatment system, especially to an aqueous wet treatment step, and/or
a treating unit distinct from the lubricating unit (advantageously distinct from the dry lubricating unit) adapted to ensure at least a treatment step different from a lubrication step (advantageously from the dry lubrication step), said treating unit comprises at least a microfibre electrostatic active treatment element mounted on a movable support between a first position in which the microfibre electrostatic active treatment element is contacting a part of transport system, and a second position in which the microfibre electrostatic active treatment element is away from the transport system, and/or
a friction measuring unit for measuring at least one parameter function of the friction of the transport surface (7) of the conveyor belt, said parameter being adapted for determining whether the friction of the transport surface (7) is or not within an acceptable friction range and/or within an acceptable friction range (for example greater than a threshold value), and/or
a control unit controlling at least the working of the lubricating unit (advantageously the dry lubricating unit) and/or treating unit, said control unit receiving signals from the friction measuring unit, whereby ensuring a lubrication step or a dry lubrication step (possibly after a cleaning step) and/or one or more treatment steps (such as a cleaning step and/or a drying step), when one or more signals received from the friction measuring unit is/are within an unacceptable friction range and/or is/are outside an acceptable friction range (for example above a predetermined value. The control unit can also determine an average of the friction coefficient or parameter, for example average on a period of 5 to 30 minutes. Said average can also be determined substantially in continue or in semi continue or based on intermittent value, so as to determine a variation of friction, as parameter to be compared with a predetermined range or a threshold value), and/or
the treatment unit is adapted to ensure a treatment by supplying treatment medium on a part of the transport surface (7) of the conveyor belt (3) during a part of the second path portion of the conveyor belt moving in the return direction, said treatment unit comprising (a1) a first treatment body with a substantially planar treatment surface adapted for contacting said part of the transport surface (7) of the conveyor belt (3) during a part of the second path portion of the conveyor belt moving in the return direction, said treatment body having at least one inner channel system extending within the body between an inlet channel section and an outlet opening system located along the substantially planar lubrication surface of the body, and (a2) a connection system for connecting the at least one inlet channel section to a first supplying system comprising at least a means for supplying the treatment medium under pressure and a first duct system for connecting the means for supplying the treatment medium under pressure to the inlet channel section of the at least one inner channel of the treatment body, whereby said first supplying system is adapted for ensuring a supply of treatment medium to the outlet opening system, (whereby the treatment body is advantageously further provided with an inner channel with a first opening adapted to be connected to a supplying means for a treatment medium, possibly a lubricant medium, and at least one second opening adapted to be connected to a movable or removable treatment system, between a first position in which the treatment system is suitable for treating at least a portion of the conveyor belt, advantageously of the guiding surface (10), advantageously during the second path portion of the belt (3), and a second position in which at least a portion of the treatment system is away from the portion of the conveyor belt to be treated), and/or a treating unit distinct from the lubricating unit (distinct from the dry lubricating unit) adapted to ensure at least a treatment step different from a lubrication step (different from the dry lubrication step) by applying, when required, at least a treatment medium comprising at least one active treatment ingredient on a part of the transport surface (7), said treating unit comprising advantageously (b1) at least one treatment outlet or outlet or head or spray nozzle adapted for directing or spraying at least the treatment medium on a part of the transport surface away from the substantially planar lubrication surface, and/or (but advantageously) (b2) a second supplying system comprising at least a second duct system different from the said first duct system, said second duct system connecting the at least one treatment outlet or outlet or spray nozzle to a supply means for the treatment medium, said supply means being adapted for ensuring the said treatment medium to be transported towards the said at least one treatment nozzle, in which the treating unit is a sublimatable particles (like ice particles, especially $CO_2$ solid particles) blasting unit adapted for expelling through the said at least one outlet sublimatable (like ice, $CO_2$) solid particles on a part of the conveyor belt (3), said sublimatable (like ice, $CO_2$ solid particles) solid particles supply means comprises advantageously a gas supply means, such as an air supply means for conveying sublimatable solid particles towards the outlet or outlet or spray nozzle(s) and for impelling the sublimatable solid particles onto the surface to be treated (the sublimatable (like ice, $CO_2$) solid or semi solid particles or part thereof being advantageously sublimated when contacting the surface to be treated), and a device for transforming one or more solid sublimatable (like ice or $CO_2$) bloc(s) into sublimatable (like ice, $CO_2$) solid particles having the required particle size, such as a size below 5 mm, advantageously below 3 mm, such as comprised between 0.5 mm and 2 mm, and/or (preferably) a combination thereof.

The invention relates also to a system for lubricating, advantageously dry lubricating, and for treating a moving conveyor ensuring at least a movement of at least one container according to a transport direction (P1), whereby said conveyor (1) comprises at least:

at least one endless conveyor belt (3), at least one guiding element with at least one gliding face (11) for said at least one endless conveyor belt (3), said at least one guiding element being adapted for guiding the at least one endless conveyor belt at least partly in the transport direction (P1), at least one lubricant provider for providing the endless conveyor belt (3) with at least one lubricant, and at least a driving system for driving the conveyor belt along a continuous path comprising at least a first path portion moving in accordance to said transport direction (P1), and a second path portion of said at least one endless belt (3) moving in a return direction (P2), whereby said conveyor belt comprises at least:

a transport surface (7) adapted to support the at least one container to be moved according to the transport direction, and at least one guiding surface (10) opposite to the transport surface (7), whereby said at least one guiding surface (10) is adapted to have contact with at least one gliding face (11) of the guiding element, in which the system comprises at least:

(a) a lubricating unit (advantageously a dry lubricating unit) adapted to ensure a lubrication (advantageously a dry lubrication) by applying a dose (advantageously a micro dose) of a lubricant on a part of the transport surface (7) of the conveyor belt (3) during a part of the second path portion of the conveyor belt moving in the return direction, said lubricating unit (advantageously dry lubricating unit) comprising (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising advantageously at least one element selected from the group consisting of apertures with an opening of less than 1000 $mm^2$, advantageously less than 500 $mm^2$, preferably less than 100 $mm^2$, such as less than 50 $mm^2$ along the substantially planar lubrication surface, recesses with an opening of less than 1000 $mm^2$, advantageously less than 500 $mm^2$, preferably less than 100 $mm^2$, such as less than 50 $mm^2$ along the substantially planar lubrication surface, and grooves with an opening of less than 100 $mm^2$, advantageously less than 50 $mm^2$, preferably less than 10 $mm^2$, such as less than 5 $mm^2$ along the substantially planar lubrication surface, and (a2) a first supplying system comprising at least a first pump and a first duct system for connecting the first pump to the inlet channel section of the at least one inner channel of the lubrication body, whereby said first supplying system is adapted for ensuring a supply of a dose, advantageously a micro dose of the lubricant to the outlet opening system,
(b) a treating unit distinct from the lubricating unit (distinct from dry lubricating unit) adapted to ensure at least a treatment step different from a lubrication step (different from the dry lubrication step) by contacting, when required, a part of the transport system at least with an active treatment element, preferably by applying, when required, at least a treatment medium comprising at least one active treatment ingredient on a part of the transport surface (7), said treating unit comprising advantageously (b1) at least one treatment outlet or outlet or spray nozzle adapted for directing or spraying at least the treatment medium on a part of the transport surface away from the substantially planar lubrication surface, and/or (but advantageously and) (b2) a second supplying system comprising at least a second duct system different from the said first duct system, said second duct system connecting the at least one treatment outlet or outlet or spray nozzle to a supply means for the treatment medium, said supply means being adapted for ensuring the said treatment medium to be transported towards the said at least one treatment nozzle, in which the treating unit is a $CO_2$ solid particles (possibly as ice) blasting unit adapted for expelling through the said at least one outlet $CO_2$ solid particles on a part of the conveyor belt (3).

Said $CO_2$ solid particles supply means comprises advantageously a gas supply means, such as an air supply means for conveying solid $CO_2$ solid particles towards the outlet or outlet or spray nozzle(s) and for impelling the solid $CO_2$ solid particles onto the surface to be treated (the $CO_2$ solid particles or part thereof being advantageously sublimated when contacting the surface to be treated), and a device for transforming one or more solid $CO_2$ bloc(s) into $CO_2$ solid particles having the required particle size, such as a size below 5 mm, advantageously below 3 mm, such as comprised between 0.5 mm and 2 mm.

The invention further relates to a system for lubricating, advantageously dry lubricating and for treating a moving conveyor ensuring at least a movement of at least one container according to a transport direction (P1), whereby said conveyor (1) comprises at least:
- at least one endless conveyor belt (3),
- at least one guiding element with at least one gliding face (11) for said at least one endless conveyor belt (3), said at least one guiding element being adapted for guiding the at least one endless conveyor belt at least partly in the transport direction (P1),
- at least one lubricant provider for providing the endless conveyor belt (3) with at least one lubricant, and
- at least a driving system for driving the conveyor belt along a continuous path comprising at least a first path portion moving in accordance to said transport direction (P1), and a second path portion of said at least one endless belt (3) moving in a return direction (P2), whereby said conveyor belt comprises at least:
- a transport surface (7) adapted to support the at least one container to be moved according to the transport direction, and
- at least one guiding surface (10) opposite to the transport surface (7), whereby said at least one guiding surface (10) is adapted to have contact with at least one gliding face (11) of the guiding element, in which the system comprises at least:
(a) a lubricating unit (advantageously dry lubricating unit) adapted to ensure a lubrication, advantageously a dry lubrication, by applying a dose, advantageously a micro dose, of a lubricant on a part of the transport surface (7) of the conveyor belt (3) during a part of the second path portion of the conveyor belt moving in the return direction, said lubricating unit or dry lubricating unit comprising (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 $mm^2$, advantageously less than 500 $mm^2$, preferably less than 100 $mm^2$, such as less than 50 $mm^2$ along the substantially planar lubrication surface, recesses with an opening of less than 1000 $mm^2$, advantageously less than 500 $mm^2$, preferably less than 100 $mm^2$, such as less than 50 $mm^2$ along the substantially planar lubrication surface, and grooves with an opening of less than 1000 $mm^2$, advantageously less than 500 $mm^2$, preferably less than 100 $mm^2$, such as less than 50 $mm^2$ along the substantially planar lubrication surface, and (a2) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system,
(b) a treating unit distinct from the lubricating unit, advantageously an unit distinct from the dry lubricating unit, adapted to ensure at least a treatment step different from the lubrication step, advantageously dry lubrication step, by contacting, when required, a part of the transport system at least with an active treatment element, preferably by applying, when required, at least a treatment medium comprising at least one active treatment ingredient on a part of the transport surface (7), said treating unit comprising then preferably (b1) at least one treatment outlet or outlet or spray nozzle adapted for directing or directing or spraying at least the treatment medium on a part of the transport surface away from the substantially planar lubrication surface, and/or (but advantageously and) (b2) a second supplying system comprising at least a second duct system different from the said first duct system, said second duct system connecting the at least one treatment outlet or spray nozzle to a supply means for the treatment medium, said supply means being adapted for ensuring the said treatment medium to be transported towards the said at least one treatment outlet or nozzle, and
(c) a drying unit for ensuring a drying step of a part of the transport surface (7), as well advantageously of a part of the guiding surface (10), said drying unit being advantageously adapted for ensuring a drying step of a part of the transport surface previously submitted to a treatment step. Such a drying step is interesting in order to lubricate/dry lubricate a dry or substantially dry part of the transport surface.

According to an advantageous embodiment of one of the above subject matters of the invention, the means for generating at least one instruction for preventing a dry lubrication step at least during a cleaning step is a means for generating at least one preventing instruction for preventing a dry lubrication step advantageously at least 5 seconds before a start of a treatment step by the treating unit.

The system of the different subject matters of the invention has advantageously one or more of the following characteristics, preferably a combination of two or more of the following characteristics:

the system further comprises a rinsing unit for ensuring a rinsing step for at least a part of the conveyor belt previously treated by the treating unit with the treatment medium, said rinsing unit comprising:
- at least one outlet or spray nozzle adapted for directing or spraying an aqueous rinsing medium on a part of the conveyor belt previously treated by the treating unit;
- a supply means for providing said aqueous rinsing medium under pressure to the said at least one outlet or spray nozzle;
- in which the at least one means for generating at least one preventing instruction for preventing a dry lubrication step at least during a treatment step is a means for generating at least one preventing instruction for preventing a dry lubrication step advantageously at least 5 seconds after the end of a rinsing step following the end of a treatment step by the treating unit or a means for generating an initiating instruction for initiating a dry lubrication step advantageously at least 5 seconds (such as 5 to 60 seconds) after the end of a rinsing step following the end of a treatment step by the treating unit; and/or the lubricating unit or the dry lubricating unit is a lubricating unit or dry lubricating unit adapted to ensure a lubrication or dry lubrication by applying intermittently a dose or a micro dose of a lubricant on a part of the transport surface (7) of the conveyor belt (3) during a part of the second path portion of the conveyor belt moving in the return direction; and/or the lubricating unit or dry lubricating unit is a lubricating unit or a dry lubricating unit adapted to ensure a lubrication or dry lubrication by applying a dose or micro dose of a lubricant on a part of the transport surface (7) of the conveyor belt (3) during a part of the second path portion of the conveyor belt moving in the return direction, as well on a part of the guiding surface (10) of the conveyor belt (3), advantageously during a part of the second path portion of the conveyor belt moving in the return direction; and/or the lubricating unit or the dry lubricating unit has a body lubricating surface (71) adapted to contact at least a part of the transport surface (7) of the conveyor belt (3) during a part of the second path portion of the conveyor belt during the return movement, whereby the lubricating unit or dry lubricating unit is adapted for supplying a dose or a micro dose of lubricant onto the body lubricating surface (71) so as to ensure a dry lubrication of a part of the transport surface (7) of the conveyor belt (3) during a part of the second path portion of the conveyor belt moving in the return direction, whereby ensuring also a lubrication or dry lubrication of the guiding surface (10) of the conveyor belt (3) in contact with a part of the transport surface being in contact at least partly be in contact with the body lubricating surface (71), advantageously during a part of the second path portion of the conveyor belt moving in the return direction; and/or the treating unit is or comprises at least a wet treating unit adapted to ensure at least a wet treatment step by applying, when required, at least an aqueous treating medium on a part of the transport surface (7), as well on a part of the guiding surface (10) during at least a part of the path of the conveyor belt (3), such as a part of the path of the conveyor belt moving in the transport direction and/or moving in the return direction; and/or the treating unit is a dry/semi dry/wet treating unit adapted to ensure at least a dry/semi dry/wet treatment step by applying, when required, at least a treating unit/an aqueous treating medium on a part of the transport surface (7), as well on a part of the guiding surface (10) during at least a part of the second path portion of the conveyor belt (3) moving in the return direction; and/or the treating unit is a dry/semi dry/wet treating unit adapted to ensure (a) at least a treatment step by applying, when required, at least a treatment medium/an aqueous treatment medium on a part of the transport surface (7), as well as on a part of the guiding surface (10) during a part of the second path portion of the conveyor belt (3) moving in the return direction, and (b) at least a rinsing step by applying an aqueous rinsing medium on a part of the transport surface (7), as well on a part of the guiding surface (10) during a part of the path portion of the conveyor belt (3) moving in the transport direction or in the return direction; and/or the means for generating at least one preventing instruction is a means for generating at least one preventing instruction for preventing a lubrication step or a dry lubrication step at least during steps selected from the group consisting of treating steps and rinsing steps of a part of the conveyor belt (3); and/or the treating unit is/comprises a unit for contacting a part of the transport surface with a cold gaseous medium (like nitrogen or $CO_2$) having for example a temperature of less than 0° C., advantageously less than −10° C., preferably less than −20° C.; and/or the treating unit is/comprises a unit for contacting a part of the transport surface with a high pressurised liquid, such as high pressurised water, said unit being advantageously adapted for forming substantially a continuous curtain of pressurised water impacting a part of the transport surface along substantially all its width; and/or the treating unit is/comprises at least one non-woven cleaning element, such as sheet or sheet portions, possibly forming a kind of brush, said cleaning element being for example of the type disclosed in U.S. Pat. No. 3,629,047, U.S. Pat. No. 5,144,729, WO204/073480, or of the type marketed under the trademarks SWIFFER® or Pledge Grab-It®; and/or the treating unit is/comprises at least one ionising unit adapted when required to emit ions on a part of the transport surface (7); and/or the treating unit is a $CO_2$ solid particles blasting unit adapted for expelling through the said at least one outlet or nozzle $CO_2$ solid particles on a part of the conveyor belt (3); and/or the system further comprises: (d) a drying unit for ensuring a drying step of a part of the transport surface (7), as well advantageously of a part of the guiding surface (10), said drying unit being advantageously adapted for ensuring a drying step of a part of the transport surface previously submitted to a treatment step, and in which the single programmable logic controller (PLC) is further comprising (c4) at least one means for generating at least one drying program instruction for controlling the drying step, and (c5) one means for generating at least one preventing instruction for preventing, during a drying step, at least one process step selected from the group consisting of a dry lubrication step and a treating step; and/or the system further comprises: (d) a drying unit for ensuring a drying step of a part of the transport surface (7), as well advantageously of a part of the guiding surface (10), said drying unit being advantageously adapted for ensuring a drying step of a part of the transport surface previously submitted to a treatment step, and in which the single programmable logic controller (PLC) is further comprising (c4) at least one means for generating at least one drying program instruction for controlling the drying step, and (c5) one means for generating at least one preventing instruction for preventing, during a drying step and advantageously at least 3 seconds after the end of a drying step, at least one process step selected from the group consisting of a lubrication step or dry lubrication step and a treating step with a liquid or semi liquid medium or for generating an initiating at least one process step selected from the group consisting of a lubrication step or dry lubrication step and a treating step with a liquid or semi liquid medium advantageously at least 3 seconds (such as 5 to 60 seconds) after the end of the drying step; and/or the system further comprises: (d) a drying unit for ensuring a drying step of a part of the transport surface (7), as well advantageously of a part of the guiding surface (10), said drying unit being advantageously adapted for ensuring a drying step of a part of the transport surface previously submitted to a treatment step and a rinsing step, and in which the single programmable logic controller (PLC) is further comprising (c4) at least one means for generating at least one drying program instruction for controlling the drying step, and (c5) one means for generating at least one preventing instruction for preventing, during a drying step, at least one process step selected from the group consisting of a lubrication step or dry lubrication step, a treating step and a rinsing step; and/or the dry lubricating unit and the treating unit are located the one with respect to the other with respect to the path of the endless belt (3) so that the dry lubricating unit has a lubricating surface contacting a part of the endless belt (3) during the second path portion of said at least one endless belt (3) moving in the return direction (P2), while the treating unit is adapted for treating a part of the endless belt (3) during the first path portion of said endless belt moving in the transport direction; and/or the lubricating unit (advantageously the dry lubricating unit) and the treating unit are located the one with respect to the other with respect to the path of the endless belt (3) so that the lubricating unit (advantageously the dry lubricating unit) has a lubricating surface contacting a part of the endless belt (3) during the second path portion of said at least one endless belt (3) moving in the return direction (P2), while the treating unit is adapted for treating a part of the endless belt (3) during the second path portion of said endless belt moving in the return direction, whereby the lubricating unit (advantageously the dry lubricating unit) is located backwards the treating unit with respect to the return direction; and/or the lubricating unit (advantageously the dry lubricating unit) and the treating unit forms one single assembly (the single assembly is for example adapted to lubricate the transport surface and to treat the transport surface during the second path portion of the endless belt moving in the return direction, or adapted to lubricate the down surface (opposite to the transport surface) and to treat the down surface during the first path portion of the belt moving in the transport direction, or adapted to lubricate the down surface of the belt during the second path portion in the return direction and to treat said down surface during the first path portion of the belt moving in the transport direction, or adapted to lubricate the transport surface and the down surface of the belt during the second path portion of the belt moving in the return direction, and to treat said transport surface and down surface during the second path portion of the belt in the return direction, or adapted to lubricate the transport surface and the down surface of the belt during the second path portion of the belt moving in the return direction, and to treat said transport surface during the second path portion of the belt in the return direction, while treating the down surface during the first path portion of the belt moving in the transport direction.); and/or the system comprises—a treating unit distinct from the lubricating unit (advantageously distinct from the dry lubricating unit) and adapted for ensuring at least a treatment step by contacting, when required, at least a part of the transport surface (7) at least with an active treatment element, advantageously a liquid active treatment agent,—possibly a rinsing unit for removing at least part the active treatment element present on the transport surface, and—a removing unit for ensuring the removal of waste particles as well as remaining active treatment element present on the transport surface (7); and/or combinations of such characteristics.

The treating unit can be and is preferably a unit distinct from the lubricating unit (advantageously from the dry lubricating unit) which is adapted for treating the conveyor belt by contacting a part of the conveyor belt (surface 7) with an active treatment element, advantageously by applying a treatment medium on a part of the conveyor belt, and advantageously on a part of the guiding means. The treatment medium can be gaseous, liquid and/or solid. According to specific embodiment, the treatment is adapted for cleaning the conveyor belt, and/or for disinfecting the conveyor belt. The treatment medium is advantageously a liquid medium, an aqueous medium comprising a soap, peroxide, a disinfecting agent, an agent against virus, bacteria, etc., a solvent system, etc. The liquid medium can have room temperature or can be heated to the required temperature, for example up to a temperature of 30 to 130° C. The treatment medium can be gaseous, such as air, hot water vapour, etc., as well as cold air, or cold nitrogen with temperature below −10° C., or even below −20° C. According to a specific embodiment, the treatment is carried by using solid particles which can be sublimated at room temperature, such as solid $CO_2$ solid particles or as $CO_2$ ice, which are then advantageously blasted or impelled towards the surface to be treated. The dry cleaning operation is very rapid, dust being very efficiently removed with possible deposits, such as waxes, etc. The treatment medium can also be ions, provided from an ionisation unit. The treatment medium can also be UV rays, provided from one or more UV lamps.

According to another possible embodiment, the treatment medium is a vacuum, whereby part of the transport surface is submitted to a vacuum, sucking the waste particles, as well as destroying or breaking some particles.

Such a $CO_2$ treatment is adequate for ensuring an anti bacterial/viral treatment.

The drying can be operated with air, hot air, IR, microwaves, vacuum, etc.

The friction measuring unit for measuring a parameter function of the friction of the transport surface (7) can be associated to or be a part of the lubricating unit or dry lubricating unit and/or the treating unit. The friction measuring unit can also be distinct from the lubricating unit, from a unit distinct from the lubricating unit (advantageously the dry lubrication unit) and distinct from the treatment/drying unit. Friction parameter(s) can be measured in different ways. The measure of the friction parameter can be substantially continuous or semi-continuous or intermittent. For example, the measure of the friction or a parameter function of the friction van be operated by image surface analysis (a device scans (intermittently or continuously or semi continuously) the transport surface, while moving, and determines whether from the scanned images, a parameter function of the roughness and thus function of the friction for at least one or more parts of the belt. The scanned images or part thereof can be compared with a reference image or between them, so as to determine variations in the peaks. The friction or a parameter function of the friction can also be determined by contacting an element with the moving transport surface. The said element can a roller or a sliding element or a flexible blade which is pushed towards the moving transport surface advantageously by an elastic means, like a spring. A parameter function of the friction is determined in function of for example the rotation speed or variation of speed of a roller, the vibration or variation of the vibration of a roller or sliding element or flexible blade, the temperature or variation of the temperature of the element or flexible blade. For example, a temperature sensor is mounted on a metal flexible blade. Said flexible blade is advantageously further provided with a pressure sensor for determining the contact pressure of the portion of the blade contacting the moving transport surface. The temperature sensor is preferably mounted on the face of the blade opposite to the face directed towards the moving transport surface (7). The temperature sensor can also be deported with respect to the blade. Other devices can also be used for determining the friction level or a parameter of the friction level.

A parameter function of the friction can also be determined by measuring an electrostatic charge (potential/current) when an element is contacting the moving conveyor belt.

The invention relates also to:
  a dry lubrication unit for dry lubricating a moving conveyor ensuring at least a movement of at least one container according to a transport direction (P1), whereby said conveyor (1) comprises at least:
  at least one endless conveyor belt (3),
  at least one guiding element with at least one gliding face (11) for said at least one endless conveyor belt (3), said at least one guiding element being adapted for guiding the at least one endless conveyor belt at least partly in the transport direction (P1),
  at least one lubricant provider for providing the endless conveyor belt (3) with at least one lubricant, and
  at least a driving system for driving the conveyor belt along a continuous path comprising at least a first path portion moving in accordance to said transport direction (P1), and a second path portion of said at least one endless belt (3) moving in a return direction (P2), whereby said conveyor belt comprises at least:
  (a) a transport surface (7) adapted to support the at least one container to be moved according to the transport direction (P1), and
  (b) at least one guiding surface (10) opposite to the transport surface (7), whereby said at least one guiding surface (10) is adapted to have contact with at least one gliding face (11) of the guiding element,
  in which the dry lubricating unit is adapted to ensure a dry lubrication by applying a micro dose of a lubricant on a part of the transport surface (7) of the conveyor belt (3) during a part of the second path portion of the conveyor belt moving in the return direction, said dry lubricating unit comprising advantageously (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$, advantageously less than 500 mm$^2$, for example less than 100 mm$^2$, or less such as 50 mm$^2$, along the substantially planar lubrication surface, recesses with an opening of less than 1000 mm$^2$, advantageously less than 500 mm$^2$, for example less than 100 mm$^2$, or less such as 50 mm$^2$, along the substantially planar lubrication surface, and grooves with an opening of less than 1000 mm$^2$, advantageously less than 500 mm$^2$, for example less than 100 mm$^2$, or less such as 50 mm$^2$, along the substantially planar lubrication surface, and (a2) a connection system for connecting the at least one inlet channel section to a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system,
  whereby the lubrication body is further provided with an inner channel with a first opening adapted to be connected to a supplying means for a treatment medium, possibly a lubricant medium, and at least one second opening adapted to be connected to a movable or removable treatment system, between a first position in which the treatment system is suitable for treating at least a portion of the conveyor belt, advantageously of the guiding surface (10), advantageously during the second path portion of the belt (3), and a second position in which at least a portion of the treatment system is away from the portion of the conveyor belt to be treated,
  said dry lubrication unit comprising advantageously a means adapted for determining the friction or a parameter function of the friction of the transport surface,
  as well as to:
  a treating unit for treating a moving conveyor ensuring at least a movement of at least one container according to a transport direction (P1), whereby said conveyor (1) comprises at least:

at least one endless conveyor belt (3),
at least one guiding element with at least one gliding face (11) for said at least one endless conveyor belt (3), said at least one guiding element being adapted for guiding the at least one endless conveyor belt at least partly in the transport direction (P1),
at least one treatment medium provider for providing the endless conveyor belt (3) with at least one treatment medium,
and
at least a driving system for driving the conveyor belt along a continuous path comprising at least a first path portion moving in accordance to said transport direction (P1), and a second path portion of said at least one endless belt (3) moving in a return direction (P2), whereby said conveyor belt comprises at least:
(a) a transport surface (7) adapted to support the at least one container to be moved according to the transport direction (P1), and
(b) at least one guiding surface (10) opposite to the transport surface (7), whereby said at least one guiding surface (10) is adapted to have contact with at least one gliding face (11) of the guiding element,
in which the treatment unit is adapted to ensure a treatment by supplying treatment medium on a part of the transport surface (7) of the conveyor belt (3) during a part of the second path portion of the conveyor belt moving in the return direction, said treatment unit comprising (a1) a first treatment body with a substantially planar treatment surface adapted for contacting said part of the transport surface (7) of the conveyor belt (3) during a part of the second path portion of the conveyor belt moving in the return direction, said treatment body having at least one inner channel system extending within the body between an inlet channel section and an outlet opening system located along the substantially planar lubrication surface of the body, and (a2) a connection system for connecting the at least one inlet channel section to a first supplying system comprising at least a means for supplying the treatment medium under pressure and a first duct system for connecting the means for supplying the treatment medium under pressure to the inlet channel section of the at least one inner channel of the treatment body, whereby said first supplying system is adapted for ensuring a supply of treatment medium to the outlet opening system,
whereby the treatment body is further provided with an inner channel with a first opening adapted to be connected to a supplying means for a treatment medium, possibly a lubricant medium, and at least one second opening adapted to be connected to a movable or removable treatment system, between a first position in which the treatment system is suitable for treating at least a portion of the conveyor belt, advantageously of the guiding surface (10), advantageously during the second path portion of the belt (3), and a second position in which at least a portion of the treatment system is away from the portion of the conveyor belt to be treated,
said treating unit comprising advantageously a means adapted for determining the friction or a parameter function of the friction of the transport surface, and/or a dry lubrication unit, and
the invention furthermore relates to a friction measuring unit for measuring a parameter function of the friction of the moving transport surface of the conveyor ensuring at least a movement of at least one container according to a transport direction (P1), whereby said conveyor (1) comprises at least:

at least one endless conveyor belt (3),
at least one guiding element with at least one gliding face (11) for said at least one endless conveyor belt (3), said at least one guiding element being adapted for guiding the at least one endless conveyor belt at least partly in the transport direction (P1),
advantageously, at least one lubricant provider for providing the endless conveyor belt (3) with at least one lubricant,
and
at least a driving system for driving the conveyor belt along a continuous path comprising at least a first path portion moving in accordance to said transport direction (P1), and a second path portion of said at least one endless belt (3) moving in a return direction (P2), whereby said conveyor belt comprises at least:
(a) a transport surface (7) adapted to support the at least one container to be moved according to the transport direction (P1), and
(b) at least one guiding surface (10) opposite to the transport surface (7), whereby said at least one guiding surface (10) is adapted to have contact with at least one gliding face (11) of the guiding element,
whereby the friction measuring unit is adapted to be mounted with respect to the conveyor belt in a movable or removable manner, between a first position in which the unit is suitable for measuring at least a parameter function of the friction of the transport surface (7), advantageously during the second path portion of the belt (3), and a second position in which the friction measuring unit is away from the conveyor belt.

Advantageously, the movable treatment system has at least an end portion mounted rotating or pivoting with respect to the body or around an intermediate element connecting the body with the said end portion.

Preferably, the inner channel comprises two second openings each adapted to be connected to a movable or removable treatment system, between a first position in which the treatment system is suitable for treating at least a portion of the conveyor belt, advantageously of the guiding surface (10), advantageously during the second path portion of the belt (3), and a second position in which at least a portion of the treatment system is away from the portion of the conveyor belt to be treated.

Embodiments of units of the invention has advantageously one or more of the following characteristics:
the treatment system or systems is/are adapted for spraying a treatment medium, advantageously a cleaning medium; and/or
the treatment system is adapted for lubricating another portion of the belt; and/or
the treatment system(s) is (are) connected to the lubrication body or an intermediate element attached to the lubrication body through an easy click connection; and/or
the treatment system(s) is (are) attached to the lubrication body through a lateral extension provide with a channel for the passage of the treatment medium, whereby the extension is adapted so that in its first position, the treatment system has a portion extending away from the lateral edge of the belt.

The invention further relates to a treatment unit, especially to a lubrication unit (advantageously a dry lubrication unit, specifically for applying micro doses of lubricant), a cleaning unit, a rinsing unit, a drying unit or even to a friction measuring unit for measuring a parameter function of the friction of the transport surface of a conveyor belt, to be associated to a conveyor comprising at least:

at least one endless conveyor belt (3),
at least one guiding element with at least one gliding face (11) for said at least one endless conveyor belt (3), said at least one guiding element being adapted for guiding the at least one endless conveyor belt at least partly in the transport direction (P1),
at least one lubricant provider for providing the endless conveyor belt (3) with at least one lubricant, and
at least a driving system for driving the conveyor belt along a continuous path comprising at least
a first path portion moving in accordance to said transport direction (P1), and a second path portion of said at least one endless belt (3) moving in a return direction (P2), whereby said conveyor belt comprises at least:
a transport surface (7) adapted to support the at least one container to be moved according to the transport direction, and
at least one guiding surface (10) opposite to the transport surface (7), whereby said at least one guiding surface (10) is adapted to have contact with at least one gliding face (11) of the guiding element,
whereby the return path portion is associated with a series of parallel supporting axes advantageously provided with rolling elements, whereby at least two of said parallel supporting axes have each a cylindrical face and a central axis, while being distant the one from the other by a separating length, said supporting elements being adapted for supporting at least a portion of the transport surface during the return path portion, whereby the treatment unit, especially to a dry lubrication unit, a cleaning unit, a rinsing unit, a drying unit or even to a friction measuring unit for measuring a parameter function of the friction of the transport surface of a conveyor belt comprises a body with at least two bearing elements, each being adapted to rest on a supporting element of at least a pair of adjacent or successive supporting elements, whereby said body has a treatment surface adapted to contact at least a portion of transport surface (7) during the return path of the belt and/or a friction measuring element adapted to contact at least a portion of transport surface (7) during the return path of the belt.

According to a first embodiment, the treatment unit or friction measuring unit comprises a body to be mounted on said at least two of said parallel (advantageously successive) supporting axes distant the one from the other by a separating length, the body having at least one longitudinal guiding rail portion extending between a first abutment end and a second abutment end, a first sliding supporting element adapted to slide at least in a part of the said longitudinal guiding rail portion, a part forming a second supporting element, and attachment means for maintaining a relative position of the first sliding supporting element after a sliding thereof in said at least a part of the said longitudinal guiding rail portion.

The body comprises advantageously a low friction layer (for example a Nylon layer, a fluorinated layer, etc.) adapted to be in contact with the moving belt. The treatment body is possibly made into such a low friction material. For example, the body is made of Nylon.

The first sliding supporting element and the second supporting element are each provided with a recess defined at least partly with at least one edge portion, whereby said recess is adapted for receiving at least a portion of one of said at least two of said parallel successive supporting axes, while having at least one edge portion contacting a portion of the cylindrical face of the said one of said at least two of said parallel supporting axes, when the treatment unit is mounted on said at least two of said parallel successive supporting axes, whereby the said at least one edge portion respectively of the first sliding supporting element and the second supporting element is adapted for ensuring relative position stability respectively of the first sliding supporting element and of the second supporting element with respect to the central axis of the said cylindrical face on which the said at least one edge portion abuts or is supported.

According to a second embodiment, the treatment unit or the friction measuring unit comprises a body to be mounted on said at least two of said parallel (advantageously successive) supporting axes distant the one from the other by a separating length, the body having at least one longitudinal guiding rail portion extending between a first abutment end and a second abutment end, a first sliding supporting element adapted to slide at least in a part of the said longitudinal guiding rail portion, a second supporting element, and attachment means for maintaining in position the second supporting element with respect to the body, as well as attachment means for maintaining a relative position of the first sliding supporting element after a sliding thereof in said at least a part of the said longitudinal guiding rail portion.

The first sliding supporting element and the second supporting element are each provided with a recess defined at least partly with at least one edge portion, whereby said recess is adapted for receiving at least a portion of one of said at least two of said parallel supporting axis, while having at least one edge portion contacting a portion of the cylindrical face of the said one of said at least two of said parallel successive supporting axes, when the treatment unit is mounted on said at least two of said parallel successive axes, whereby the said at least one edge portion respectively of the first sliding supporting element and the second supporting element is adapted for ensuring relative position stability respectively of the first sliding supporting element and of the second supporting element with respect to the central axis of the said cylindrical face on which the said at least one edge portion abuts or is supported.

By adapting the relative position of the first sliding supporting element, it is possible to adapt the distance separating the first sliding supporting element from the second supporting element, to the distance separating said at least two parallel successive supporting axes, i.e. to the separating length.

Advantageously, according to a third embodiment, the unit comprises a body to be mounted on said at least two of said parallel successive supporting axes distant the one from the other by a separating length, the body having at least one longitudinal guiding rail portion extending between a first abutment end and a second abutment end, a first sliding supporting element adapted to slide with respect to said at least one longitudinal guiding rail portion up to the first abutment end, a second sliding supporting element adapted to slide with respect to said at least one longitudinal guiding rail portion up to the second abutment end, and attachment means for maintaining a relative position of the first sliding supporting element and of the second supporting element with respect respectively to the first abutment end and the second abutment end of the said at least one longitudinal guiding rail portion, whereby the said at least one longitudinal guiding rail portion is adapted so that the first abutment end is distant from the second abutment end by a longitudinal distance greater than said separating length.

The first sliding supporting element and the second sliding supporting element are each provided with a recess defined at least partly with at least one edge portion, whereby said recess is adapted for receiving at least a portion of one of said at least two of said parallel supporting axes, while having at least one edge portion contacting a portion of the cylindrical face of the said one of said at least two of said parallel supporting axes, when the treatment unit is mounted on said at least two of said parallel axes, whereby the said at least one edge portion respectively of the first sliding supporting element and the second sliding supporting element is adapted for ensuring relative position stability respectively of the first sliding supporting element and of the second sliding supporting element with respect to the central axis of the said cylindrical face on which the said at least one edge portion abuts or is supported.

By adapting the relative position of the first and second sliding supporting elements with respect to the first and second abutment ends, it is possible to adapt the position of the treatment body with respect to the parallel supporting axes.

Advantageously, the first and/or second sliding supporting element(s) and/or second supporting element is/are each provided with a means for limiting the movement of the sliding supporting elements when each of said element is mounted on a cylindrical face portion of one of said at least two of said parallel axes, in a direction perpendicular to the central axis of said cylindrical face portion. It means thus that the supporting element and/or sliding supporting elements is/are able to slide along at least a portion of one of said parallel axes. Preferably, each supporting element or sliding supporting element comprises at least two parts adapted to be attached the one with the other. The parts are for example attached the one with the other with a means adapted to enable one part to be mobile with respect to the other part or to be removed from said other part. The parts are advantageously such to form a recess with edges surrounding the cylindrical face portion. It means thus that the sliding supporting element is not moving in a direction perpendicular to the central axis, when the said axis is driven into rotation.

The body is advantageously a body adapted for ensuring a dry lubrication, i.e. a dry lubrication body.

The said dry lubrication body has advantageously at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$, advantageously less than 500 mm$^2$, preferably less than 100 mm$^2$, most preferably less than 50 mm$^2$ along the substantially planar lubrication surface, recesses with an opening of less than 1000 mm$^2$, advantageously less than 500 mm$^2$, preferably less than 100 mm$^2$, most preferably less than 50 mm$^2$ along the substantially planar lubrication surface, and grooves with an opening of less than 1000 mm$^2$, advantageously less than 500 mm$^2$, preferably less than 100 mm$^2$, most preferably less than 50 mm$^2$ along the substantially planar lubrication surface. Said dry lubrication body is advantageously provided with attachment means, such as quick attachment means, for connecting the dry lubrication body to a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system.

The body or treatment body can also be provided with one or more nozzles, such as spray nozzle(s), for directing a treatment medium, advantageously a liquid treatment medium onto a surface of the conveyor belt. The nozzle(s) can be adapted for spraying the transport surface and/or the guiding surface of the belt.

The invention relates also to a method for dry lubricating and treating (such as wet cleaning) an endless belt by using a system of the invention as disclosed here above and having advantageously one or more characteristics disclosed here above.

The method of the invention is thus a method for dry lubricating and for treating (such as dry cleaning semi dry or semi wet cleaning or wet cleaning) a moving conveyor ensuring at least a movement of at least one container according to a transport direction (P1), whereby said conveyor (1) comprises at least:
 at least one endless conveyor belt (3),
 at least one guiding element with at least one gliding face (11) for said at least one endless conveyor belt (3), said at least one guiding element being adapted for guiding the at least one endless conveyor belt at least partly in the transport direction (P1),
 at least one lubricant provider for providing the endless conveyor belt (3) with at least one lubricant,
 advantageously a means adapted for measuring the friction of the transport surface or a parameter function of the friction of the said transport surface, and
 at least a driving system for driving the conveyor belt along a continuous path comprising at least
a first path portion moving in accordance to said transport direction (P1), and a second path portion of said at least one endless belt (3) moving in a return direction (P2), whereby said conveyor belt comprises at least:
 a transport surface (7) adapted to support the at least one container to be moved according to the transport direction, and
 at least one guiding surface (10) opposite to the transport surface (7), whereby said at least one guiding surface (10) is adapted to have contact with at least one gliding face (11) of the guiding element,
in which the method uses a system which comprises at least:
 (a) a lubricating unit or dry lubricating unit adapted to ensure a lubrication or a dry lubrication by applying a dose or a micro dose of a lubricant on a part of the transport surface (7) of the conveyor belt (3) during a part of the second path portion of the conveyor belt moving in the return direction, said lubricating unit or dry lubricating unit comprising (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$, advantageously less than 500 mm$^2$, preferably less than 100 mm$^2$, most preferably less than 50 mm$^2$ along the substantially planar lubrication surface, recesses with an opening of less than 1000 mm$^2$, advantageously less than 500 mm$^2$, preferably less than 100 mm$^2$, most preferably less than 50 mm$^2$ along the substantially planar lubrication surface, and grooves with an opening of less than 100 mm$^2$, advantageously less than 50 mm$^2$, preferably less than 10 mm$^2$, most preferably less than 5 mm² along the substantially planar lubrication surface, and (a2) a first supplying system comprising at least a first pump and a first duct system for connecting the first pump to the inlet channel section of the at least one inner channel of the lubrication body, whereby said first supplying system is adapted for ensuring a supply of dose or micro dose of the lubricant to the outlet opening system, (b) a treating unit distinct from the lubricating unit or dry lubricating unit adapted to ensure at least a treatment step different from a dry lubrication step by applying, when required, at least a treatment medium comprising at least one active treatment ingredient on a part of the transport surface (7), said treating unit being advantageously an unit comprising (b1) at least one outlet or spray nozzle adapted for directing or spraying at least the treatment medium on a part of the transport surface away from the substantially planar lubrication surface, and/or (advantageously and) (b2) a second supplying system comprising at least a second duct system different from the said duct system, said second duct system connecting the at least one treatment outlet or spray nozzle to a supply means for the treatment medium, said supply means being adapted for ensuring the said treatment medium to be transported towards the said at least one treatment nozzle, and (c) a single programmable logic controller (PLC) comprising at least (c1) one means for generating lubricating instructions for controlling the lubricating unit or dry lubricating unit; (c2) one means for generating at least one treatment instruction for controlling the treating unit, and (c3) one means for generating at least one preventing instructions for preventing a lubrication step or dry lubrication step by the lubricating unit or dry lubricating unit at least during a treatment step by the treating unit directing or spraying treatment medium, whereby said method comprises at least the following generating instructions steps:

generating lubricating instructions by the single programmable logic controller for controlling the lubricating unit or dry lubricating unit;

generating treating (advantageously cleaning) instructions by the single programmable logic controller for controlling the treating unit (advantageously a wet cleaning unit), and generating at least one preventing instruction by the single programmable logic controller for preventing a lubrication step or dry lubrication step at least during a treatment step (advantageously a cleaning step).

The method comprises further advantageously a step for measuring (preferably in a substantially continuous way or semi-continuous way) the friction of the moving transport surface or a parameter function of the said friction.

When measuring or determining a signal corresponding to the friction of the transport surface or a parameter function of the said friction, the lubrication step or dry lubrication step and/or the treatment step is advantageously operated when the signal or an average of the signal (for example average of the signal in function of the time, for example for period of 5 to 30 minutes) is outside an acceptable range or is above a threshold value.

The method of the invention has advantageously one or more of the following characteristics, preferably a combination of such characteristics:

the step of generating at least one preventing instruction for preventing a lubrication step or a dry lubrication step at least during a treatment step is a step of generating at least one preventing instruction for preventing a lubrication step or a dry lubrication step advantageously at least 5 seconds before a start of a treatment step by the treating unit; and/or The method using a system further comprising a rinsing unit for ensuring a rinsing step for at least a part of the conveyor belt previously treated by the treating unit with the treatment medium, said rinsing unit comprising:

at least one outlet or spray nozzle adapted for directing or spraying an aqueous rinsing medium on a part of the conveyor belt previously treated by the treating unit; and a supply means for providing said aqueous rinsing medium under pressure to the said at least one outlet or spray nozzle, in which the step of generating at least one preventing instruction for preventing a lubrication step or a dry lubrication step at least during a treatment step is a step of generating at least one preventing instruction for preventing a lubrication step or a dry lubrication step advantageously at least 5 seconds after the end of a rinsing step following the end of a treatment step by the treating unit; and/or the lubrication step or the dry lubrication step is operated by applying intermittently a dose or micro dose of a lubricant on a part of the transport surface (7) of the conveyor belt (3) during a part of the second path portion of the conveyor belt moving in the return direction; and/or the lubricating or dry lubricating is operated by applying a dose or micro dose of a lubricant on a part of the transport surface (7) of the conveyor belt (3) during a part of the second path portion of the conveyor belt moving in the return direction, as well as on a part of the guiding surface (10) of the conveyor belt (3) advantageously during a part of the second path portion of the conveyor belt moving in the return direction; and/or The method using a system comprising a lubricating unit or a dry lubricating unit having a body lubricating surface (71) adapted to contact at least a part of the transport surface (7) of the conveyor belt (3) during a part of the second path portion of the conveyor belt during the return movement, in which the dry lubricating unit is operated for supplying a dose or a micro dose of lubricant onto the body lubricating surface (71) so as to ensure a dry lubrication of a part of the transport surface (7) of the conveyor belt (3) during a part of the second path portion of the conveyor belt moving in the return direction, whereby ensuring also a lubrication or dry lubrication of the guiding surface (10) of the conveyor belt (3) in contact with a part of the transport surface being in contact at least partly be in contact with the body lubricating surface (71), advantageously during a part of the second path portion of the conveyor belt moving in the return direction; and/or the treatment step is operated by applying, when required, at least a treatment medium on a part of the transport surface (7), as well on a part of the guiding surface (10) during a part of the second path portion of the conveyor belt (3) moving in the return direction; and/or the treatment step is operated at least by applying, when required, at least treatment medium on a part of the transport surface (7), as well on a part of the guiding surface (10) during a part of the second path portion of the conveyor belt (3) moving in the return direction, and by rinsing thereafter the conveyor belt by applying an aqueous rinsing medium on a part of the transport surface (7), as well on a part of the guiding surface (10), advantageously during a part of the second path portion of the conveyor belt (3) moving in the return direction; and/or the method using a system comprising a lubricating unit or a dry lubricating unit having a body lubricating surface (71) adapted to contact at least a part of the transport surface (7) of the conveyor belt (3) during a part of the second path portion of the conveyor belt during the return movement, whereby the lubrication or dry lubrication is operated by supplying a dose or a micro dose of lubricant onto the body lubricating surface (71) so as to ensure a dry lubrication of a part of the transport surface (7) of the conveyor belt (3) during a part of the second path portion of the conveyor belt moving in the return direction, whereby ensuring also a lubrication or a dry lubrication of the guiding surface (10) of the conveyor belt (3) in contact with a part of the transport surface being in contact at least partly be in contact with the body lubricating surface (71), advantageously during a part of the second path portion of the conveyor belt moving in the return direction; and/or The method comprising the step of generating preventing instructions for preventing a lubrication step or a dry lubrication step at least during steps selected from the group consisting of treatment steps and rinsing steps; and/or The method further comprising the following steps:
drying of at least a part of the transport surface (7) during a part of the second path portion of the conveyor belt (3) moving in the return direction,
generating drying program instructions by the single programmable logic controller for controlling the drying step, and
generating preventing instructions by the single programmable logic controller for preventing a lubrication step or a dry lubrication step, a treatment step and a rinsing step at least during a drying step; and/or The method further comprising the following steps:
drying of at least a part of the transport surface (7) during a part of the second path portion of the conveyor belt (3) moving in the return direction, as well advantageously of a part of the guiding surface (10) during a part of the second path portion of the conveyor belt (3) moving in the return direction,
generating drying program instructions by the single programmable logic controller for controlling the drying step, and
generating preventing instructions by the single programmable logic controller for preventing a lubrication step or a dry lubrication step, a cleaning step and a rinsing step advantageously at least 3 seconds after the end of a drying step; and/or the step of generating lubricating instructions by the single programmable logic controller for controlling the lubricating unit or the dry lubricating unit is adapted for generating at least first lubrication or dry lubrication instructions for applying a first dose or micro dose of lubricant on a part of the transport surface, and second lubrication or dry lubrication instructions for applying a second dose or a micro dose of lubricant on a part of the transport surface, said first dose or micro dose being different from the second dose or micro dose; and/or Treatment step or lubrication step is operated when required, meaning advantageously at least when a parameter function of the friction of the transport surface is not within an acceptable range or above a threshold value; and/or combinations of one or more of such characteristics or details.

The invention further relates to a moving conveyor using a system of the invention, as well as to the use of such a moving conveyor for conveying containers, such as packs, bottles, boxes, etc.

The moving conveyor of the invention is provided or associated with one system of the invention as disclosed here above in the present disclosure, advantageously one system selected from the group consisting of:

A/ a system for lubricating or dry lubricating and for treating such as wet cleaning and/or rinsing a moving conveyor ensuring at least a movement of at least one container according to a transport direction (P1), whereby said conveyor (1) comprises at least:
at least one endless conveyor belt (3),
at least one guiding element with at least one gliding face (11) for said at least one endless conveyor belt (3), said at least one guiding element being adapted for guiding the at least one endless conveyor belt at least partly in the transport direction (P1),
at least one lubricant provider for providing the endless conveyor belt (3) with at least one lubricant, and
at least a driving system for driving the conveyor belt along a continuous path comprising at least a first path portion moving in accordance to said transport direction (P1), and a second path portion of said at least one endless belt (3) moving in a return direction (P2),
whereby said conveyor belt comprises at least:
a transport surface (7) adapted to support the at least one container to be moved according to the transport direction, and
at least one guiding surface (10) opposite to the transport surface (7), whereby said at least one guiding surface (10) is adapted to have contact with at least one gliding face (11) of the guiding element,
in which the system comprises at least:
(a) a lubricating unit or dry lubricating unit adapted to ensure a lubrication or a dry lubrication by applying a dose or a micro dose of a lubricant on a part of the transport surface (7) of the conveyor belt (3) during a part of the second path portion of the conveyor belt moving in the return direction, said lubricating unit or dry lubricating unit comprising advantageously (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$, advantageously less than 500 mm$^2$, preferably less than 100 mm$^2$, most preferably less than 50 mm$^2$ along the substantially planar lubrication surface, recesses with an opening of less than 1000 mm$^2$, advantageously less than 500 mm$^2$, preferably less than 100 mm$^2$, most preferably less than 50 mm$^2$ (advantageously less than 30 mm$^2$, preferably less than 10 mm$^2$) along the substantially planar lubrication surface, and grooves with an opening of less than 1000 mm$^2$, advantageously less than 500 mm$^2$, preferably less than 100 mm$^2$, most preferably less than 50 mm$^2$ (advantageously less than 30 mm$^2$) along the substantially planar lubrication surface, and/or but advantageously and (a2) a first supplying system comprising at least a first pump and a first duct system for connecting the first pump to the inlet channel section of the at least one inner channel of the lubrication body, whereby said first supplying system is adapted for ensuring a supply of a dose or a micro dose of the lubricant to the outlet opening system, (b) advantageously a treating unit distinct from the lubricating unit (advantageously the dry lubricating unit) adapted to ensure at least a treatment step different from a lubrication step, advantageously dry lubrication step by contacting, when required, a part of the transport system at least with an active treatment element (for example a liquid or dry treatment medium, ionisation, absorbing support, dry dust cleaning elements, etc.) (said treatment step being advantageously adapted for applying, when required, at least a treatment medium comprising at least one active treatment ingredient on a part of the transport surface (7), said treating unit comprising (b1) at least one treatment outlet or outlet or spray nozzle adapted for directing or directing or spraying at least the treatment medium on a part of the transport surface away from the substantially planar lubrication surface, and/or (but advantageously and) (b2) a second supplying system comprising at least a second duct system different from the said first duct system, said second duct system connecting the at least one treatment outlet or outlet or spray nozzle to a supply means for the treatment medium, said supply means being adapted for ensuring the said treatment medium to be transported towards the said at least one treatment outlet or nozzle).

The system used in the conveyor of the invention is advantageously a system of the invention as disclosed any where here above in the present document, and is for example a system which further comprises one or more elements or units as disclosed hereafter:

a single programmable logic controller (PLC) comprising at least (c1) one means for generating lubricating instructions for controlling the lubrication unit, advantageously the dry lubricating unit; (c2) advantageously one means for generating at least one treatment instruction for controlling the treating unit for contacting, when required, a part of the transport system with the active treatment element, and (c3) one means for generating at least one preventing instruction for preventing a lubrication step (advantageously a dry lubrication step) by the lubrication unit (advantageously the dry lubricating unit) at least during a treatment step by the treating unit, and/or a drying unit for ensuring a drying step of a part of the transport surface (7), as well as advantageously of a part of the guiding surface (10), said drying unit being advantageously adapted for ensuring a drying step of a part of the transport surface previously submitted to a treatment step, especially to a wet treatment step, especially to an aqueous wet treatment step, and/or a treating unit distinct from the lubricating unit (advantageously the dry lubricating unit) adapted to ensure at least a treatment step different from a lubrication step (advantageously the dry lubrication step), said treating unit comprises at least a microfibre electrostatic active treatment element mounted on a movable support between a first position in which the microfibre electrostatic active treatment element is contacting a part of transport system, and a second position in which the microfibre electrostatic active treatment element is away from the transport system, and/or a friction measuring unit for measuring at least one parameter function of the friction of the transport surface (7) of the conveyor belt, said parameter being adapted for determining whether the friction of the transport surface (7) is or not within an acceptable friction range and/or within an acceptable friction range (for example greater than a threshold value), and/or a control unit controlling at least the working of the lubricating unit (advantageously the dry lubricating unit) and/or treating unit, said control unit receiving signals from the friction measuring unit, whereby ensuring a lubrication step or a dry lubrication step (possibly after a cleaning step) and/or a treatment step, when one or more signals received from the friction measuring unit is/are within an unacceptable friction range and/or is/are outside an acceptable friction range (for example above a predetermined value. The control unit can also determine an average of the friction coefficient or parameter, for example average on a period of 5 to 30 minutes. Said average can also be determined substantially in continue or continuous manner so as to determine a variation of friction, as parameter to be compared with a predetermined range or a threshold value), and/or the treatment unit is adapted to ensure a treatment by supplying treatment medium on a part of the transport surface (7) of the conveyor belt (3) during a part of the second path portion of the conveyor belt moving in the return direction, said treatment unit comprising (a1) a first treatment body with a substantially planar treatment surface adapted for contacting said part of the transport surface (7) of the conveyor belt (3) during a part of the second path portion of the conveyor belt moving in the return direction, said treatment body having at least one inner channel system extending within the body between an inlet channel section and an outlet opening system located along the substantially planar lubrication surface of the body, and/or (a2) a connection system for connecting the at least one inlet channel section to a first supplying system comprising at least a means for supplying the treatment medium under pressure and a first duct system for connecting the means for supplying the treatment medium under pressure to the inlet channel section of the at least one inner channel of the treatment body, whereby said first supplying system is adapted for ensuring a supply of treatment medium to the outlet opening system, (whereby the treatment body is advantageously further provided with an inner channel with a first opening adapted to be connected to a supplying means for a treatment medium, possibly a lubricant medium, and at least one second opening adapted to be connected to a movable or removable treatment system, between a first position in which the treatment system is suitable for treating at least a portion of the conveyor belt, advantageously of the guiding surface (10), advantageously during the second path portion of the belt (3), and a second position in which at least a portion of the treatment system is away from the portion of the conveyor belt to be treated), and/or a treating unit distinct from the lubricating unit (dry lubricating unit) adapted to ensure at least a treatment step different from a lubrication step (dry lubrication step) by applying, when required, at least a treatment medium comprising at least one active treatment ingredient on a part of the transport surface (7), said treating unit comprising (b1) at least one treatment outlet or outlet or spray nozzle adapted for directing or spraying at least the treatment medium on a part of the transport surface away from the substantially planar lubrication surface, and/or (advantageously and) (b2) a second supplying system comprising at least a second duct system different from the said first duct system, said second duct system connecting the at least one treatment outlet or outlet or spray nozzle to a supply means for the treatment medium, said supply means being adapted for ensuring the said treatment medium to be transported towards the said at least one treatment nozzle, in which the treating unit is a sublimatable particles (like ice particles, especially $CO_2$ solid particles) blasting unit adapted for expelling through the said at least one outlet sublimatable (like ice, $CO_2$) solid particles on a part of the conveyor belt (3), Said sublimatable (like ice, $CO_2$ solid particles) solid particles supply means comprises advantageously a gas supply means, such as an air supply means for conveying sublimatable solid particles towards the outlet or outlet or spray nozzle(s) and for impelling the sublimatable solid particles onto the surface to be treated (the sublimatable (like ice, $CO_2$) solid particles or part thereof being advantageously sublimated when contacting the surface to be treated), and a device for transforming one or more solid sublimatable (like ice or $CO_2$) bloc(s) into sublimatable (like ice, $CO_2$) solid particles having the required particle size, such as a size below 5 mm, advantageously below 3 mm, such as comprised between 0.5 mm and 2 mm, and/or (preferably) a combination thereof.

According to specific embodiments of the conveyor of the invention, it comprises:

a system for dry lubricating and for treating a moving conveyor ensuring at least a movement of at least one container according to a transport direction (P1), whereby said conveyor (1) comprises at least:
at least one endless conveyor belt (3),
at least one guiding element with at least one gliding face (11) for said at least one endless conveyor belt (3), said at least one guiding element being adapted for guiding the at least one endless conveyor belt at least partly in the transport direction (P1),
at least one lubricant provider for providing the endless conveyor belt (3) with at least one lubricant, and
at least a driving system for driving the conveyor belt along a continuous path comprising at least
a first path portion moving in accordance to said transport direction (P1), and a second path portion of said at least one endless belt (3) moving in a return direction (P2), whereby said conveyor belt comprises at least:
a transport surface (7) adapted to support the at least one container to be moved according to the transport direction, and
at least one guiding surface (10) opposite to the transport surface (7), whereby said at least one guiding surface (10) is adapted to have contact with at least one gliding face (11) of the guiding element, in which the system comprises at least:
(a) a lubricating unit, advantageously a dry lubricating unit, adapted to ensure a lubrication or dry lubrication by applying a dose or a micro dose of a lubricant on a part of the transport surface (7) of the conveyor belt (3) during a part of the second path portion of the conveyor belt moving in the return direction, said lubricating unit or dry lubricating unit comprising (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 $mm^2$, advantageously less than 500 $mm^2$, preferably less than 100 $mm^2$, most preferably less than 50 $mm^2$ along the substantially planar lubrication surface, recesses with an opening of less than 1000 $mm^2$, advantageously less than 500 $mm^2$, preferably less than 100 $mm^2$, most preferably less than 50 $mm^2$ along the substantially planar lubrication surface, and grooves with an opening of less than 1000 $mm^2$, advantageously less than 500 $mm^2$, preferably less than 100 $mm^2$, most preferably less than 50 $mm^2$ along the substantially planar lubrication surface, and (a2) a first supplying system comprising at least a first pump and a first duct system for connecting the first pump to the inlet channel section of the at least one inner channel of the lubrication body, whereby said first supplying system is adapted for ensuring a supply of dose or micro dose of the lubricant to the outlet opening system,
(b) a treating unit distinct from the lubricating unit or dry lubricating unit adapted to ensure at least a treatment step different from a lubrication step or dry lubrication step by applying, when required, at least a treatment medium comprising at least one active treatment ingredient on a part of the transport surface (7), said treating unit comprising (b1) at least one treatment outlet or outlet or spray nozzle adapted for directing or directing or spraying at least the treatment medium on a part of the transport surface away from the substantially planar lubrication surface, and/or (advantageously and) (b2) a second supplying system comprising at least a second duct system different from the said first duct system, said second duct system connecting the at least one treatment outlet or spray nozzle to a supply means for the treatment medium, said supply means being adapted for ensuring the said treatment medium to be transported towards the said at least one treatment outlet or nozzle, in which the treating unit is a $CO_2$ solid particles blasting unit adapted for expelling through the said at least one outlet or nozzle $CO_2$ solid particles on a part of the conveyor belt (3).

C/ a system for lubricating or dry lubricating and for treating a moving conveyor ensuring at least a movement of at least one container according to a transport direction (P1), whereby said conveyor (1) comprises at least:
at least one endless conveyor belt (3),
at least one guiding element with at least one gliding face (11) for said at least one endless conveyor belt (3), said at least one guiding element being adapted for guiding the at least one endless conveyor belt at least partly in the transport direction (P1), at least one lubricant provider for providing the endless conveyor belt (3) with at least one lubricant, and at least a driving system for driving the conveyor belt along a continuous path comprising at least a first path portion moving in accordance to said transport direction (P1), and a second path portion of said at least one endless belt (3) moving in a return direction (P2), whereby said conveyor belt comprises at least:

a transport surface (7) adapted to support the at least one container to be moved according to the transport direction, and at least one guiding surface (10) opposite to the transport surface (7), whereby said at least one guiding surface (10) is adapted to have contact with at least one gliding face (11) of the guiding element, in which the system comprises at least:

(a) a lubricating unit or dry lubricating unit adapted to ensure a lubrication or dry lubrication by applying a dose or a micro dose of a lubricant on a part of the transport surface (7) of the conveyor belt (3) during a part of the second path portion of the conveyor belt moving in the return direction, said lubricating unit or dry lubricating unit comprising (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm², advantageously less than 500 mm², preferably less than 100 mm², most preferably less than 50 mm² along the substantially planar lubrication surface, recesses with an opening of less than 1000 mm², advantageously less than 500 mm², preferably less than 100 mm², most preferably less than 50 mm² along the substantially planar lubrication surface, and grooves with an opening of less than 1000 mm², advantageously less than 500 mm², preferably less than 100 mm², most preferably less than 50 mm² along the substantially planar lubrication surface, and/or (advantageously and) (a2) a first supplying system comprising at least a first pump and a first duct system for connecting the first pump to the inlet channel section of the at least one inner channel of the lubrication body, whereby said first supplying system is adapted for ensuring a supply of dose or a micro dose of the lubricant to the outlet opening system, (b) a treating unit distinct from the lubricating unit or dry lubricating unit adapted to ensure at least a treatment step different from a lubrication step or a dry lubrication step by applying, when required, at least a treatment medium comprising at least one active treatment ingredient on a part of the transport surface (7), said treating unit comprising (b1) at least one treatment outlet or spray nozzle adapted for directing or spraying at least the treatment medium on a part of the transport surface away from the substantially planar lubrication surface, and/or (advantageously and) (b2) a second supplying system comprising at least a second duct system different from the said first duct system, said second duct system connecting the at least one treatment outlet or spray nozzle to a supply means for the treatment medium, said supply means being adapted for ensuring the said treatment medium to be transported towards the said at least one treatment nozzle, and (c) a drying unit for ensuring a drying step of a part of the transport surface (7), as well advantageously of a part of the guiding surface (10), said drying unit being advantageously adapted for ensuring a drying step of a part of the transport surface previously submitted to a treatment step.

D/ a system being a combination of two or three systems A/, B/ and C/.

The conveyor belt of the invention has advantageously one or more details or characteristics of the system of the invention as disclosed here above in the present disclosure.

Details and characteristics of preferred embodiments of the invention will appear from the following description, in which reference is made to the attached drawings.

BRIEF DESCRIPTION OF THE DRAWINGS

FIGS. 11A, 11B, 11C, 11D and 11E are schematic views of a first embodiment of a treatment unit to be mounted on two parallel axes (FIG. 11A being a lateral view, FIG. 11B a longitudinal cross section view, FIG. 11C an upper view, FIG. 11D a bottom view, and FIG. 11E a longitudinal cross section view of the treatment unit mounted on two parallel axes);

FIGS. 12A, 12B, 12C, 12D and 12E are schematic views of a second embodiment of a treatment unit to be mounted on two parallel axes (FIG. 12A being a lateral view, FIG. 12B a longitudinal cross section view, FIG. 12C an upper view, FIG. 12D a bottom view, and FIG. 12E a longitudinal cross section view of the treatment unit mounted on two parallel axes);

FIG. 14 is a schematic perspective view of a detail of a possible treatment unit for one of the embodiment of FIGS. 11 to 13;

FIGS. 20 and 21 are perspective views of an "all in one" unit for lubricating/cleaning unit for treating one side or both sides of the conveyor belt, while

FIG. 23 is a side view of the unit (310) of FIG. 22, with the front wall of the structure take away;

FIG. 24 is a cross section view of the unit (310) of FIG. 22 along the line XXIV-XXIV; and FIG. 25 is a side view similar to that of FIG. 23, but after rotation of 90° of the supporting elements (300).

DESCRIPTION OF PREFERRED EMBODIMENTS OF THE INVENTION

Figure 1:
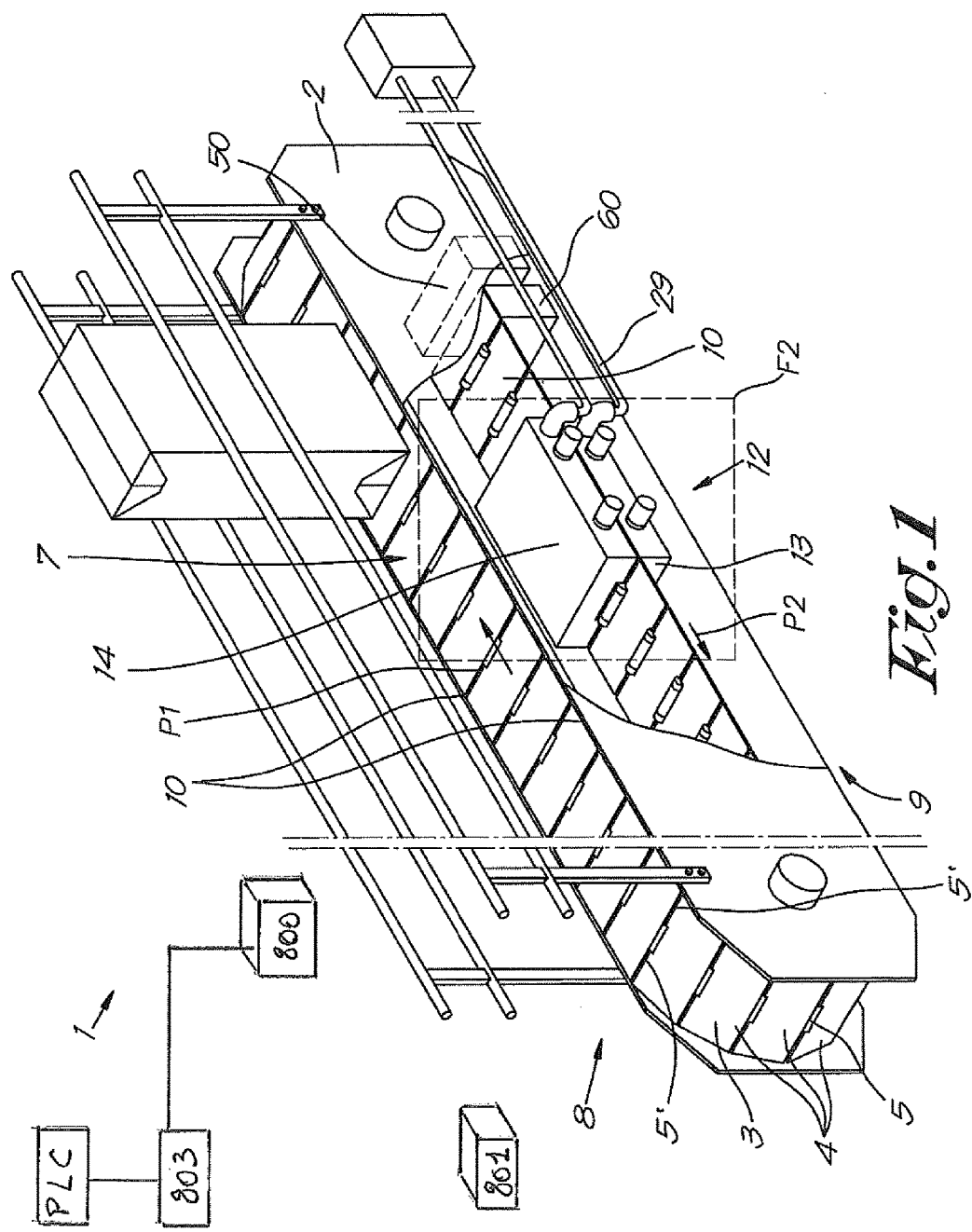
FIG. 1 is a schematic perspective view, with partial cuttings, of a conveyor with a single conveyor belt with lubricant distribution units associated to a bottom cleaner/rinser.

FIG. 1 shows an embodiment of a conveyor 1 according to the invention which comprises a conveyor frame 2 and an endless conveyor belt 3 which is normally driven by a rotating motor; this power drive is not shown and is further of no importance for the invention. Such a conveyor is similar to that shown in EP2061711.

As generally known the said belt 3 is composed of two opposite surfaces, a container contact surface or transport surface 7 which moves the containers on the conveyor transport side 8 into the direction marked by arrow P1, and a guiding element with guiding surface 10 which is supported on the transport side 8 of the frame 2 by one or two parallel longitudinal conveyor guiding/gliding surfaces 11 carried by an upper face of the conveyor frame 2, said guiding surfaces 11 supporting the belt 3 with the transported containers(s) C.

As generally known, the conveyor 1 has a conveyor return side 9 where the endless belt 3 is free of containers and moved into the direction marked by arrow P2 (the return direction) opposite to the transport direction P1.

As generally known, the belt 3 can be a segmented flat belt composed of individual chain elements 4 linked to each other by mechanical linking parts 5 and 5' as illustrated in accompanying drawings (a pin 6 extending within the holes of said rings 5, 5'), or can be a continuous belt with non-mechanical links (such as chemical links, glue, welding, etc.) or can be a continuous belt combining mechanical and non-mechanical links. For example, one or more mechanical and/or chemical links connect ends of the belt or of portions of the belt together. It is obvious that it is possible to use any other construction complying with the transport requirements of the conveyor.

The mechanical linking parts 5,5' of the belt 3 protrude below the flat chain element 4 for the transport path (P1). For said transport path P1, the mechanical linking parts 5, 5' are engaged in the longitudinal groove or opening extending between the two gliding surfaces 11. Said gliding surfaces 11 are advantageously profiled so that an upper face thereof acts as gliding face contacting the back side of the flat chain element 4, while a lateral face thereof acts as horizontal positioning guide to one end of a mechanical linking part 5'.

The conveyor 1 is equipped with a lubrication equipment 12 which is according the invention fitted on the return side 9 to the conveyor frame 2 (arrow P2).

Figure 2:
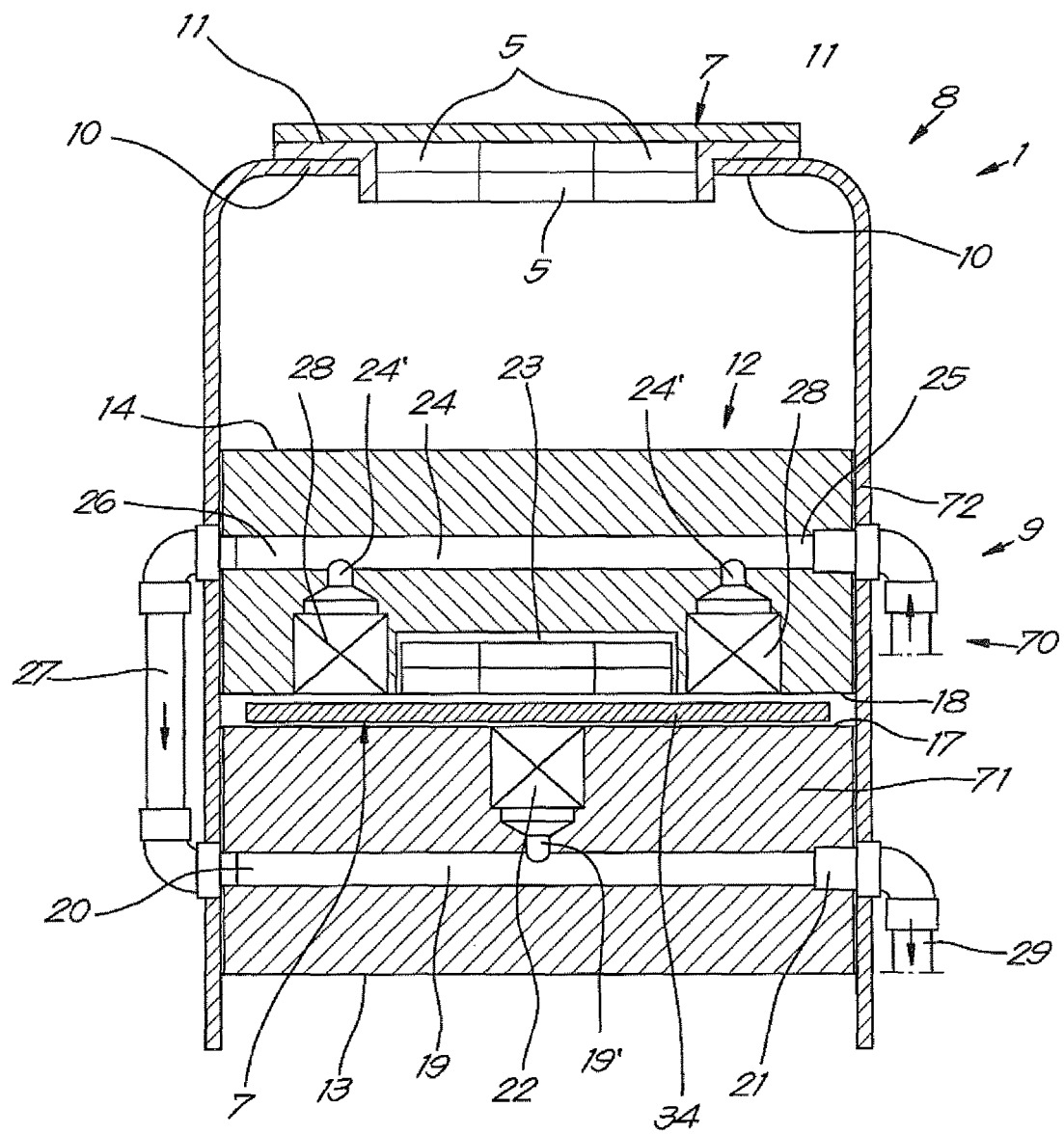
FIG. 2 is a cross section view of the lubrication unit.

As illustrated in FIG. 2 the lubrication equipment 12 basically comprises two distinct distribution units 13 and 14: the distribution unit 13 is fitted on the return side 9 underneath the belt 3 to lubricate the container contact surface 7, while the distribution unit 14 is fitted on the return side 9 above the belt 3 to lubricate the guiding surface 10.

Both distribution units 13 and 14 are preferably fitted above each other, as shown in the accompanied drawings, but can also be fitted in a longitudinal shoved position.

A camera 800 is used for taking successive images of a portion of the moving transport surface 7. The portion of the transport surface 7 is illuminated by lamps or leds 801 having rays forming an angle different from 90° with respect to the surface of the said portion of the transport surface 7. In this way, the peaks or particles present on the illuminated portions will generate black or grey areas. The camera comprises for example one or more pixel cells, advantageously for scanning a linear zone of the transport surface.

The camera takes successive images at a rate per second function of the speed of the transport surface. The images (black and white or colour) are send to a computer 803 for processing them, for example for comparing them with a reference image corresponding to an acceptable friction level, and/or for comparing the images the one with the other so as to determine a modification of the roughness pattern, and thus of the friction. Such a camera system enables to determine substantially in continuous manner the roughness of the top surface, whereby determining a parameter function of the friction coefficient of the top surface. In order to determine such a parameter, it is not necessary to process all the images taken by the camera. For example, only one image per minute is processed for determining the parameter of the friction level of the surface 7.

Such a camera is also adequate for determining whether unauthorized objects are present on the transport surface.

FIG. 2 shows an example of how both distribution blocks 13 and 14 can be fitted to the conveyor frame 2: two shafts 15 are crossing each distribution unit width wise through circular holes 16 and 16' from which, again as an example, the holes 16' are made in a sleeve form to allow vertical adjustments. The shafts 15 traverse also holes of the lateral plate of the frame 2. For maintaining the distribution units 13,14 in place with respect to the frame 2 by screwing bolts 15' on the end of the shafts 15. Any other suitable means to achieve a secured fixation of the distribution units is part of the invention.

In FIG. 2, the units 13,14 are positioned spaced the one from the other so that the space between said units is minimal, while enabling the natural movement of the belt during the return path (direction of the arrow P2).

The lubrication surface 17 of the distribution unit 13 is located oppositely to, and preferably in direct contact with, the transport surface 7 of the conveyor belt 3. The lubrication surface 18 of the distribution unit 14 is located oppositely to, and as an example in direct contact with, the guiding surface 10 of the conveyor belt 3 opposite to the transport surface 7.

As shown schematically in FIG. 1, the conveyor is provided with a treatment unit 50 such as a cleaning unit or a disinfecting unit, using for example an aqueous cleaning/disinfecting liquid medium, and with a drying unit 60, for example using hot air as drying medium or using IR energy for ensuring a drying operation. The treating unit can also be used for. The treatment unit can also be using water vapour for ensuring a cleaning and disinfection operation of the belt 3.

The treatment unit 50 can be provided, if required with collecting means, so as to collect treatment medium after its contact with the belt 3.

Figure 3:
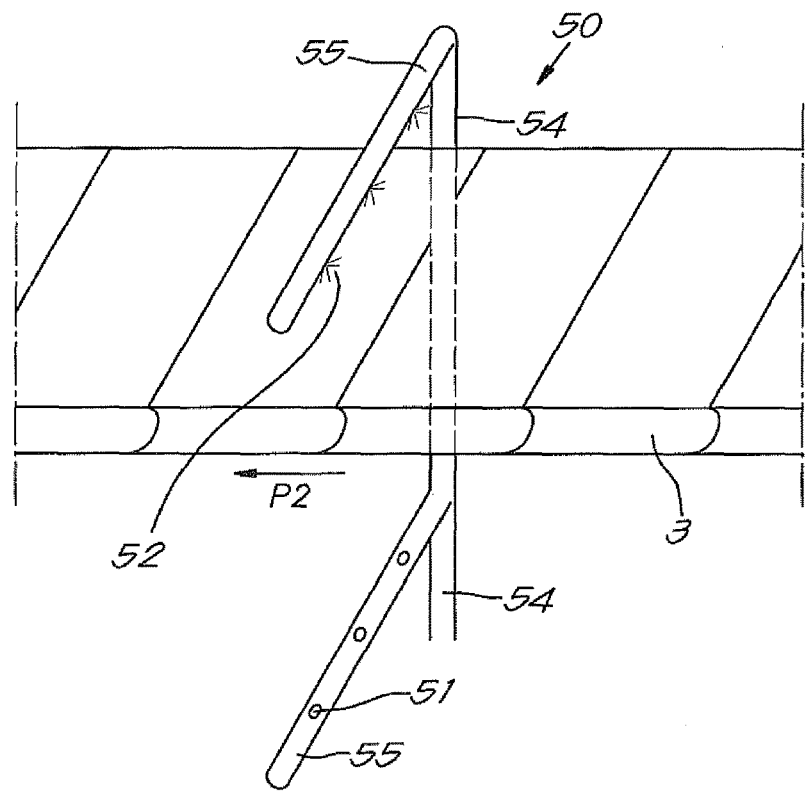
FIG. 3 is a schematic view of the cleaning/rinsing unit (in cross section)

FIG. 3 is a schematic view of a cleaning/rinsing unit 50 adapted to clean/rinse a part of the transport surface 7 during the return path P2 of the belt 3, as well as a part of the guiding surface 10 of the belt during its return path (P2). The cleaning/rinsing unit 50 comprises outlet or spray nozzles 51, 52 mounted on a supply circuit 53 comprising supply pipe 54 and distribution pipes 55. The distribution pipes 55 are each provided with a plurality of spay nozzles, said distribution pipes extending above and under the belt when moving in its return path, and being located backwards with respect to the lubrication equipment 12.

Figure 4:
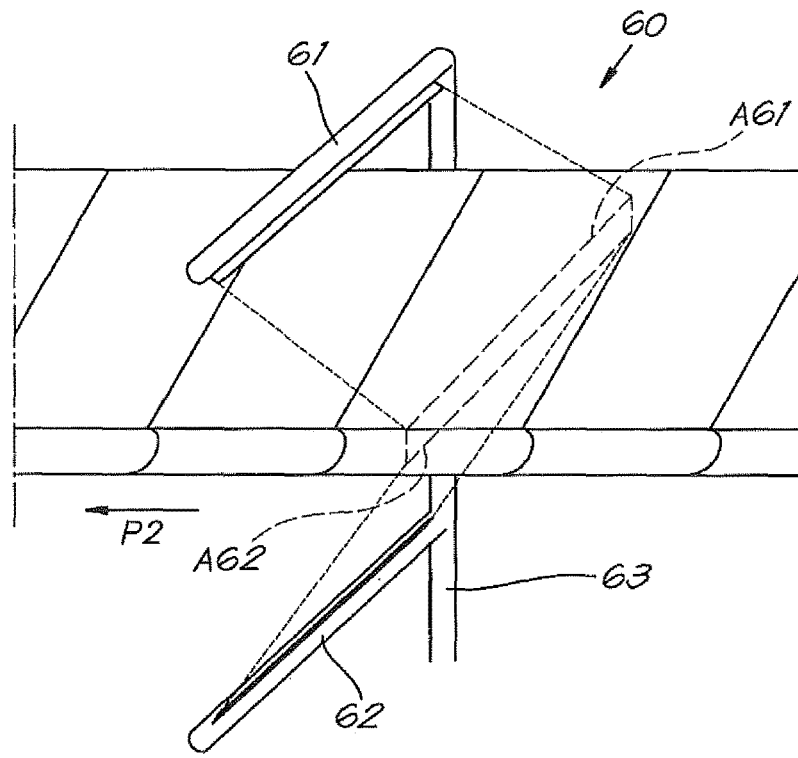
FIG. 4 is a schematic cross section view of the drying unit.

FIG. 4 is a schematic view of a dry equipment 60 located between the cleaning equipment 50 and the dry lubrication equipment 12. The dry equipment 60 consists for example of two air knife systems 61, 62 directing air towards the transport surface 7 and the guiding surface 10 of the belt 3. Air is directed towards the belt while forming advantageously an angle of 15 to 85° with the plane of the said surfaces 7,10 where the air is contacting said surfaces. The air flow is directed onto the surfaces, so that the possible water or composition present on the belt is pushed away of the belt or towards the cleaning equipment, but preferably away of the belt. For this purpose, the air knife equipments are generating each an air knife defining an air contact line A61, A62 forming an angle (for example comprised between 15 and 75°) with the moving direction of the belt (P2). The air knife generated by each of the systems 61, 62 is advantageously adapted for ensuring an air knife which is adapted for contacting at least all the breath of the belt, and which is preferably adapted for generating an air knife or curtain contacting the longitudinal edge of the belt.

The systems 61, 62 are supplied each with air, advantageously hot air, for example air with a temperature of 30° C. to 120° C., or even more through a piping system 63.

Figure 5:
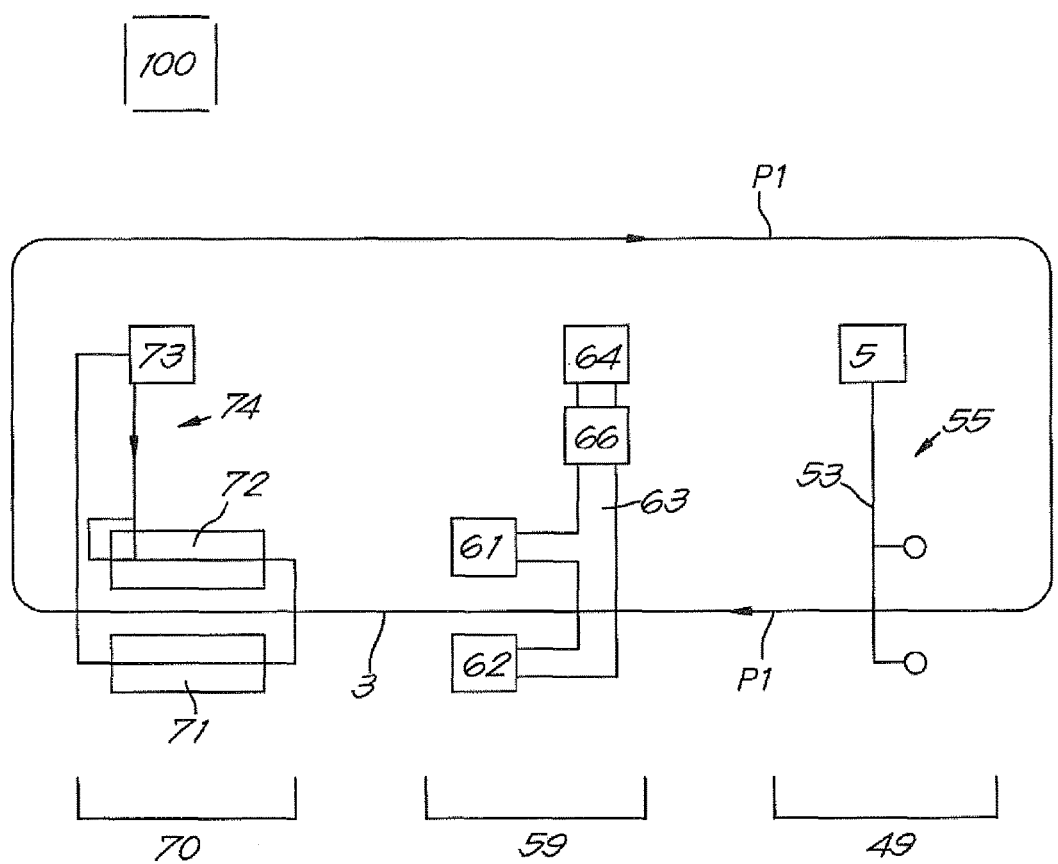
FIG. 5 is a schematic view of the control system of the lubrication unit, cleaning unit and drying unit.

FIG. 5 is a schematic view of the various units for treating the belt 3 which are controlled by one single PLC (programmable logic controller) 100.

The PLC 100 controls for example the working of:
(a) a dry lubricating unit 70 adapted to ensure a dry lubrication by applying a micro dose of a lubricant on a part of the transport surface (7) of the conveyor belt (3) during a part of the second path portion of the conveyor belt moving in the return direction, said dry lubricating unit comprising:
(a1) a first (lower) lubrication body 71 with a substantially planar lubrication surface adapted for contacting said part of the transport surface (7) of the conveyor belt (3) during a part of the second path portion of the conveyor belt moving in the return direction, said lower lubrication body 71 having at least one inner channel system 19 extending within the body 71 between an inlet channel section 27 and an outlet opening system 22 located along the substantially planar lubrication surface of the body, said outlet opening system comprising at least one element selected from the group consisting of apertures with an opening of less than 1000 mm$^2$, advantageously less than 500 mm$^2$, preferably less than 100 mm$^2$, most preferably less than 50 mm$^2$ along the substantially planar lubrication surface, recesses with an opening of less than 500 mm$^2$ (such as less than 100 mm$^2$, less than 50 mm$^2$) along the substantially planar lubrication surface, and grooves with an opening of less than 500 mm$^2$ (such as less than 100 mm$^2$, preferably less than 50 mm$^2$) along the substantially planar lubrication surface 17,
(a2) a second (upper) lubrication body 72 with a substantially planar lubrication surface 18 adapted for contacting said part of the guiding surface (10) of the conveyor belt (3) during a part of the second path portion of the conveyor belt moving in the return direction, said upper lubrication body 72 having at least one inner channel system 24 extending within the body 72 between an inlet channel section and an outlet opening system 28 located along the substantially planar lubrication surface 18 of the body 72, said outlet opening system 28 comprising at least one element selected from the group consisting of apertures with an opening of less than 500 mm$^2$ (such as less than 100 mm$^2$, preferably less than 50 mm$^2$, for example less than 10 or 5 mm$^2$) along the substantially planar lubrication surface, recesses with an opening of less than 5 mm$^2$ along the substantially planar lubrication surface, and grooves with an opening of less than 500 mm$^2$ (such as less than 100 mm$^2$, preferably less than 50 mm$^2$, for example less than 10 or 5 mm$^2$) along the substantially planar lubrication surface 18,
(a3) a pipe 27 connecting the inner channel 24, 19 of the first and second body 71, 72, and
(a4) a first supplying system 74 comprising at least a first pump 73 and a first duct system 75 for connecting the first pump to closed circuit comprising the two inner channels, whereby supplying lubricant through the inlet pipe 9 to the inner channel 24 and through the pipe 27 to the inner channel 19, a return pipe 29 connecting the outlet 21 of the channel 19 to the pump 73, said pump 73 being adapted to generate a pressure of the lubricant with the closed circuit, whereby enabling the supply of a micro dose of lubricant a the distribution unit 28 and 22 which are connected to the inner channels through micro channels 19', 24',
(b) a wet cleaning unit 49 adapted to ensure at least a cleaning step of a part of the transport surface 7 by applying, when required, at least an aqueous cleaning medium on a part of the transport surface (7), during a part of the second path portion of the conveyor belt (3) moving in the return direction, said wet cleaning unit 49 comprising:
(b1) outlet or spray nozzles 51, 52 adapted for directing or spraying at least an aqueous cleaning medium away from the substantially planar lubrication surface 17,18, the outlet or spray nozzles 51 being adapted to spray the transport surface 7 during its return path, while the outlet or spray nozzles are adapted to spray the guiding surface 10 also during the return path, said nozzles being mounted on distribution pipes 54 connected the one to the other and respectively located above and under the belt during its return path, and
(b2) a second supplying system 55 comprising at least a second pump 54 distinct from the first pump (73) and a second duct system 53 distinct from the first duct system 74, said second duct system 53 being adapted for connecting said second pump 54 to the outlet or spray nozzles 51, 52, (d) a drying unit 59 comprising advantageously an air heating means 66, a fan 64 for pushing air through the heating means 66 and then in a duct 63 for conveying said heated air to the air knife system 60 comprising a first knife head 61 for directing air onto the guiding surface 10 and a second knife head 62 for directing air onto the transport surface 7 during the return path of the belt, said drying unit being located between the lubrication bodies 71, 72 and the cleaning nozzles 51, 52, and (e) a single programmable logic controller (PLC) comprising at least (c1) means for generating lubricating instructions for controlling the dry lubricating unit; (c2) means for generating cleaning instructions for controlling the wet cleaning unit, and (c3) means for generating preventing instructions for preventing a dry lubrication step by the dry lubricating unit at least during a cleaning step by the wet cleaning unit.

Advantageously, when the belt has to be cleaned, the wet conveyor belt is moved between the bodies 71, 72 so as to ensure a cleaning of the lubricating surfaces, as well as on the gliding surface of the conveyor, so as to ensure a cleaning thereof. Preferably, the wetted belt operates two or three complete cycles, before being further lubricated.

The means for generating preventing instructions for preventing a dry lubrication step at least during a cleaning step is a means for generating preventing instructions for preventing a dry lubrication step at least 5 minutes before a start of a cleaning step by the wet cleaning unit.

The means for generating preventing instructions for preventing a dry lubrication step at least during a cleaning step is a means for generating preventing instructions for preventing a dry lubrication step at least 5 minutes, for example from 5 to 15 minutes after the end of a rinsing step following a cleaning step by the wet cleaning unit. This enables a good removal of the dirt present on conveyor parts, while preventing such dirt to stick on the lubricating surfaces.

The means for generating preventing instructions is preferably a means for generating preventing instructions for preventing a dry lubrication step at least during steps selected from the group consisting of cleaning steps and rinsing steps, as well as drying steps.

Advantageously, the PLC comprises means for generating drying program instructions for controlling the drying step, and (c5) means for generating preventing instructions for preventing a dry lubrication step at least 3 minutes after the end of a drying step.

The PLC is thus connected to the three units 49, 59 and 70, as well to some captors 80 determining the correct working of the conveyor, such as speed, humidity present on the transport surface, temperature, camera for determining the presence of dirt on the transport surface or on the guiding surface 10, resistance to the movement of the belt, etc.

The PLC receives a series of signals relating to the status of the conveyor belt. In case the conveyor belt is considered as dirty due to one or more signals coming from one or more captors or sensors or after a predetermined working time of the conveyor belt, the PLC sends:

a signal to the lubrication unit for stopping any supply of lubricant to the lubrication distributors 22, 28, for example at least 5 minutes before the start of a cleaning operation. For example, for preventing lubricant to be supplied by the distributors, the pump 73 is not activated or is activated so as to create a pressure not sufficient for enabling lubricant to flow through the distributors;

a signal to the cleaning unit 49 so as to start the cleaning operation.

The PLC is also adapted for determining by advance the start of a cleaning operation.

The start of a cleaning operation can be timely preprogrammed or can be determined by advance in function of the variation of value of one or more parameters, such as the resistance generated by the belt, the variation of efficiency, etc. When the PLC has determined in advance a programmed start of a cleaning operation within the next 10 to 30 minutes, the PLC sends signal to the lubrication unit 70 for preventing supply of further lubricant to the distributors 22, 28.

The cleaning operation is controlled by the PLC so that:
first signal is sent to the cleaning unit so that an aqueous soap containing liquid composition is sprayed onto the transport surface and the guiding surface of the belt, for at least one complete loop of the belt, for example for two or three successive loops of the belt;
second signal is sent to the cleaning unit so that a rinsing liquid is sprayed onto the transport surface and the guiding surface of the belt for removing remaining soap for two or three successive loops of the belt.

During all said cleaning operation, the PLC sends signal to the lubricant unit for preventing lubricant to be distributed via the distributors.

Thereafter the PLC sends a signal to the drying unit, so as to remove the remaining water present on the belt by the action of the air knives. The dried belt moves two or three loops. During said movement of the belt, water possibly present on the gliding surface, as well as on the lubricating surfaces. Possible dirt present on the belt are removed and expelled away by the air knives. It has been observed that a correct removal of dirt before lubrication step was positive for the correct and efficient working of the conveyor thereafter During said drying step, as well as for a period after the end of the drying step, the PLC sends signal to the lubrication unit 70 for preventing lubricant to be distributed through the distributors 22, 28.

After said drying step, the PLC sends signal for stopping the drying step and sends a signal to the lubrication unit. The signal is first adapted for supplying a first micro dose at a first rate to the distributors for ensuring a pre lubrication step, and then for supplying a second micro dose at a second rate, which is smaller than the first rate.

During the lubrication step, the PLC sends signals for preventing cleaning operations and drying operations. As one single PLC controls the various units, interference between the working thereof.

Figure 6:
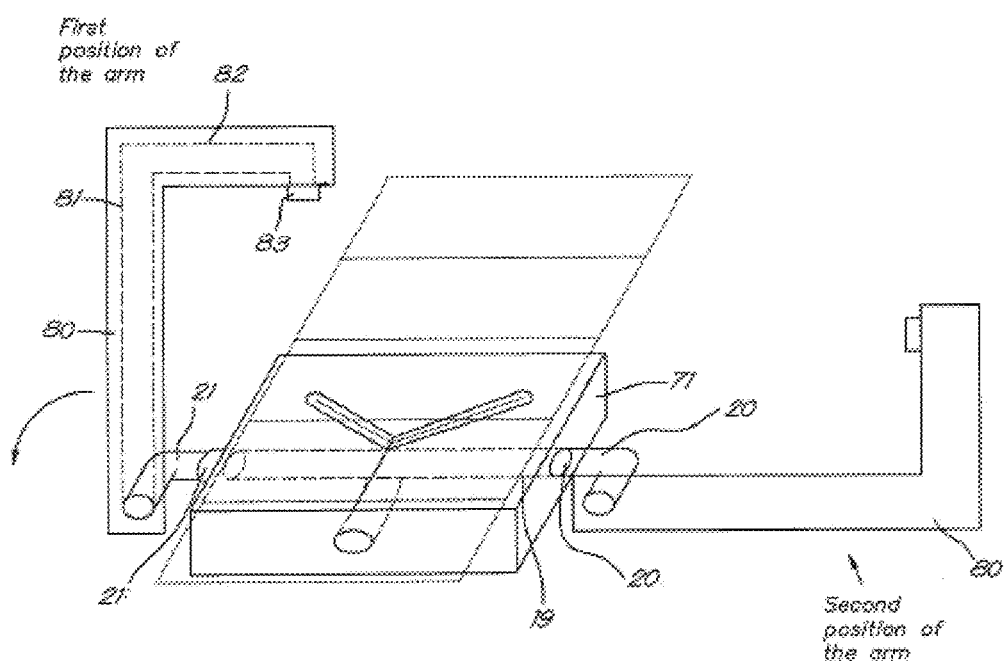
FIG. 6 is a schematic view of a further lubrication unit, while FIG. 6 *bis* is an alternative embodiment of FIG. 6.

FIG. 6 is a schematic view of a lubrication unit comprising a lubrication body 71 similar to the body shown in FIG. 2, except that the inner channel 19 of the body 71 is supplied between its two open ends through a duct 27, that its two open ends 20, 21 are provided with a L-tube extension 20*bis*, 21*bis* with each an opening having its axis extending parallel to the direction of movement of the belt 3. On the opening of each L-tube extension 20*bis*, 21*bis* an arm 80 with an inner channel 81 is pivotably mounted between a first position adjacent to the belt and a position away from the belt. The L-tube is advantageously provided with abutments for limiting the pivoting movement of the arm (around the axis A parallel to the longitudinal movement of the belt—return direction). Said arms 80 are each provided with a head 82 provided with a distributor 83 connected to the inner channel 81 for distributing lubricant drops on the guiding surface 10 of the belt. In the first position of the arm, the head is located above the belt, so that the lubricant drops can fall on the guiding surface. The L-tube and arm are advantageously provided with valve means so that the valve is in open position in the first position of the arm and so that the valve is in closed position in the second position of the arm. The valve system 85 is for example as follows. The L extension 20bis or 21 bis is provided at its end away from the body 71 with a sleeve 86 with a flange 87 abutting on the open end of the L-extension 20bis or 21bis with interposition of a joint 88, the sleeve being such that its lateral wall are distant from the inner surface of the open channel of the L-extension, that the end 86E of the sleeve extending within the inner channel of the L-extension is closed, and that the lateral wall of the sleeve is provided with an opening 89. The inner channel 81 of the arm 80 is provided with an extension 91 adapted to be inserted within the sleeve. The free end of this tube extension 91 is closed, while the lateral face of said extension contacting the inner face of the sleeve 86 is provided with an opening 92. In the second position of the arm 80, the opening 92 is not located in front of the opening 89, whereby no lubricant can flow from the inner channel 19 to said arm. In its first position, the opening 92 is in front of the opening 89 due to the pivotment of the arm around the axis A, whereby enabling a flow of lubricant from the channel 19 towards the channel 81.

The arm 80 is also provided with a flange 93, an O-ring 94 extending between the flanges 93 and 87.

FIG. 6 bis is a view of an embodiment similar to FIG. 6, except that the pivoting arms 80 with a spray head or distributor 83 are attached on extension tubes 200bis, 210bis via a quick clip system 211 enabling a rotation of the arm 80 along an axis perpendicular to the movement of the belt during the return path.

The extension tubes 200bis, 210bis are connected to each other by an inner channel 190 located within the body 71, said inner channel 190 being supplied with liquid treatment medium through a connection tube 191 adapted to be connected to a supply system comprising for example a pump and a tube extending between the pump and the tube 191. Said lubricating body is adapted for ensuring also a treatment of the belt with a liquid treatment medium different from lubricant. The spray heads can ensure the treatment of the transport surface in the return path (the arms being then in a substantially horizontal position as shown in dot lines 80bis), the guiding surface in the return path or in the transport path, and even the transport surface during the transport path, provided the length of the arm 80 is sufficient. Assuming the length of the arm is greater than the distance existing between the level of the belt in the transport path and the level of the belt in the return path, and that the spray heads are mounted mobile with respect to the arms so as to enable to modify the spray directions, the body can be used in function of the position of the arms to treat the transport surface in the return path and/or the guiding surface in the return path or in the transport path, and/or the transport surface during the transport path. The connecting piece 211 can be connector with liquid stop.

Figure 8:
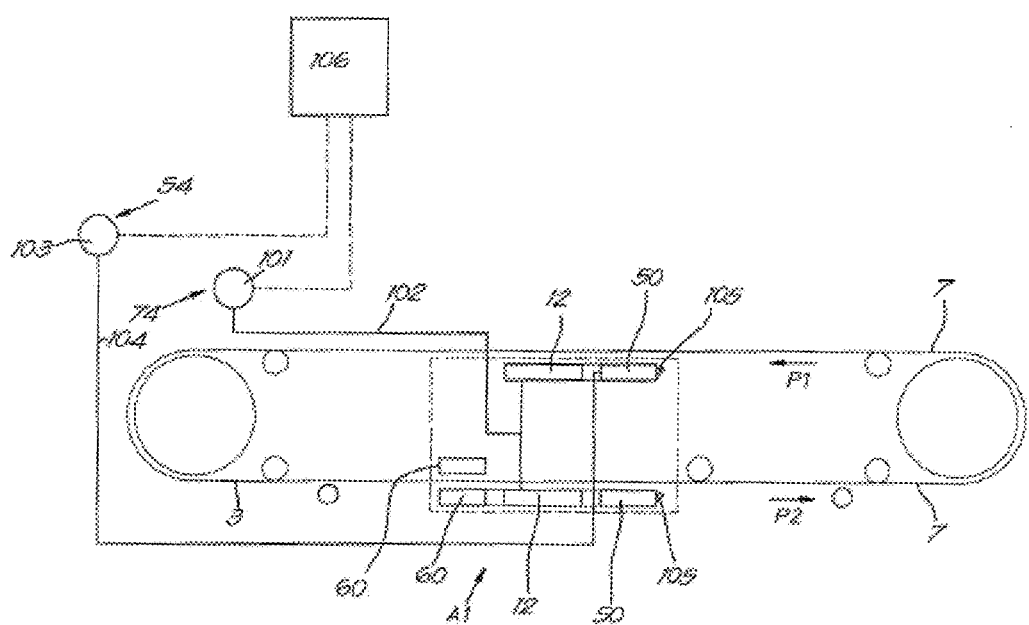
FIG. 8 is a schematic view of a conveyor associated to a system for dry lubricating, top and bottom cleaning, as well as for top and bottom drying of the conveyor belt.

FIG. 8 is a schematic view of a conveyor 1 associated to:
a first assembly A1 comprising a lubrication unit 12 adapted for dry lubricating the transport surface 7 of the belt 3 during the return path P2 of the belt 3, and a treatment unit 50 adapted for directing or spraying a treatment medium (such as a cleaning liquid medium and a rinsing medium) onto the transport surface 7 of the belt during the return path P2, said lubrication unit having a body having at least one inner channel system extending within the body between an inlet channel section and an outlet opening system located along the substantially planar lubrication surface of the body which is contacted with the transport surface 7 during the return path P2, said outlet opening system comprising at least one element selected from the group consisting of apertures with an opening of less than 1000 mm$^2$, advantageously less than 500 mm$^2$, preferably less than 100 mm$^2$, most preferably less than 50 mm$^2$, such as less than 10 or 5 mm$^2$ along the substantially planar lubrication surface, recesses with an opening of less than 1000 mm$^2$, advantageously less than 500 mm$^2$, preferably less than 100 mm$^2$, most preferably less than 50 mm$^2$, such as less than 10 or 5 mm$^2$ along the substantially planar lubrication surface, and grooves with an opening of less than 1000 mm$^2$, advantageously less than 500 mm$^2$, preferably less than 100 mm$^2$, most preferably less than 50 mm$^2$, such as less than 10 or 5 mm$^2$ along the substantially planar lubrication surface;
a second assembly A2 comprising a lubrication unit 12bis adapted for dry lubricating the guiding surface opposite to the transport surface 7 of the belt 3 during the transport path P1 of the belt 3, and a treatment unit 50bis adapted for directing or spraying a treatment medium (such as a cleaning liquid medium and a rinsing medium) onto the guiding surface opposite to the transport surface 7 of the belt during the transport path P1, said lubrication unit comprising a lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$, advantageously less than 500 mm$^2$, preferably less than 100 mm$^2$, most preferably less than 50 mm$^2$, such as less than 10 or 5 mm$^2$ along the substantially planar lubrication surface, recesses with an opening of less than 1000 mm$^2$, advantageously less than 500 mm$^2$, preferably less than 100 mm$^2$, most preferably less than 50 mm$^2$, such as less than 10 or 5 mm$^2$ along the substantially planar lubrication surface, and grooves with an opening of less than 1000 mm$^2$, advantageously less than 500 mm$^2$, preferably less than 100 mm$^2$, most preferably less than 50 mm$^2$, such as less than 10 or 5 mm$^2$ along the substantially planar lubrication surface;
a supplying system 74 comprising at least a first pump 101 (adapted to pump lubricant from a reservoir), a first duct system 102 for connecting the first pump to the inlet channel section of the at least one inner channel of the lubrication bodies of the two lubrication units 12, 12bis, whereby said first supplying system 74 is adapted for ensuring a supply of micro dose of the lubricant to the outlet opening of said lubrication bodies;
a supplying system 54 comprising a second pump 103 (adapted to pump a treatment medium or a rinsing medium from a reservoir), a second duct system 104 connecting the pump 103 to the outlet or spray nozzles 105, and
a all in one PLC control system 106 adapted for controlling the cleaning/rinsing operation by the treatment units of the first and second assemblies A1, A2, as well as the lubrication operation by the lubrication units 12, 12bis.

Advantageously the outlet or spray nozzles of the treatment unit 50bis of the second assembly A2 is located with respect to the outlet or spray nozzles of the treatment unit 50 of the assembly A1 so that the liquid sprayed by the nozzles of the treatment unit 50bis onto the guiding surface (during the transport path P1) falls substantially onto the portion of the belt which is contacted with the liquid sprayed by the nozzles of the treatment unit 50. In this way, particles and waste materials removed by the liquid sprayed onto the guiding surface during the transport path portion (P1) can not adhere onto the transport surface due to the action of the liquid spray of the treatment unit 50. In this way, also, all the liquid used for the treatment of the belt falls substantially at one same place, said liquid being possibly collected via a collector. Possibly, more liquid is sprayed on the transport surface (when moving during its return path), than on the guiding surface.

Drying units 60, 60bis can be provided for operating a drying operation after the end of a cleaning/rinsing operation.

The control system 106 is adapted for ensuring:
that the cleaning or rinsing operation of the transport surface and of the guiding surface of the belt 3 occurs at the same time,
that the supply of microdoses of lubricant to the lubricating bodies at the same time;
that no lubricant is supplied during the cleansing and rinsing operations
that the lubrication operation is operated a few seconds or minutes after the end of the cleaning/rinsing operation, i.e. so as to be sure that the lubrication starts on substantially dry portion of the belt.

Figure 9:
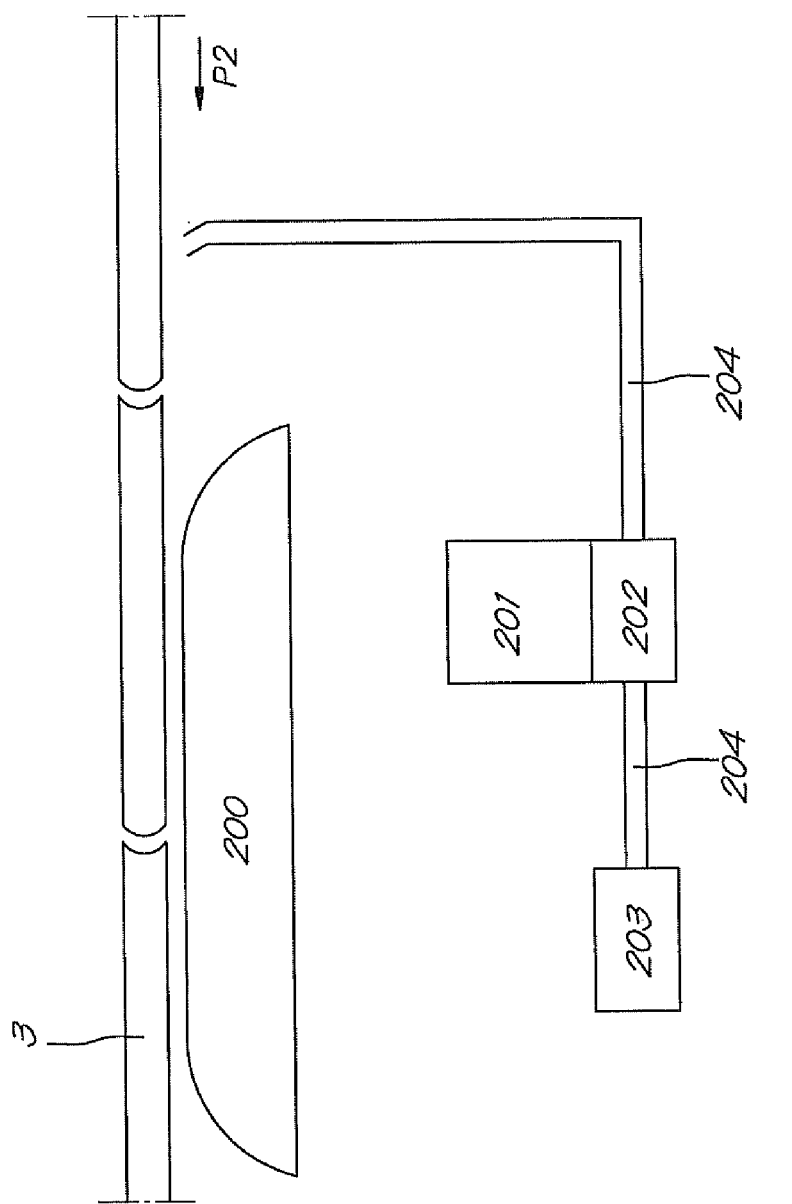
FIG. 9 is a schematic view of a conveyor belt associated with a dry cleaning unit.

FIG. 9 is a schematic view of a portion of a conveyor 1 provided with a dry lubrication unit 12 and with a dry treatment unit 200. The dry lubricating unit is adapted for a dry lubrication of the belt during its return path P2 on the transport surface and on the guiding surface.

The dry treatment unit 200 is a unit adapted for treating the belt 3 with $CO_2$ sublimable solid particles. The $CO_2$ solid particles are projected onto the surfaces of the belt 3. The particles contact the belt surfaces when still being at least partly solid. During said contact, the particles are partly sublimated, whereby improving the cleaning treatment of the belt, while preventing any cleaning/rinsing liquid to contact the lubrication bodies of the lubrication unit 12.

As the treatment is a dry treatment, the lubrication can be operated a few second after the end of a treatment operation, when the treatment is operated on a portion of the belt adjacent to another portion of the belt entering into the lubrication unit.

The $CO_2$ dry treatment unit comprises advantageously a means 201 for producing solid sublimable particles, a collecting means 202 receiving the so produced sublimable particles, said collecting means being connected to a gas supply 203 (for example an air supply) so as create a flow of solid particles which are moved in ducts 204 ending with adapted outlets so as to propel the particles towards the surfaces to be treated. Devices for blasting $CO_2$ solid particles are for example of the type as disclosed in EP1197297, U.S. Pat. No. 6,626,737, EP1852221, etc.

The invention further relates to a treatment unit, especially to a dry lubrication unit, to be associated to a conveyor comprising at least:

at least one endless conveyor belt (3),
at least one guiding element with at least one gliding face (11) for said at least one endless conveyor belt (3), said at least one guiding element being adapted for guiding the at least one endless conveyor belt at least partly in the transport direction (P1),
at least one lubricant provider for providing the endless conveyor belt (3) with at least one lubricant, and
at least a driving system for driving the conveyor belt along a continuous path comprising at least
a first path portion moving in accordance to said transport direction (P1), and a second path portion of said at least one endless belt (3) moving in a return direction (P2), whereby said conveyor belt comprises at least:
a transport surface (7) adapted to support the at least one container to be moved according to the transport direction, and
at least one guiding surface (10) opposite to the transport surface (7), whereby said at least one guiding surface (10) is adapted to have contact with at least one gliding face (11) of the guiding element.

Such a conveyor can be of the type disclosed in FIG. 1.

Figure 10:
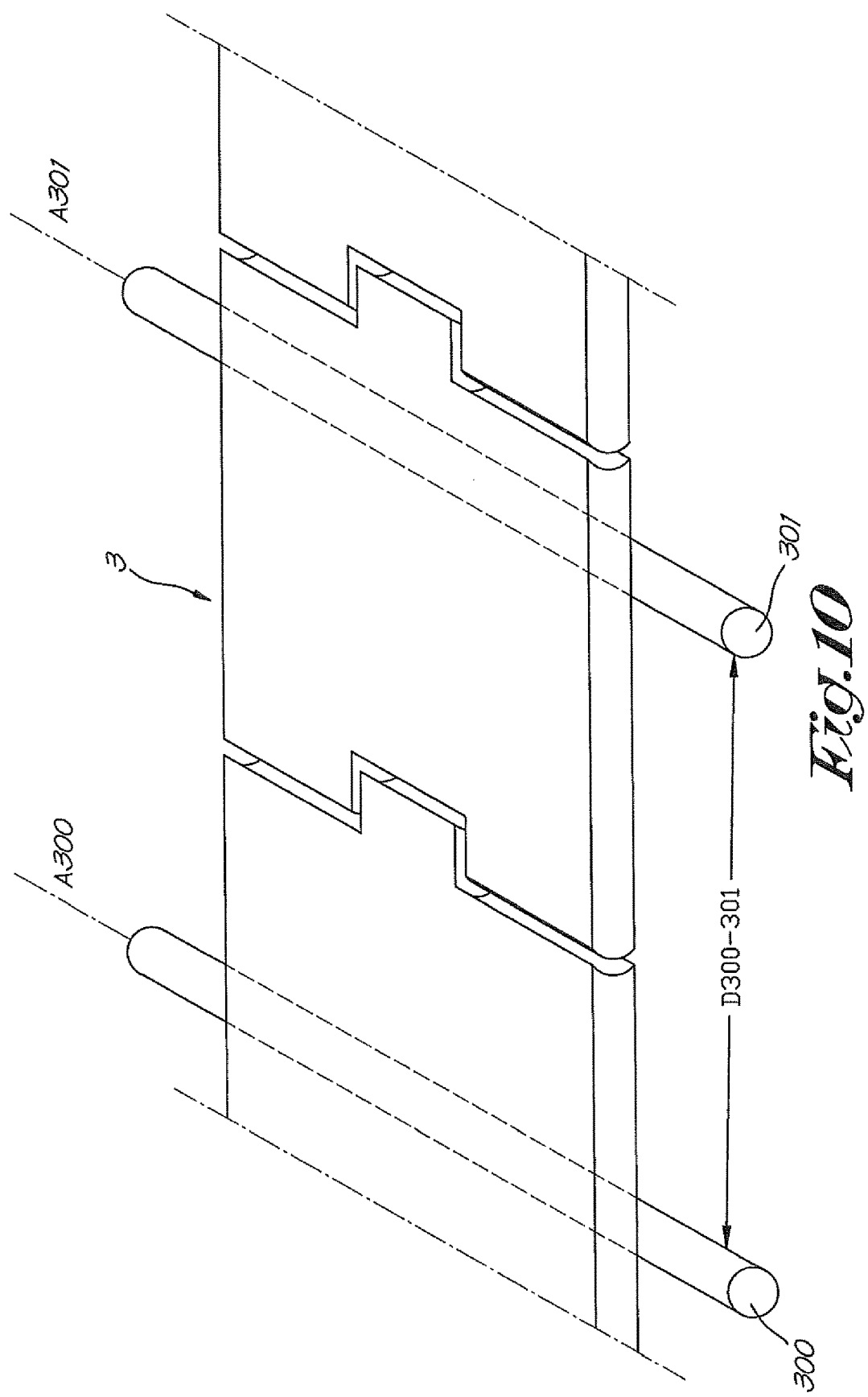
FIG. 10 is a schematic partial perspective view of a portion of the return path of the conveyor belt.
Figure 13A:
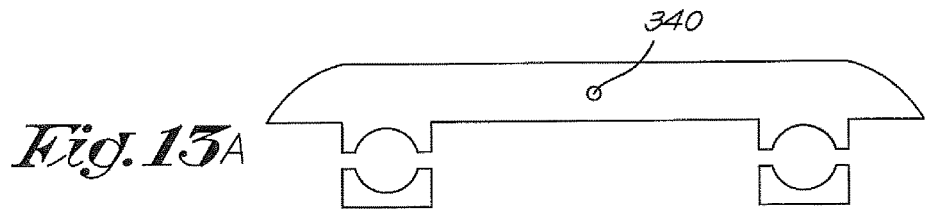
FIGS. 13A, 13B, 13C, 13D and 13E are schematic views of a third embodiment of a treatment unit to be mounted on two parallel axes (FIG. 13A being a lateral view, FIG. 13B a longitudinal cross section view, FIG. 13C an upper view, FIG. 13D a bottom view, and FIG. 13E a longitudinal cross section view of the treatment unit mounted on two parallel axes)
Figure 13C:
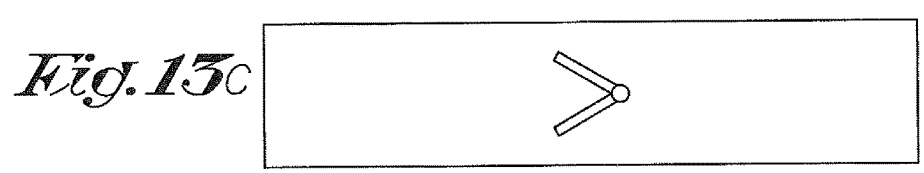
Figure 13B:
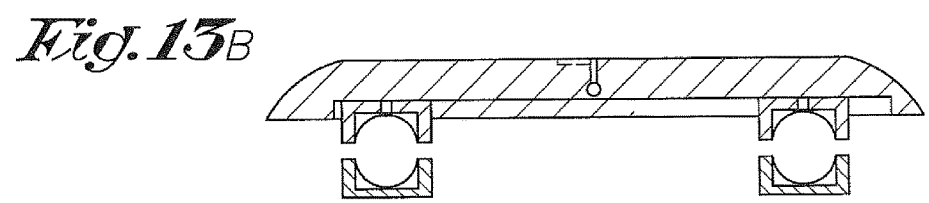
Figure 13D:
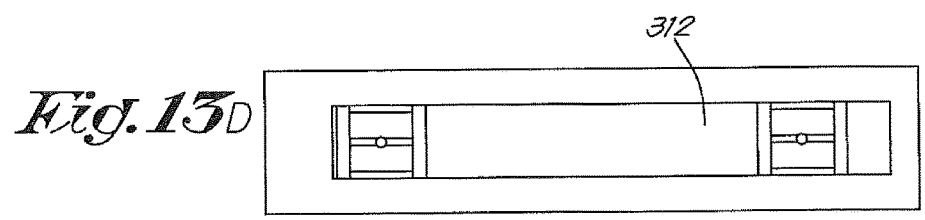
Figure 13E:
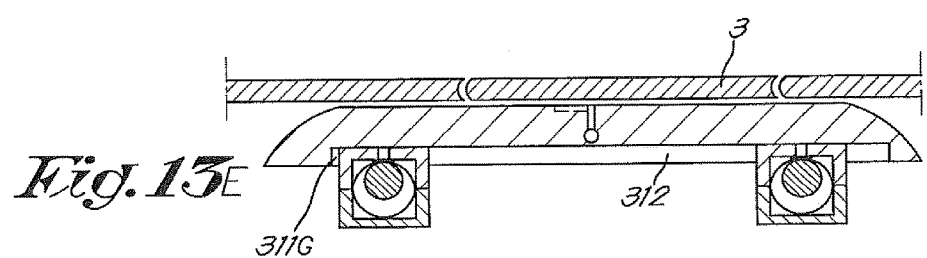

FIG. 10 shows schematically a part of the return path portion (P2), said return path portion being associated with a series of parallel supporting axis 300, 301 advantageously provided with rolling elements (the axis 300 and 301 can advantageously freely rotate around their central axis A300, A301), whereby at least two of said parallel supporting axes 300, 301 have each a cylindrical face 300C, 301C and a central axis A301, A300, while being distant the one from the other by a separating length D300-301. In FIG. 10, the part of the return path portion shown is not yet provided with a treatment unit.

According to a first embodiment (see FIG. 11), the treatment unit 310 comprises a treatment body 311 to be mounted on said at least two of said parallel supporting axes 300, 301 distant the one from the other by a separating length, the treatment body having at least one longitudinal guiding rail portion (in the form of a groove 312) extending between a first abutment end 313 and a second abutment end 314, a first sliding supporting element 315 adapted to slide at least in a part of the said longitudinal guiding rail portion 312, a part forming a second supporting element 316 which is a protrusion of the treatment body, and attachment means 317 for maintaining a relative position of the first sliding supporting element 315 after a sliding thereof in said at least a part of the said longitudinal guiding rail portion 312. By sliding the sliding supporting element 315, it is possible to adapt the distance separating between the two supporting elements to the separating length D300-301.

The first sliding supporting element 315 and the second supporting element 316 are each provided with a recess 315R, 316R defined at least partly with at least one edge portion, most specifically by several plate elements 320 with open semi-circular cuts, whereby each defining a semi circular edge adapted to contact the cylindrical face of the axis 301, 300. The recess 315R, 316R is adapted each for receiving at least a portion of one of said at least two of said parallel supporting axes, while having at least one edge portion contacting a portion of the cylindrical face of the said one of said at least two of said parallel supporting axes, when the treatment unit 310 is mounted on said at least two of said parallel axes 300, 301, whereby the said at least one edge portion respectively of the first sliding supporting element and the second supporting element is adapted for ensuring relative position stability respectively of the first sliding supporting element and of the second supporting element with respect to the central axis of the said cylindrical face on which the said at least one edge portion abuts.

When mounted on the two parallel successive axes, the treatment unit is substantially horizontal with two surface grooves 330 for receiving lubricant, especially dry lubricant from an inner channel 331. The ends 310E of the treatment unit 310 are curved, so as to avoid that parts of the belt 3 abut against the treatment body 311. The belt 3 when driven into movement slides against the upper face of the body 311 (see FIG. 11E). The position of the sliding supporting element 315 within the rail portion 312 can be maintained by a fixing piece, such as a screw 317 traversing a hole 315H so that its end is engaged within the body 311. Possibly the bottom of the rail portion 312 of the body 311 is provided with a series of apertures for receiving the end of a screw or with a longitudinal groove.

In order to ensure the treatment body 310 to be maintained in position with respect to the two parallel axes 300, 301, fixing elements 330 with recess are attached on the sliding supporting element 315 and the supporting element 316 so as to form closed recess surrounding the axis. The fixing elements 330 act also as means for limiting or preventing relative movement of the supporting elements 315, 316 with respect to their respective axis.

The body 310 is in the embodiment shown a lubrication unit provided with an inner channel 340 to be associated to a lubricant supply and with lubrication grooves 341 for supplying lubricant to the top surface of the body 311 so as to lubricate the top surface of the belt 3.

The embodiment of FIG. 12 is similar to that shown in FIG. 11, except that the supporting element 316 is similar to the supporting element 315, said supporting element 316 being adapted to be placed with a recess 311G. Said supporting element 316 is then fixed onto the body 310 by means of a fixing element, such as a screw 317.

The embodiment of FIG. 13 is similar to the embodiments of FIGS. 11 and 12, except that the second supporting element 316 is also a sliding supporting element adapted to slide with a groove forming the rail portion 312.

According to the embodiment of FIG. 13, the treatment unit 310 comprises a treatment body to be mounted on said at least two of said parallel supporting axes 300, 301 distant the one from the other by a separating length D300-301, the treatment body having at least one longitudinal guiding rail portion 312 extending between a first abutment end 312E1 and a second abutment end 312E2, a first sliding supporting element 315 adapted to slide at least in a part of the said longitudinal guiding rail portion 312, a second sliding supporting element 316, and attachment means for maintaining in position the second supporting element with respect to the treatment body, as well as attachment means for maintaining a relative position of the first/second sliding supporting elements after a sliding thereof in said at least a part of the said longitudinal guiding rail portion 312.

By adapting the relative position of the first sliding supporting element, it is possible to adapt the distance separating the first sliding supporting element from the second supporting element, to the distance separating said at least two parallel supporting axes, i.e. to the separating length.

Advantageously, according to a third embodiment, the treatment unit comprises a treatment body to be mounted on said at least two of said parallel supporting axes distant the one from the other by a separating length, the treatment body having at least one longitudinal guiding rail portion extending between a first abutment end and a second abutment end, a first sliding supporting element adapted to slide with respect to said at least one longitudinal guiding rail portion up to the first abutment end, a second sliding supporting element adapted to slide with respect to said at least one longitudinal guiding rail portion up to the second abutment end, and attachment means for maintaining a relative position of the first sliding supporting element and of the second supporting element with respect respectively to the first abutment end and the second abutment end of the said at least one longitudinal guiding rail portion, whereby the said at least one longitudinal guiding rail portion is adapted so that the first abutment end is distant from the second abutment end by a longitudinal distance greater than said separating length. The first sliding supporting element and the second sliding supporting element are each provided with a recess defined at least partly with at least one edge portion, whereby said recess is adapted for receiving at least a portion of one of said at least two of said parallel supporting axes, while having at least one edge portion contacting a portion of the cylindrical face of the said one of said at least two of said parallel supporting axes, when the treatment unit is mounted on said at least two of said parallel axes, whereby the said at least one edge portion respectively of the first sliding supporting element and the second sliding supporting element is adapted for ensuring relative position stability respectively of the first sliding supporting element and of the second sliding supporting element with respect to the central axis of the said cylindrical face on which the said at least one edge portion abuts.

By adapting the relative position of the first and second sliding supporting elements with respect to the first and second abutment ends, it is possible to adapt the position of the treatment body with respect to the parallel supporting axes.

Advantageously, the first and/or second sliding supporting element and/or second supporting element are each provided with a means for limiting the movement of the sliding supporting elements when each of said element is mounted on a cylindrical face portion of one of said at least two of said parallel axes, in a direction perpendicular to the central axis of said cylindrical face portion. It means thus that the supporting element and/or sliding supporting elements are able to slide along at least a portion of one of said parallel axis. Preferably, each supporting element or sliding supporting element comprises at least two parts adapted to be attached the one with the other. The parts are for example attached the one with the other with a means adapted to enable one part to be mobile with respect to the other part or to be removed from said other part. The parts are advantageously such to form a recess with edges surrounding the cylindrical face portion. It means thus that the sliding supporting element is not moving in a direction perpendicular to the central axis, when the said axis is driven into rotation.

The treatment body is advantageously a body adapted for ensuring a dry lubrication, i.e. a dry lubrication body.

The said dry lubrication body has advantageously at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$, advantageously less than 500 mm$^2$, preferably less than 100 mm$^2$, most preferably less than 50 mm$^2$, such as less than 10 or 5 mm$^2$ along the substantially planar lubrication surface, recesses with an opening of less than 1000 mm$^2$, advantageously less than 500 mm$^2$, preferably less than 100 mm$^2$, most preferably less than 50 mm², such as less than 10 or 5 mm² along the substantially planar lubrication surface, and grooves with an opening of less than 1000 mm², advantageously less than 500 mm², preferably less than 100 mm², most preferably less than 50 mm², such as less than 10 or 5 mm² along the substantially planar lubrication surface. Said dry lubrication body is advantageously provided with attachment means, such as quick attachment means, for connecting the dry lubrication body to a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system.

The treatment body can also be provided with one or more nozzles, such as spray nozzle(s) 400, for directing a treatment medium, advantageously a liquid treatment medium onto a surface of the conveyor belt. The nozzle(s) can be adapted for spraying the transport surface and/or the guiding surface of the belt. (See FIG. 14). The body 311 is provided with an inner channel 345 adapted to be connected to a supply for the treatment medium. The body 311 is similar to that shown in FIGS. 11 to 13 so as to be supported on the two parallel axes 300, 301. The body 311 is provided with longitudinal protrusions 311L for guiding the sprayed liquid onto the belt 3 and partly onto the body towards one or other lateral end of the body 311.

The inner channel 340 has outlets adapted each to be connected to a supporting arm 410 ending with a spray nozzle 400.

The surface of the body 311 to be in contact with the moving belt is advantageously provided with a low friction layer. The whole body 311 can also be made of low friction material.

Figure 15:
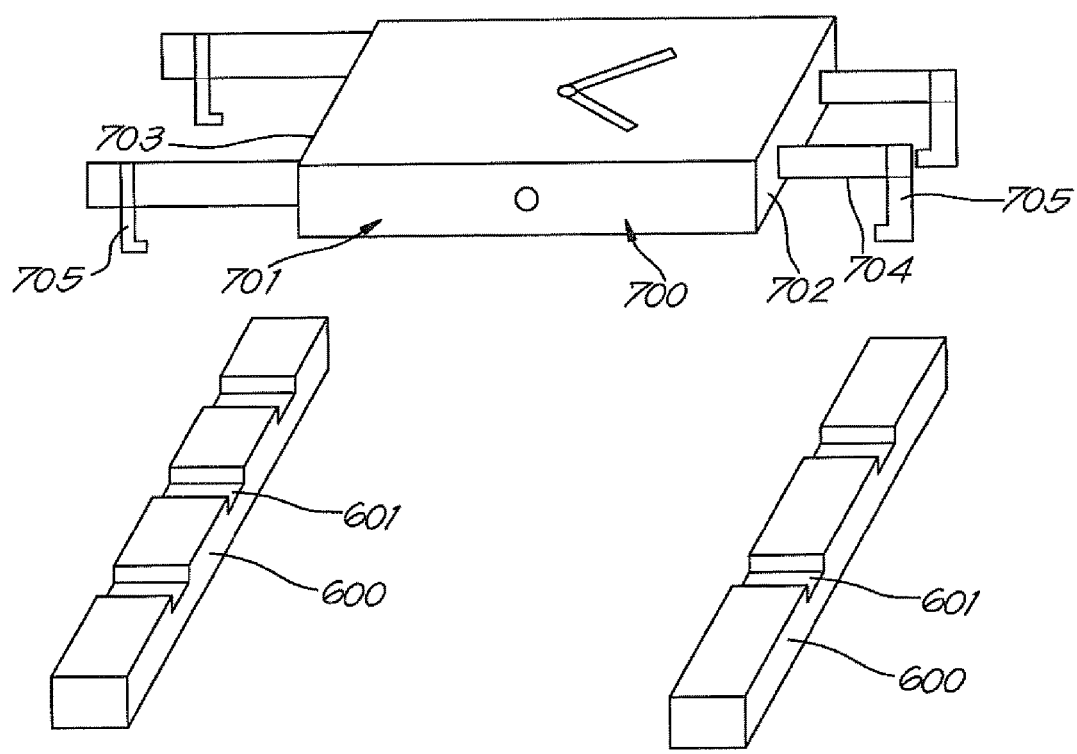
FIGS. 15 and 16 are schematic views in perspective and in lateral cross section) of a fifth embodiment of a treatment unit of the invention.

FIG. 15 shows a treatment unit, especially a dry lubrication unit, to be associated to a conveyor as shown in FIG. 1 comprising at least:
at least one endless conveyor belt (3),
at least one guiding element with at least one gliding face (11) for said at least one endless conveyor belt (3), said at least one guiding element being adapted for guiding the at least one endless conveyor belt at least partly in the transport direction (P1),
at least one lubricant provider for providing the endless conveyor belt (3) with at least one lubricant, and
at least a driving system for driving the conveyor belt along a continuous path comprising at least
a first path portion moving in accordance to said transport direction (P1), and a second path portion of said at least one endless belt (3) moving in a return direction (P2), whereby said conveyor belt comprises at least:
a transport surface (7) adapted to support the at least one container to be moved according to the transport direction, and
at least one guiding surface (10) opposite to the transport surface (7), whereby said at least one guiding surface (10) is adapted to have contact with at least one gliding face (11) of the guiding element.
The return path portion P2 is associated with a series of supporting elements 600 distant from each other, advantageously parallel to each other, each being provided with recesses 601, while being distant the one from the other by a separating length, said supporting elements being adapted for supporting at least a portion of the transport surface during the return path portion, possibly with interposition of an anti friction piece,
The treatment unit 700 comprises a body 701 with two opposite ends 702, 703, each ends 702, 703 being provided with two arms 704 with abutment 705. The arms 704 are adapted to be placed in recesses 601 of two adjacent supporting elements 600.

Figure 16:
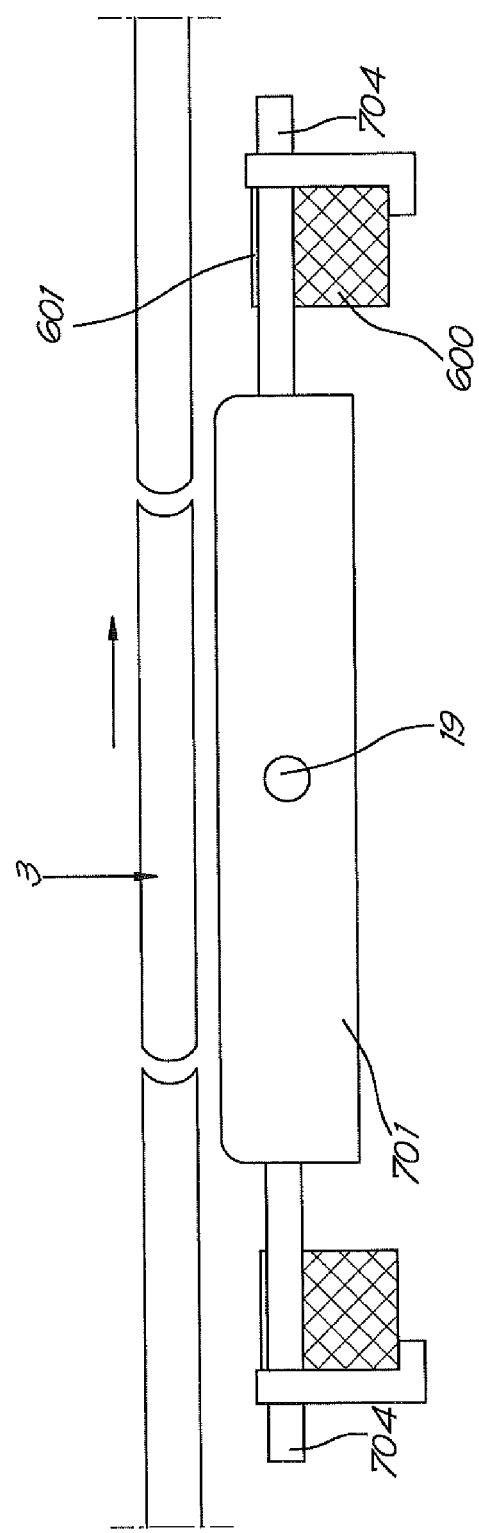

The upper face of the body 701 and the arms 704 are adapted so that when the arms rest in the recesses 601 of the beams 600, said upper face is at a level above the upper level of the beams 600 (see FIG. 16). The end edges of the upper face of the body are curved, so as to ensure a gentle contact of the upper face of the body with the transport surface of the belt during the return path thereof.

Figure 17:
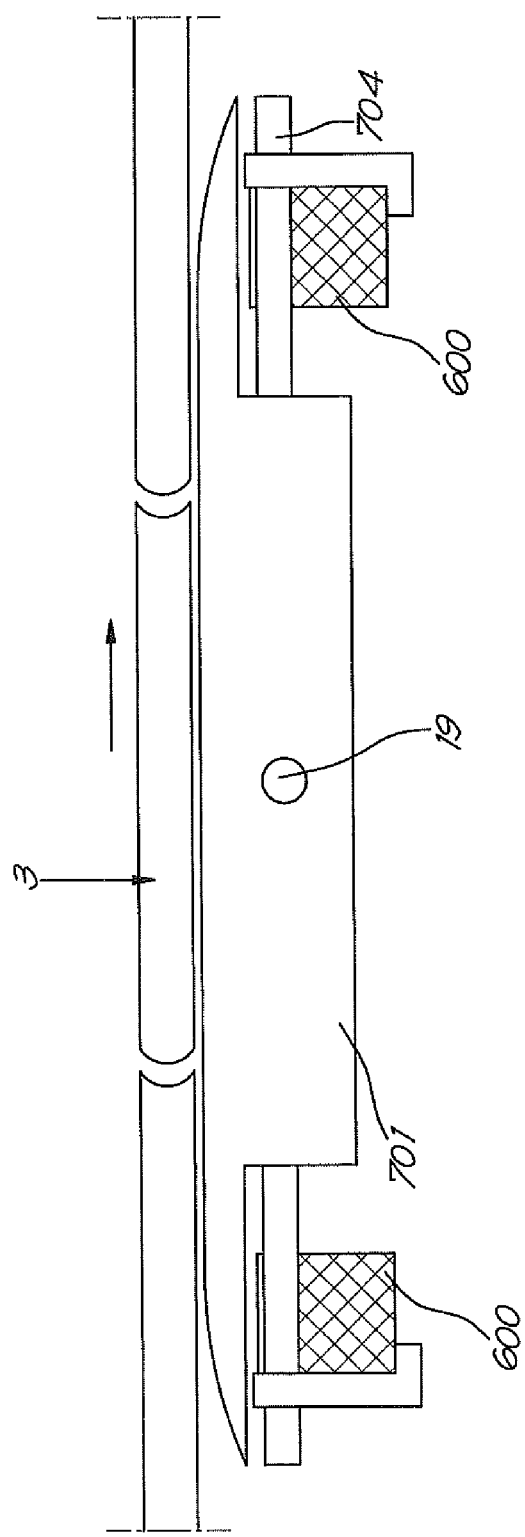
FIG. 17 is a schematic view (in cross section) of a sixth embodiment of a treatment unit of the invention.

In the embodiment of FIG. 17, the upper face of the body has extension covering at least partly the arms 704, said extension being adapted for covering the beams 600.

Possibly the position of the abutments 705 is mounted mobile with respect to the arms 704, so as to maintain the body in a position with respect to the beams. The abutments are then also advantageously provided with a foot 705bis adapted to rest on the downwards face of the beams 600.

Figure 6A:
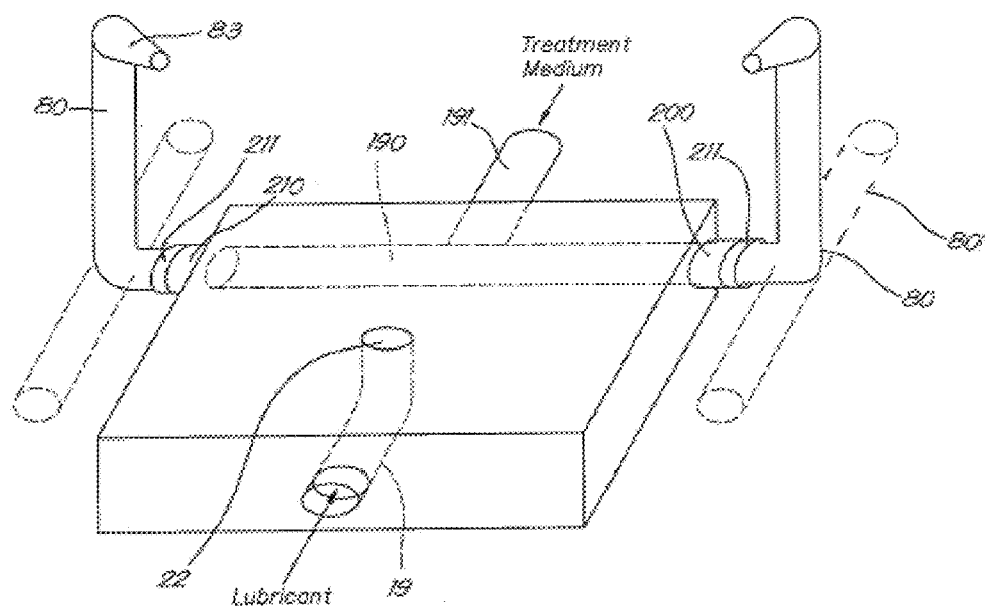
Figure 7:
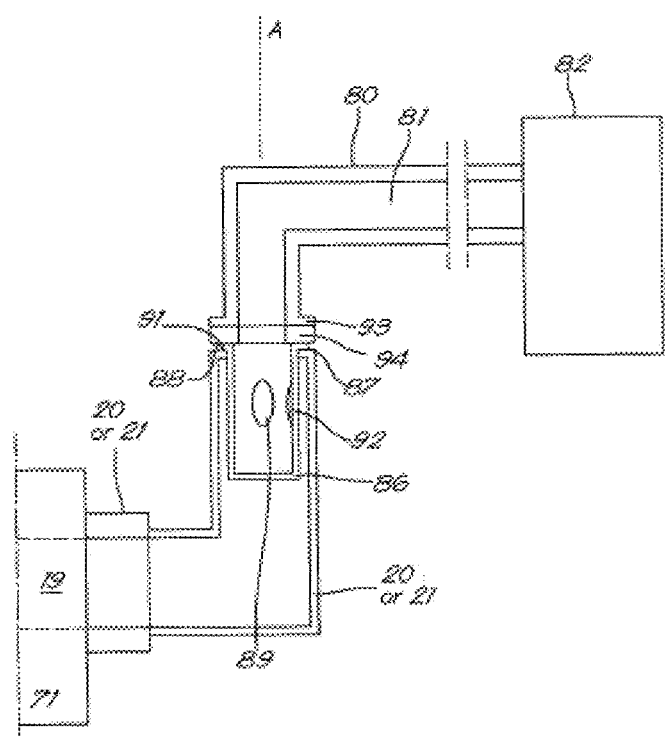
FIG. 7 is a schematic view of a detail of the lubrication unit of FIG. 6, in cross section and with take away portions, the arm being in its second position.

The body 701 can be provided with inner channels as for the embodiment of FIG. 6 or 6A.

Figure 18:
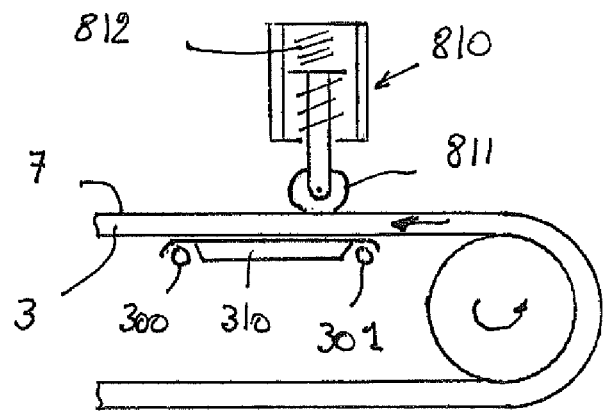
FIG. 18 is a schematic view of a unit for determining a parameter function of the friction of the moving transport surface 7.

FIG. 18 is a schematic view of a system 810 for determining a parameter function of the friction or friction coefficient of the transport surface. Said system comprises a cylinder 811 having a smooth surface, said cylinder is pushed towards the transport surface by a pushing means 812, such as an elastic means 812 or a pneumatic cylinder. When the transport surface 7 is moved, a rotation of the cylinder 811 is generated, said rotation being function of the friction of the cylinder 811 on the transport surface. In order to keep the transport surface in a plane for the section where the friction parameter is determined, a support 820 is used for the downwards face of the belt 3. Said support is for example similar to the unit 310 carried by two successive supporting axes 300,301. The device 810 determines the speed of rotation of the cylinder 811, as well as the relative axial movement of the cylinder 811 towards the transport surface and/or the pushing force due to the spring 812. In order to prevent some braking effect and to have more accurate value of the variation of the friction parameter, the cylinder is moved into rotation at a rotation speed corresponding to a linear speed corresponding substantially to a speed just below the linear speed of the transport surface 7 (for example a speed corresponding to 90-95% of the linear speed of the transport surface). In function of the friction of the transport surface 7, the rotation speed of the cylinder will be increased to about a speed corresponding to a linear speed corresponding to the speed of the transport surface. The difference between the linear speed of the cylinder and the speed of the transport surface is function of the friction. Higher will be the friction, lower will be said difference.

The device 810 determines an average of the friction parameter on a time period correspond for example to the time required for the belt to travel a complete loop. In case said friction parameter is outside a range corresponding to an acceptable friction, the device 810 sends then a signal to the control unit PLC, so as to generate at least first a cleaning step and then a lubricating step of the transport surface 7.

Such a device 810 enables to measure on a continuous way a parameter function of the friction of the transport surface 7.

Possibly, the rolling cylinder 811 can be replaced by a series of rolling cylinders so as to determine different parameters of the friction for different longitudinal portions of the belt 3. In that case, the device 810 can send a signal to the PLC, when the determined average parameter of the friction for a longitudinal section of the belt 3 is outside an acceptable friction range.

The device 810 can also be used for controlling the efficiency of the treatment (cleaning) and/or of the lubrication.

Figure 19:
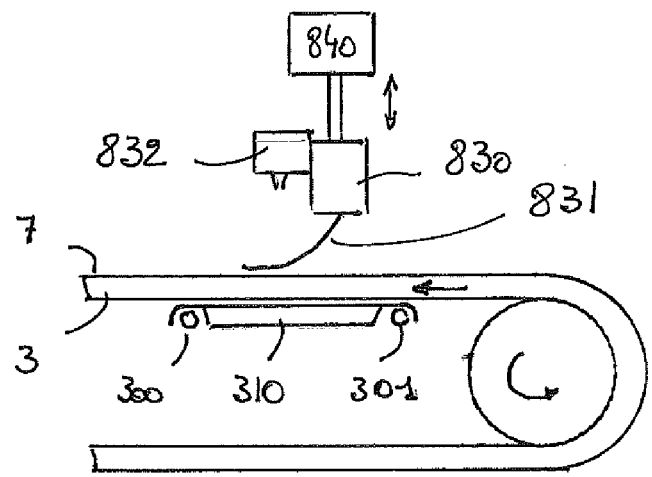
FIG. 19 is a further view of another unit for determining a parameter function of the friction of the moving transport surface 7.

FIG. 19 is a view of a further device for determining a parameter linked to the friction.

The device 830 comprises a flexible blade 831 which is pushed on the moving transport surface 7. The blade 831 has a smooth face contacting the transport surface, and an opposite back metal face. The thickness of the blade is thin, less than 1 mm, especially less than 0.5 mm, whereby the heating of the blade due to the friction of the moving belt 3 can be determined.

For determining the temperature of one or more portions of the back metal face with an infrared thermometer 832. The device determines advantageously the variation of temperature during the time for a specified speed of the transport belt 3. Possibly, but advantageously the device 830 is mounted movable on a support 840 between a position in which the flexible blade contacts the belt 3 and a position in which the blade 831 is not contacting the belt 3. Possibly, the means for adapting the relative position of the blade 831 with respect to the belt 3 is adapted for adapting the pressure of the blade 831 onto the support surface 7.

Due to the friction of the blade onto the transport surface, the blade is submitted to a small heating, which is function of the friction of the transport surface. By determining the variation of the temperature of the blade 831 contacting the belt 3 for more than one complete loop, it is possible to have a view of the status of the belt 3.

When a variation of temperature in function of the time higher than a predetermined variation is determined, a signal is sent by the device 830 to the PLC for controlling the cleaning step and thereafter the dry lubrication step.

Figure 21A:
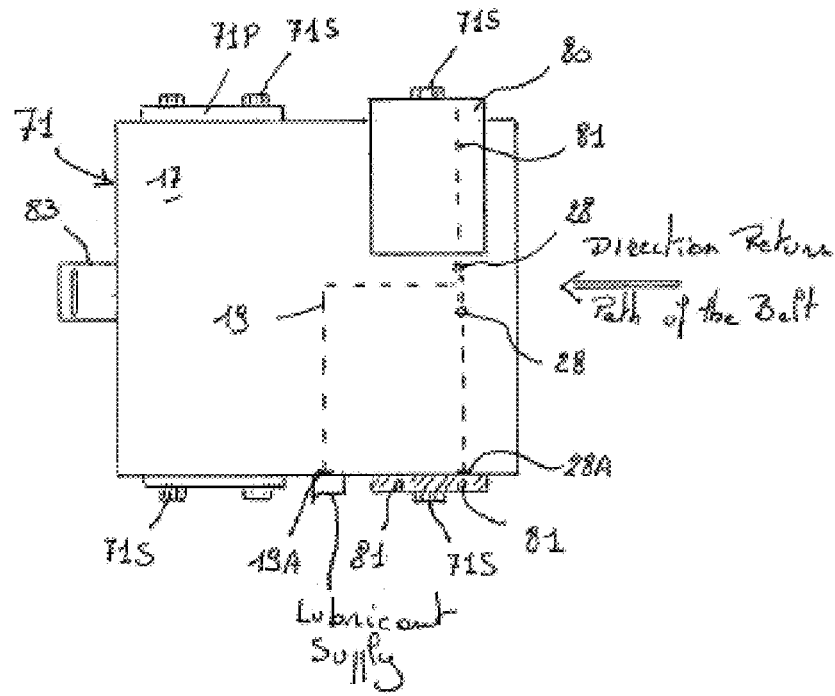
FIGS. 21A and 21B are respectively an upper view (with partial cross section) showing the channels for lubricant (in dash lines) inside the body 71, and downside view showing the channels for cleaning medium (in dash lines)
Figure 21B:
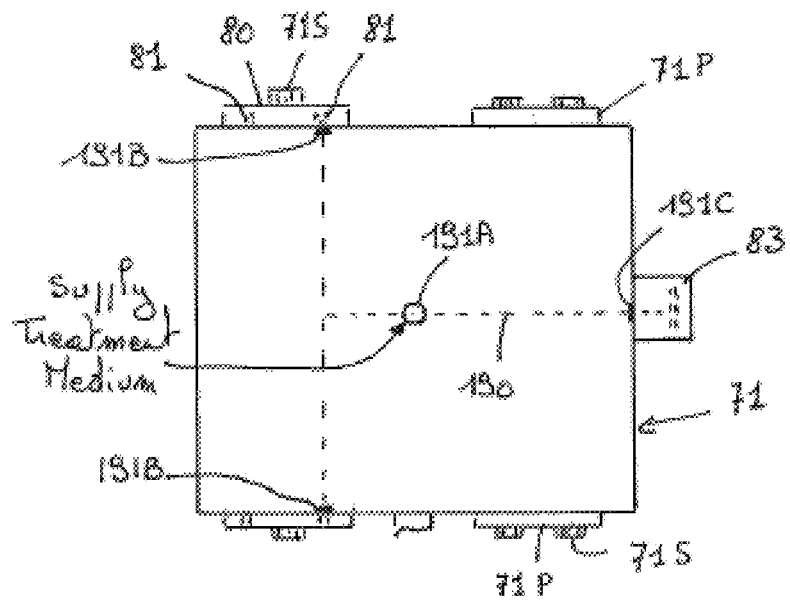

FIGS. 20 and 21 are perspective views of an all in one lubrication/cleaning unit 71 with an inner channel system 19 for lubricant, said system 19 having an inlet opening 19A intended to be connected to a lubricant supply system, one or more outlet openings 28 located on the upper face of the body 71, one or more side openings 28A adapted to cooperate with inner channel 81 of the L-shaped side arms 80 ending with a spray head 83, The arms 80 are mounted on the body 71, in a releasable or mobile manner, for example after removing one or more bolts or screws 71S.

The body 71 is associated to side plates 71P attached on a release manner to the body 71 via bolts or screws 71S, said side plates 71P having openings for attaching the plates to a supporting element of the conveyor belt 3.

The body 71 is also provided with an inlet bottom 191A (adapted to be connected to a treatment medium supply) communicating with inner channels 190 ending in three side openings 191B, 191C, the side openings 191B being adapted to cooperate with inner channel 81*bis* within the arms 80, ending with a spray end 83*bis* for spraying a treatment medium, The side opening 191 C is associated to a spray cleaning head 83H intended to spray treatment medium in the moving direction of the belt during its return path.

The unit of FIGS. 20 and 21 is adapted for treating/lubricating both sides of the belt during its return path.

The unit is easy to be mounted and can be used with or without arms 80, said body 71 being able to be used for multiple purposes, while being easy to be removed from a conveyor support. A body can even be replaced during the driving of the belt, i.e. enabling repairs without having to stop the conveyor belt.

The opening 191C is connected to a spray head 83*ter* adapted to form a spray field 83SF of treatment medium on the transport surface moving along its return path.

The all in one unit 71 can be used in several ways. When the belt 3 is moving along its return path between the space defined by the lubricating surface 17 and the heads 83, 83*bis*, both surfaces of the belt can be cleaned and/or lubricated by connecting the unit to a lubricant supply and/or to a treatment medium supply. The unit can also be used for treating/lubricating for example one part of the surface of the belt opposite to the transport surface, during the transport path and/or during the return path, possibly combined with a cleaning/lubricating of a part of the transport surface during its transport path.

The unit 71 and the arms are for example produced by 3D printing, whereby enabling to form all the inside channels for lubricant, well separated from the inside channels for cleaning/rinsing/treating medium.

Figure 22:
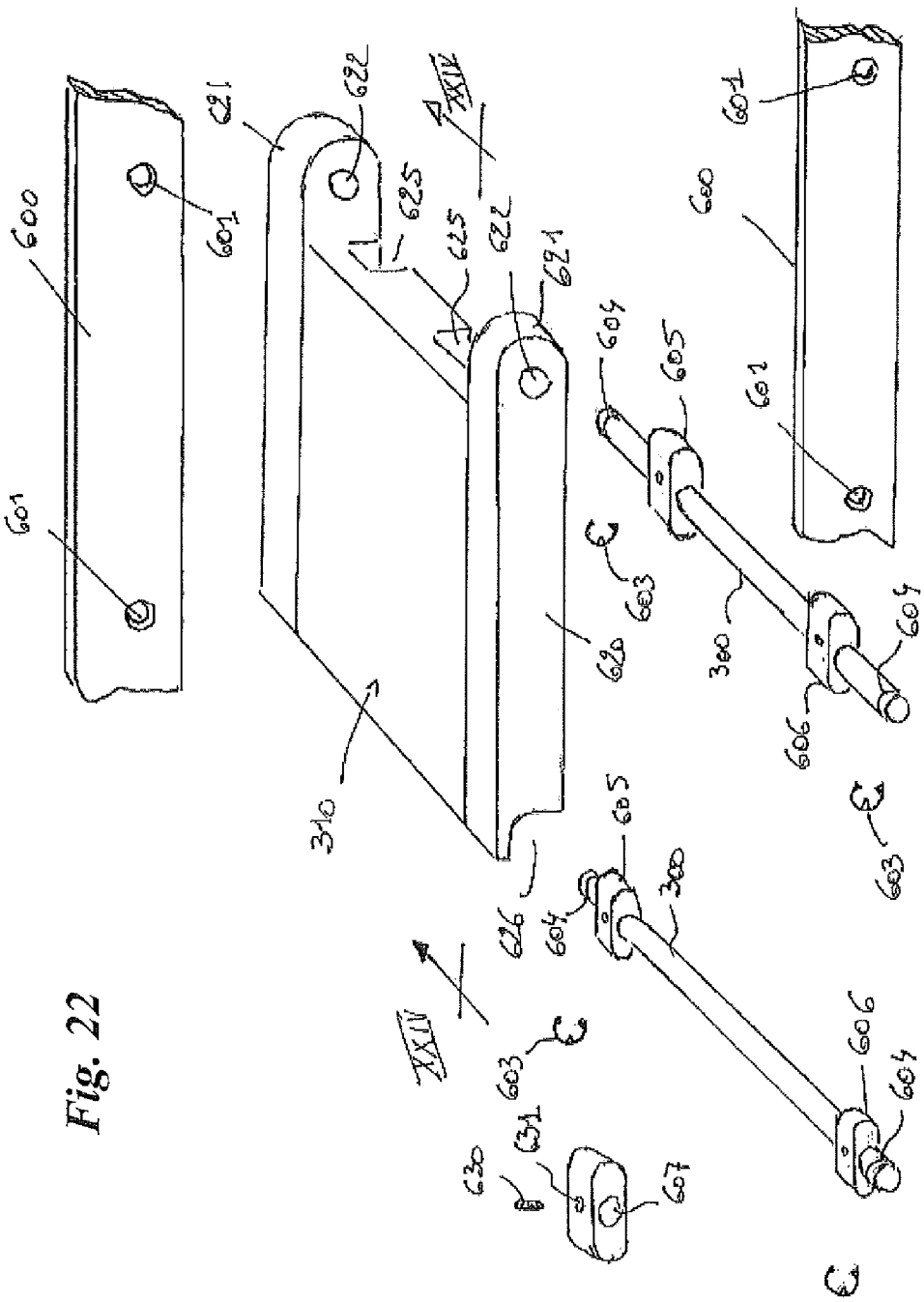
FIG. 22 is an exploded view of two supporting elements (300) extending between two vertical plates of a structure, for the return path (P2) of the belt (3), said supporting elements being associated to a treatment unit or a lubricating unit (310)

FIG. 22 is an exploded view of a part of the conveyor of the invention. Said part is a portion of the return path of the belt 3. Said part comprises two plates 600 distant from each other and parallel to each other. Between said two plates 600 of the structure extend among others two rods 300 acting as supporting elements (300) for the belt along its return path (P2), when the said rods are not associated to a unit, such as a lubricating unit 310. The rods 300 have their free ends traversing the plates 600 via holes 601. The positioning of the rods 300 with respect to the plates 600 can be ensured via abutting means or clips 603 to be fixed in grooves 604 of the rods 300. The rods 300 are mounted with respect to the structure so as to be able to rotate.

Each rod is provided with a pair of shoes 605, 606 having each a central hole 607 for the passage of the rod 300. The positioning of the shoes 605, 606 along the rod can then be operated by sliding the shoes. For keeping a position of the shoe with respect to the rod a screw or other attachment means 630 can be used. Said screw or fixation means is for example screwed into a hole 631 of the shoe, said hole extending up to the central hole 607.

The unit 310 has a body 620 provided along an end edge with two ears 621 having a central hole 622 adapted for enabling the passage of the rod 300. The end surface of each ear 621 is curved, defining a hemicylindrical face with an axis corresponding to the axis of the hole 622.

The body 620 is provided with recesses 625, 626 along its opposite edges, said recesses being each adapted for receiving part of a shoe, when the position of the body 620 has to be maintained.

The shoes when mounted on a rod 300 form protruding elements, a first surface acting as means for maintaining the body of the unit in a position for which the belt contacts the unit, and a second surface acting as means for maintaining the belt 3 away from the unit 300, position for which the body is able to pivot around the axis of a rod 300.

In FIGS. 23 and 24, the shoes of the rods are engaged in recesses of the body 620, whereby preventing the pivotment of the body, the unit being in a position where the belt 3 is contacting a surface of the unit, for example for lubrication purposes. The body can also be used for other purposes than lubrication, such as for measuring the friction, for cleaning, for drying, etc.

In FIG. 25, the shoes are no more engaged in the recesses of the body whereby enabling a pivotment (R) of the body 620, whereby enabling a cleaning of the body without having to stop the working of the conveyor.

What I claim is:

1. A moving conveyor ensuring at least a movement of at least one container according to a transport direction (P1), whereby said conveyor (1) comprises at least:
- at least one endless conveyor belt (3) having a portion moving in the transport direction (P1), while another portion of the belt is moving in a return direction opposite to the transport position,
- a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction,
- at least one lubricant provider for providing the endless conveyor belt (3) with at least one lubricant, and
- at least a driving system for driving the conveyor belt along a continuous path comprising at least
- a first path portion moving in accordance to said transport direction (P1), and a second path portion of said at least one endless belt (3) moving in the return direction (P2), whereby said conveyor belt comprises at least:
  - (a) a transport surface (7) adapted to support the at least one container to be moved according to the transport direction (PI), and adapted to contact supporting elements for the portion moving in the return direction (P2)
  - (b) at least one guiding surface (10) opposite to the transport surface (7), whereby said at least one guiding surface (10) is adapted to have contact with at least one gliding face (11) of the guiding element,
- in which the moving conveyor comprises a system which comprises at least:
  - (a) a unit selected from the group consisting of
    - (a1) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (a11) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 $mm^2$ along the substantially planar lubrication surface, recesses with an opening of less than 1000 $mm^2$ along the substantially planar lubrication surface, and grooves with an opening of less than 1000 $mm^2$ along the substantially planar lubrication surface, and (a12) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system,
    - (a2) a treating unit distinct from the dry lubricating unit adapted to ensure at least a treatment step different from a dry lubrication step by contacting, when required, a part of the transport system at least with an active treatment element, and
    - (a3) combinations thereof, and
  - (b) a single programmable logic controller (PLC) comprising at least (b1) one friction controlling means for controlling the friction between the said one container and the transport surface (7) of the conveyor belt (3); the said one friction controlling means generating at least one instruction selected among the group consisting of a lubrication instruction controlling the supply of lubricant to the outlet opening system of the dry lubricating unit, a treatment instruction for controlling the treatment step in the said treating unit, and combinations thereof,
- whereby a unit selected from the group consisting of the dry lubricating unit, the treating unit and combinations thereof is associated in a movable manner with the supporting system, without having to remove all the return supporting elements attached to the supporting system.

2. The moving conveyor of claim 1, whereby a unit selected from the group consisting of the dry lubricating unit, the treating unit and combinations thereof is associated in an at least pivotable manner with the supporting system, without having to remove all the return supporting elements attached to the supporting system.

3. The moving conveyor of claim 1, whereby a unit selected from the group consisting of the dry lubricating unit, the treating unit and combinations thereof is associated in a removable manner with the supporting system, without having to remove all the return supporting elements attached to the supporting system.

4. The moving conveyor of claim 1, in which the supporting system comprises a series of supporting elements distant from each other, said supporting elements comprising at least a first supporting element and a second supporting element, said first supporting element and said second supporting element while not being associated to one of the said unit being adapted for supporting at least a portion of the transport surface during the return path portion, whereby a unit selected from the said group consisting of the dry lubricating unit, the treating unit and combinations thereof comprises a body with at least a first bearing element adapted to rest on the first supporting element, and a second bearing element adapted to rest on the second supporting element, whereby said second bearing element is distant from the first bearing element.

5. The moving conveyor of claim 3, in which the said first bearing element and second bearing element of the body are each provided with at least one contacting element with a contacting face having a sliding surface with low static and dynamic friction coefficients below 0.06 with respect to steel.

6. The moving conveyor of claim 3, in which the said first bearing element and second bearing element of the body are each provided with at least one contacting element with a contacting face having a sliding surface with low static and dynamic friction coefficients below 0.05 with respect to steel.

7. The conveyor of claim 1, which further comprises
a friction measuring unit for measuring a parameter at least function of the friction of the transport surface (7) of the conveyor belt (3), said parameter being adapted for determining whether the friction is or not within an unacceptable friction range and/or within an acceptable friction range, said friction measuring unit generating at least one friction related signal function of the said parameter, and
a control unit controlling at least a working of the unit selected from the group consisting of the dry lubricating unit, the treating unit, and combination thereof, said control unit receiving the at least one signal from the friction measuring unit, whereby ensuring the working of the unit selected from the group consisting of the dry lubrication step, the treating unit and combinations thereof, when the at least one signal received by the control unit from the friction measuring unit is within the unacceptable friction range or outside the acceptable friction range.

8. A moving conveyor ensuring at least a movement of at least one container according to a transport direction (P1), whereby said conveyor (1) comprises at least:
at least one endless conveyor belt (3) having a portion moving in the transport direction (P1), while another portion of the belt is moving in a return direction opposite to the transport position,
a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction,
at least one lubricant provider for providing the endless conveyor belt (3) with at least one lubricant, and
at least a driving system for driving the conveyor belt along a continuous path comprising at least
a first path portion moving in accordance to said transport direction (P1), and a second path portion of said at least one endless belt (3) moving in the return direction (P2), whereby said conveyor belt comprises at least:
(a) a transport surface (7) adapted to support the at least one container to be moved according to the transport direction (PI), and adapted to contact supporting elements for the portion moving in the return direction (P2)
(b) at least one guiding surface (10) opposite to the transport surface (7), whereby said at least one guiding surface (10) is adapted to have contact with at least one gliding face (11) of the guiding element,
in which the moving conveyor comprises a system which comprises at least:
(i) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 $mm^2$ along the substantially planar lubrication surface, recesses with an opening of less than 1000 $mm^2$ along the substantially planar lubrication surface, and grooves with an opening of less than 1000 $mm^2$ along the substantially planar lubrication surface, and (a2) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system,
(ii) a treating unit distinct from the dry lubricating unit adapted to ensure at least a treatment step different from a dry lubrication step by contacting, when required, a part of the transport system at least with an active treatment element or agent, and
(iii) a single programmable logic controller (PLC) comprising at least one friction controlling means for controlling the friction between the said one container and the transport surface (7) of the conveyor belt (3); the said one friction controlling means generating at least one lubrication instruction controlling the supply of lubricant to the outlet opening system of the dry lubricating unit, and at least one treatment instruction for controlling the treatment step in the said treating unit,
whereby at least one unit selected from the group consisting of the dry lubricating unit, the treating unit and combinations thereof is associated in a movable manner with the supporting system, without having to remove all the return supporting elements attached to the supporting system.

9. The conveyor of claim 8, in which the single programmable logic controller (PLC) comprises at least (c1) one means for generating lubricating instructions for controlling the supply of lubricant to the outlet opening system of the dry lubricating unit,; (c2) one means for generating at least one treatment instruction for controlling the said treating unit, and (c3) one means for generating at least one preventing instruction for preventing the supply of lubricant to the outlet opening system of the dry lubricating unit at least during a treatment step by the said treating unit.

10. The moving conveyor of claim 8, whereby a unit selected from the group consisting of the dry lubricating unit, the treating unit and combinations thereof is associated in an at least pivotable manner with the supporting system, without having to remove all the return supporting elements attached to the supporting system.

11. The moving conveyor of claim 8, whereby a unit selected from the group consisting of the dry lubricating unit, the treating unit and combinations thereof is associated in a removable manner with the supporting system, without having to remove all the return supporting elements attached to the supporting system.

12. The conveyor of claim 8, which further comprises
a friction measuring unit for measuring a parameter at least function of the friction of the transport surface (7) of the conveyor belt (3), said parameter being adapted for determining whether the friction is or not within an unacceptable friction range and/or within an acceptable friction range, said friction measuring unit generating at least one friction related signal function of the said parameter, and a control unit controlling at least a working of the unit selected from the group consisting of the dry lubricating unit, the treating unit, and combination thereof, said control unit receiving at least the one friction related signal from the friction measuring unit, whereby ensuring the working of the unit selected from the group consisting of the dry lubrication step, the treating unit and combination thereof, when the at least one friction related signal received by the control unit from the friction measuring unit is within the unacceptable friction range or outside the acceptable friction range.

13. A moving conveyor ensuring at least a movement of at least one container according to a transport direction (P1), whereby said conveyor (1) comprises at least:

at least one endless conveyor belt (3) having a portion moving in the transport direction (P1), while another portion of the belt is moving in a return direction opposite to the transport position, a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction, at least one lubricant provider for providing the endless conveyor belt (3) with at least one lubricant, and at least a driving system for driving the conveyor belt along a continuous path comprising at least a first path portion moving in accordance to said transport direction (P1), and a second path portion of said at least one endless belt (3) moving in the return direction (P2), whereby said conveyor belt comprises at least:

(a) a transport surface (7) adapted to support the at least one container to be moved according to the transport direction (PI), and adapted to contact supporting elements for the portion moving in the return direction (P2)

(b) at least one guiding surface (10) opposite to the transport surface (7), whereby said at least one guiding surface (10) is adapted to have contact with at least one gliding face (11) of the guiding element, in which the moving conveyor comprises a system which comprises at least:

(i) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (a1) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$ along the substantially planar lubrication surface, recesses with an opening of less than 1000 mm$^2$ along the substantially planar lubrication surface, and grooves with an opening of less than 1000 mm$^2$ along the substantially planar lubrication surface, and (a2) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system, (ii) a treating unit distinct from the dry lubricating unit adapted to ensure at least a treatment step different from a dry lubrication step by contacting, when required, a part of the conveyor belt at least with an active treatment element or agent, and (iii) a single programmable logic controller (PLC) comprising at least (c1) one friction control means for generating at least one lubricating instruction for controlling the supply of lubricant to the outlet opening system of the dry lubricating unit; and (c2) one means for generating at least one treatment instruction for controlling the said treating unit, whereby a unit selected from the group consisting of the dry lubricating unit, the treating unit and combinations thereof is associated in a movable manner with the supporting system, without having to remove all the return supporting elements attached to the supporting system, in which the treating unit distinct from the dry lubricating unit is adapted to ensure at least a treatment step different from a dry lubrication step by contacting, when required, a part of the transport system at least with an active treatment, and in which the single programmable logic controller (PLC) comprises at least (c1) one friction control means for generating at least one lubricating instruction for controlling the supply of lubricant to the outlet opening system of the dry lubricating unit; (c2) one means for generating at least one treatment instruction for controlling the treating unit for contacting, when required a part of the conveyor belt with the active treatment element, and (c3) one prevention means for generating at least one preventing instruction for preventing the supply of lubricant to the outlet opening system of the dry lubricating unit at least during a treatment step by the treating unit by contacting the conveyor belt with the active treatment element.

14. The conveyor of claim 13, in which the single programmable logic controller (PLC) comprises at least one prevention means for generating at least a preventing instruction for preventing the supply of lubricant to the outlet opening system of the dry lubricating unit, said prevention means generating at least one preventing instruction for preventing the supply of lubricant to the outlet opening system of the dry lubricating unit at least 5 seconds before a start of a treatment step by the treating unit.

15. The conveyor of claim 13, in which the treating unit comprises at least a microfibre electrostatic active treatment element mounted on a movable support between a first position in which the microfibre electrostatic active treatment element is contacting a part of conveyor belt, and a second position in which the microfibre electrostatic active treatment element is away from the conveyor belt.

16. The conveyor of claim 13, in which the treating unit comprise at least one medium application unit for applying, when required, at least one treatment medium comprising at least one active treatment ingredient on a part of the transport surface (7) of the conveyor belt (3), said medium application unit being selected from the group consisting of (b1) units comprising at least one treatment medium outlet, adapted for directing at least the treatment medium on a part of the transport surface away from the substantially planar lubrication surface of the first lubrication body, and combinations thereof.

17. The conveyor of claim 13, which further comprises a rinsing unit for ensuring a rinsing step for at least a part of the conveyor belt previously treated by the treating unit with the treatment medium, said rinsing unit comprising:
at least one outlet or spray nozzle adapted for directing or spraying an aqueous rinsing medium on a part of the conveyor belt previously treated by the treating unit;
a supply means for providing said aqueous rinsing medium under pressure to the said at least one outlet or spray nozzle,
in which the at least one prevention means for generating at least one preventing instruction for preventing the supply of lubricant to the outlet opening system of the dry lubricating unit is selected from the group consisting of a means for generating at least one preventing instruction for preventing the supply of lubricant to the outlet opening of the dry lubricating unit at least 5 seconds after the end of a rinsing step following the end of a treatment step by the treating unit, and a means for generating an initiating instruction for initiating a supply of lubricant to the outlet opening of the dry lubricating unit at least 5 seconds after the end of a rinsing step following the end of a treatment step by the treating unit.

18. The conveyor of claim 13, in which the dry lubricating unit is a dry lubricating unit adapted to ensure a dry lubrication by applying intermittently a micro dose of a lubricant on a part of the transport surface (7) of the conveyor belt (3) during a part of the second path portion of the conveyor belt moving in the return direction.

19. The conveyor of claim 13, in which the dry lubricating unit is a dry lubricating unit adapted to ensure a dry lubrication by applying a micro dose of a lubricant on a part of the transport surface (7) of the conveyor belt (3) during a part of the second path portion of the conveyor belt moving in the return direction, as well on a part of the guiding surface (10) of the conveyor belt (3).

20. The conveyor of claim 13, in which the treating unit is selected from the group consisting of dry treating unit, semi-dry treating unit and wet treating unit adapted to ensure respectively a dry treatment step, a semi-dry treatment step and a wet treatment step by applying, when required, at least an active treatment agent, on a part of the transport surface (7), as well on a part of the guiding surface (10) during at least a part of the path of the conveyor belt (3).

21. The conveyor of claim 13, in which the treating unit comprises at least an unit selected from the group consisting of dry treating unit, semi-dry treating unit and wet treating unit adapted to ensure respectively a dry treatment step, a semi-dry treatment step and a wet treatment step by applying, when required, at least an active treatment agent, on a part of the transport surface (7), as well on a part of the guiding surface (10) during at least a part of the second path portion of the conveyor belt (3) moving in the return direction, whereby said unit is further provided with means for ensuring at least a rinsing step by applying an aqueous rinsing medium on a part of the transport surface (7), as well on a part of the guiding surface (10) during a part of the path portion of the conveyor belt (3).

22. The conveyor of claim 13, in which the treating unit is a $CO_2$ solid particles blasting unit adapted for expelling through the said at least one outlet or nozzle $CO_2$ solid particles on a part of the conveyor belt (3).

23. The conveyor belt of claim 13, in which the system further comprises: (d) a drying unit for ensuring a drying step of at least a part of the transport surface (7), and
in which the single programmable logic controller (PLC) is further comprising (c4) at least one means for generating at least one drying program instruction for controlling the drying step, and (c5) one means for generating at least one preventing instruction for preventing, during a drying step, at least one process step selected from the group consisting of a dry lubrication step, a treating step and a rinsing step.

24. The conveyor of claim 13, in which the treating unit comprises at least a sanitising unit selected from the group consisting of an ionising unit, a UV emitting unit and combination thereof adapted when required to emit respectively ions and UV on a part of the transport system.

25. The conveyor of claim 13, in which the dry lubricating unit and the treating unit are located the one with respect to the other with respect to the path of the endless belt (3) so that the dry lubricating unit has a lubricating surface contacting a part of the endless belt (3) during the second path portion of said at least one endless belt (3) moving in the return direction (P2), while the treating unit is adapted for treating a part of the endless belt (3) during the first path portion of said endless belt moving in the transport direction.

26. The conveyor of claim 13, in which the dry lubricating unit and the treating unit are located the one with respect to the other with respect to the path of the endless belt (3) so that the dry lubricating unit has a lubricating surface contacting a part of the endless belt (3) during the second path portion of said at least one endless belt (3) moving in the return direction (P2), while the treating unit is adapted for treating a part of the endless belt (3) during the second path portion of said endless belt moving in the return direction, whereby the dry lubricating unit is located backwards the treating unit with respect to the return direction.

27. The conveyor of claim 13, in which the dry lubricating unit and the treating unit form one single assembly.

28. A moving conveyor ensuring at least a movement of at least one container according to a transport direction (P1), whereby said conveyor (1) comprises at least:
at least one endless conveyor belt (3) having a portion moving in the transport direction (P1), while another portion of the belt is moving in a return direction opposite to the transport position,
a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction,
at least one lubricant provider for providing the endless conveyor belt (3) with at least one lubricant, and
at least a driving system for driving the conveyor belt along a continuous path comprising at least a first path portion moving in accordance to said transport direction (P1), and a second path portion of said at least one endless belt (3) moving in the return direction (P2),
whereby said conveyor belt comprises at least:
(a) a transport surface (7) adapted to support the at least one container to be moved according to the transport direction (PI), and adapted to contact supporting elements for the portion moving in the return direction (P2)

(b) at least one guiding surface (10) opposite to the transport surface (7), whereby said at least one guiding surface (10) is adapted to have contact with at least one gliding face (11) of the guiding element, in which the moving conveyor comprises a system which comprises at least:

(i) a unit selected from the group consisting of
  (a1) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (a11) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$ along the substantially planar lubrication surface, recesses with an opening of less than 1000 mm$^2$ along the substantially planar lubrication surface, and grooves with an opening of less than 1000 mm$^2$ along the substantially planar lubrication surface, and (a12) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system,
  (a2) a treating unit distinct from the dry lubricating unit adapted to ensure at least a treatment step different from a dry lubrication step by contacting, when required, a part of the transport system at least with an active treatment element, and
  (a3) combinations thereof, and whereby a unit selected from the group consisting of the dry lubricating unit, the treating unit and combinations thereof is associated in a movable manner with the supporting system, without having to remove all the return supporting elements attached to the supporting system, and whereby at least one of the said return supporting element is provided with a first contacting zone for the belt (3) during its second path (P2) and with a contacting tool defining at least a second contacting zone for the belt (3) during its second path, whereby at least the contacting tool is movable between a first position in which during its second path (P2), the conveyor belt (3) contacts the second contacting zone and not the first contacting zone, and a second position in which during its second path (P2), the conveyor belt (3) contacts at least the contacting zone.

29. The conveyor of claim 28, in which the contacting tool is mounted movable with respect to a supporting element.

30. The conveyor of claim 28, in which the contacting tool is attached to a supporting element, whereby said supporting element is rotatable so as to ensure the movement of the contacting tool between its first position and its second position.

31. A moving conveyor ensuring at least a movement of at least one container according to a transport direction (P1), whereby said conveyor (1) comprises at least:

at least one endless conveyor belt (3) having a portion moving in the transport direction (P1), while another portion of the belt is moving in a return direction opposite to the transport position, a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction, at least one lubricant provider for providing the endless conveyor belt (3) with at least one lubricant, and at least a driving system for driving the conveyor belt along a continuous path comprising at least a first path portion moving in accordance to said transport direction (P1), and a second path portion of said at least one endless belt (3) moving in the return direction (P2), whereby said conveyor belt comprises at least:

(a) a transport surface (7) adapted to support the at least one container to be moved according to the transport direction (PI), and adapted to contact supporting elements for the portion moving in the return direction (P2)

(b) at least one guiding surface (10) opposite to the transport surface (7), whereby said at least one guiding surface (10) is adapted to have contact with at least one gliding face (11) of the guiding element, in which the moving conveyor comprises a system which comprises at least:

(a) a unit selected from the group consisting of
  (a1) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (a11) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$ along the substantially planar lubrication surface, recesses with an opening of less than 1000 mm$^2$ along the substantially planar lubrication surface, and grooves with an opening of less than 1000 mm$^2$ along the substantially planar lubrication surface, and (a12) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system,
(a2) a treating unit distinct from the dry lubricating unit adapted to ensure at least a treatment step different from a dry lubrication step by contacting, when required, a part of the transport system at least with an active treatment element, and
(a3) combinations thereof,
whereby a unit selected from the group consisting of the dry lubricating unit, the treating unit and combinations thereof is associated in a movable manner with the supporting system, without having to remove all the return supporting elements attached to the supporting system, and
whereby at least one of the said return supporting element is provided maintaining element adapted for cooperating with the movable unit, said maintaining element being movable between a first position in which the unit is prevented from being moved with respect to the supporting element provided with the maintaining element and a second position in which the unit is able to be moved with respect to the said supporting element provided with the maintaining element.

32. The conveyor of claim 31, in which the supporting element provided with the maintaining element is mounted rotatable between a first position in which the maintaining element is its first position and a second position in which the maintaining element is in its second position.

33. A method for dry lubricating and for treating a moving conveyor ensuring at least a movement of at least one container according to a transport direction (P1), whereby said conveyor (1) comprises at least:
at least one endless conveyor belt (3) having a portion moving in the transport direction (P1), while another portion of the belt is moving in a return direction opposite to the transport position,
a supporting system associated to (a) at least one guiding element with at least one gliding face (11) for said at least one endless conveyor belt (3), said at least one guiding element being adapted for guiding the at least one endless conveyor belt at least partly in the transport direction (PI), and (b) return supporting elements for supporting at least partly the conveyor belt (3) in the return direction,
at least one lubricant provider for providing the endless conveyor belt (3) with at least one lubricant, and
at least a driving system for driving the conveyor belt along a continuous path comprising at least
a first path portion moving in accordance to said transport direction (P1), and a second path portion of said at least one endless belt (3) moving in the return direction (P2), whereby said conveyor belt comprises at least:
(a) a transport surface (7) adapted to support the at least one container to be moved according to the transport direction (PI), and adapted to contact supporting elements for the portion moving in the return direction (P2)
(b) at least one guiding surface (10) opposite to the transport surface (7), whereby said at least one guiding surface (10) is adapted to have contact with at least one gliding face (11) of the guiding element,
in which the moving conveyor comprises a system which comprises at least:
(a) a dry lubricating unit adapted to ensure a dry lubrication by applying a micro dose of a lubricant on a part of the transport surface (7) of the conveyor belt (3) during a part of the second path portion of the conveyor belt moving in the return direction, said dry lubricating unit comprising (al) a first lubrication body with a substantially planar lubrication surface adapted for contacting said part of the transport surface (7) of the conveyor belt (3) during a part of the second path portion of the conveyor belt moving in the return direction, said lubrication body having at least one inner channel system extending within the body between an inlet channel section and an outlet opening system located along the substantially planar lubrication surface of the body, said outlet opening system comprising at least one element selected from the group consisting of apertures with an opening of less than 1000 mm$^2$ along the substantially planar lubrication surface, recesses with an opening of less than 1000 mm$^2$ along the substantially planar lubrication surface, and grooves with an opening of less than 1000 mm$^2$ along the substantially planar lubrication surface, and (a2) a first supplying system comprising at least a first pump and a first duct system for connecting the first pump to the inlet channel section of the at least one inner channel of the lubrication body, whereby said first supplying system is adapted for ensuring a supply of micro dose of the lubricant to the outlet opening system,
(b) a treating unit distinct from the dry lubricating unit adapted to ensure at least a treatment step different from a dry lubrication step by contacting, when required, a part of the transport system at least with an active treatment element or agent, and
(c) a single programmable logic controller (PLC) comprising at least (c1) one means for generating lubricating instructions for controlling the working of the said unit; and (c2) one means for generating at least one treatment instructions for controlling the unit,
whereby a unit selected from the group consisting of the dry lubricating unit, the treating unit and combinations thereof is associated in a movable manner with the supporting system, without having to remove all the return supporting elements attached to the supporting system, and
(d) a friction measuring unit for measuring a parameter function of the friction of the transport surface (7) of the conveyor belt (3), said parameter being adapted for determining whether the friction is or not within an unacceptable friction range and/or within an acceptable friction range,
whereby said method comprises at least the following generating instructions steps:
determining a parameter function of the friction of the transport surface (7) of the conveyor belt (3);
transferring said parameter to the control unit or single programmable logic controller,
generating lubricating instructions by the control unit or single programmable logic controller for controlling the dry lubricating unit, when the parameter function of the transport surface is within an unacceptable friction range or is outside an acceptable friction range;
generating treating instructions by the control unit or single programmable logic controller for controlling the treating unit, advantageously before starting a lubrication, and
generating at least one preventing instruction by the control unit of single programmable logic controller for preventing a dry lubrication step at least during a treatment step.

* * * * *